US008433650B1

(12) United States Patent
Thomas

(10) Patent No.: US 8,433,650 B1
(45) Date of Patent: Apr. 30, 2013

(54) COMPUTERIZED PROCESS TO, FOR EXAMPLE, AUTOMATE THE HOME SALE, MORTGAGE LOAN FINANCING AND SETTLEMENT PROCESS, AND THE HOME MORTGAGE LOAN REFINANCING AND SETTLEMENT PROCESSES

(76) Inventor: Neil Thomas, Silver Spring, MD (US)

( * ) Notice: Subject to any disclaimer, the term of this patent is extended or adjusted under 35 U.S.C. 154(b) by 572 days.

(21) Appl. No.: 12/457,598

(22) Filed: Jun. 16, 2009

Related U.S. Application Data

(63) Continuation-in-part of application No. 11/881,360, filed on Jul. 26, 2007, now abandoned, which is a continuation-in-part of application No. 10/979,822, filed on Nov. 3, 2004, now Pat. No. 7,548,884, which is a continuation of application No. 10/969,242, filed on Oct. 21, 2004, now abandoned.

(60) Provisional application No. 60/512,776, filed on Oct. 21, 2003.

(51) Int. Cl.
*G06Q 40/00* (2006.01)

(52) U.S. Cl.
USPC .............................................. 705/38; 705/35

(58) Field of Classification Search .................... 705/35, 705/38
See application file for complete search history.

(56) References Cited

U.S. PATENT DOCUMENTS

| 5,584,025 | A  | 12/1996 | Keithley |
| 5,611,052 | A  | 3/1997  | Dykstra |
| 5,689,705 | A  | 11/1997 | Fino |
| 5,870,721 | A  | 2/1999  | Norris |
| 5,930,776 | A  | 7/1999  | Dykstra |
| 5,940,811 | A  | 8/1999  | Norris |
| 5,940,812 | A  | 8/1999  | Tengel |
| 6,321,202 | B1 | 11/2001 | Raveis |
| 6,594,633 | B1 | 7/2003  | Broerman |
| 6,684,196 | B1 | 1/2004  | Mini |
| 6,751,596 | B1 | 6/2004  | Hastings |
| 6,871,140 | B1 | 3/2005  | Florance |
| 6,938,006 | B2 | 8/2005  | Ikeda |
| 6,985,886 | B1 | 1/2006  | Broadbent |
| 7,016,866 | B1 | 3/2006  | Chin |
| 7,076,452 | B2 | 7/2006  | Florance |
| 7,092,892 | B1 | 8/2006  | Sobalvarro |
| 7,107,241 | B1 | 9/2006  | Pinto |

(Continued)

OTHER PUBLICATIONS

Iproperty.com, INC., Chorus Technology Walkthrough, www iProperty com; (c) 2001, Lexena, KS.

(Continued)

*Primary Examiner* — James Trammell
*Assistant Examiner* — Daniel L Greene

(57) ABSTRACT

In some embodiments, a comprehensive computer system and method (See FIGS. 1, 1*a,* 2) for automating and facilitating the performing and processing of tasks, information transfer, and information storage associated with the home sale (See FIG. 3*a*), mortgage origination (See FIG. 3*b*), and settlement process (See FIG. 3*c*), and the home mortgage refinancing origination and settlement process (See FIGS. 1*b,* 1*c,* 2*a*) (or performing other business processes), over a distributed computing network are disclosed. One aspect of the invention is a greatly simplified process for a home buyer to search for a home and simultaneously receive accurate and competitive bids for mortgages and services from multiple lenders and service providers. The process includes an automated underwriting process which generates complete, accurate information on the costs of buying and owning a home at very beginning of the home buying process. Another aspect of the invention is greatly automating the entire sale, loan and settlement process.

22 Claims, 76 Drawing Sheets

U.S. PATENT DOCUMENTS

| | | | |
|---|---|---|---|
| 7,127,406 | B2 | 10/2006 | Triola |
| 7,139,728 | B2 | 11/2006 | Rigole |
| 7,146,337 | B1 | 12/2006 | Ward |
| 7,287,008 | B1 | 10/2007 | Mahoney |
| 7,315,841 | B1 | 1/2008 | McDonald |
| 7,333,943 | B1 | 2/2008 | Charuk |
| 7,340,435 | B2 | 3/2008 | McDonald |
| 7,395,239 | B1 | 7/2008 | Riseman |
| 7,440,921 | B1 | 10/2008 | Rieger |
| 7,454,355 | B2 | 11/2008 | Milman |
| 7,478,064 | B1 | 1/2009 | Nacht |
| 7,499,885 | B2 | 3/2009 | Danpour |
| 7,574,400 | B1 | 8/2009 | Stokum |
| 7,587,344 | B2 | 9/2009 | Harris |
| 7,596,508 | B1 | 9/2009 | McGuffie |
| 7,596,509 | B1 | 9/2009 | Bryson |
| 7,596,511 | B2 | 9/2009 | Hall |
| 2001/0005829 | A1 | 6/2001 | Raveis |
| 2001/0034607 | A1 | 10/2001 | Perschbacher |
| 2001/0047282 | A1 | 11/2001 | Raveis |
| 2002/0040304 | A1 | 4/2002 | Shenoy |
| 2002/0052814 | A1 | 5/2002 | Ketterer |
| 2003/0036995 | A1 | 2/2003 | Lazerson |
| 2003/0163408 | A1 | 8/2003 | Polston |
| 2003/0187756 | A1 | 10/2003 | Klivington |
| 2003/0220805 | A1 | 11/2003 | Hoffman |
| 2003/0220807 | A1 | 11/2003 | Hoffman |
| 2003/0233310 | A1 | 12/2003 | Stavrovski |
| 2004/0010451 | A1 | 1/2004 | Romano |
| 2004/0030631 | A1 | 2/2004 | Brown |
| 2004/0039581 | A1 | 2/2004 | Wheeler |
| 2004/0049445 | A1 | 3/2004 | Kishore |
| 2004/0049450 | A1 | 3/2004 | Lussler |
| 2004/0054606 | A1 | 3/2004 | Broerman |
| 2004/0098284 | A1 | 5/2004 | Petito |
| 2004/0133493 | A1 | 7/2004 | Ford |
| 2004/0143450 | A1 | 7/2004 | Vidali |
| 2004/0249705 | A1 | 12/2004 | Spencer |
| 2005/0010423 | A1 | 1/2005 | Bagbey |
| 2005/0096926 | A1 | 5/2005 | Eaton |
| 2005/0288955 | A1 | 12/2005 | Lewiss-Hachmeister |

OTHER PUBLICATIONS

Amy E Lemen, "Are you Ready to Jump into Transaction Management;" Texas Realtor Online; Feb. 2001, Austin, TX; http://www.texasrealtoronline.com/issues/0201/platforms/0201platforms.html.

ClickConnect® Real Estate System Slide Presentation; Wintrans Solutions; http://www.wintranssolutions.com; Nov. 2004; San Jose, CA.

Subrao Shenoy, PlanetRE Online Demo; Dec. 1, 2004; San Jose, CA; www.PlanetRE.com.

eFrogg Online Demo; www.efrogg.com; Nov. 12, 2004; Winchester, VA.

Directory of Mortgage Servicing Technology,2005; Zackin Publications Inc; Waterbury, CT; http://www.sm-online.com/sm/arsmtech2005.pdf.

Fares Transaction Management System, Prepared by First American Residential Group, Nov. 10, 2004, Santa Ana, CA.pdf.

Blanche Evans, "ezClose com Debuts As the Internet's First Online Title Escrow Company" Feb. 15, 2000; Realty Times; Dallas, TX; http://realtytimes.com/rtpages120000215_ezclose_htm.

Auto-RE on Line Demo, Auto-RE LLC, Oct. 2005, Denver, CO; www.auto-re.com.

Online Real Estate Transaction Management Is it ready for prime time; Clareity Consulting & Communications, Inc.; Scottsdale, AZ, Feb. 2003; http://www.callclareity.com/2003-tmp.cfm.

Transaction Management A State of the Industry Report, Jul. 21, 2005; Clareity Consulting & Communications, Inc.; Scottsdale, AZ; http://www.callclareity.com/2005-tms.pdf.

First Online Real Estate Transaction Closes Using CloseYourDeal com, May, 19, 2000; Business Wire, New York, NY; http://www.thefreelibrary.com/First+Online+Real+Estate+Transaction+Closes+Using + Close YourDeal.com.-a062192410.

"DynaConnections Introduces the New Generation of MLS Solution" Nov. 18, 2002; RisMedia, Inc., Norwalk, CT; http://rismedia.com/wp/2002-11-18/dynaconnections-introduces-the-new-generation-of-mls-solutions/.

"Transaction Point® Overview," 2005; Fidelity National Information Solutions, Inc., Santa Barbara, CA; http://www.transactionpoint.com/files/TransactionPoint%20Overview092606.pdf.

"Blueflame Creates Comprehensive Internet-Based Real Estate Solution for Home-Link Services" Aug. 28, 2000; Business Wire, Hackensack, NJ; http://findarticles.com/p/articles/mi_m0EIN/is_2000_August_23/ai_64493220.

Interealty MLX Exchange Professional Demo, Nov. 2004; Interealty, Vienna, VA; http://www.interealty.com.

Blanche Evans, "Internet MLS and Transaction Management All in One" Aug. 17, 2000; Realty Times, Dallas, TX; http://realtytimes.com/rtpages/20000817_allinone.htm.

Microsoft Joins Forces with Freddie Mac, Chase Manhattan, GMAC-RFC, Norwest Mortgage, and Bank of America to Form New Company, PR Newswire, Mar. 16, 2000.

Jessica Swesey, Online real estate transaction makes comeback Part 1 of 3 Industry takes note of changing marketplace, May 27, 2003; Inman News, Alameda, CA.

Jessica Swesey, Online transactions sharpen competitive edge Part 2 of 3 Brokers get benefits of real estate transaction automationn, May 28, 2003; Inman News, Alameda, CA.

Jessica Swesey, Next generation transaction platforms find niche Part 3 of 3 Vendors add features, target market segments to gain traction, May 29, 2003, Inman News, Alameda, CA.

Microsoft Introduces Realty Desktop the First Completely Web-Based Customer Management Tool for Real Estate Brokers, Feb. 23, 2000, San Francisco, CA; http://www.microsoft.com/Presspass/press/2000/feb00/realtydesktoppr.mspx.

NTREIS Introduces Industry-Leading Real Estate Information Network, May 13, 2003, PR Newswire, New York, NY; http://www.prnewswire.com/cgi-bin/stories.pl?ACCT=104&STORY=/www/story/05-13-2003/0001945713.

Robert A. Heverly, Real Estate Transactions on the Web, Jan.-Feb. 2002; ABA Probate & Property Magazine, Chicago, IL; http://www.settlementroom.com/pages/pr/ProbateArticle.html.

SettlementRoom Online Demo; Jul. 7, 2005; SettlementRoom Systems, Inc, Vienna, VA; www settlementroom com.

SureClose TMS (Broker,Lender,Title) Slide Presentation; Oct. 27, 2004, Stewart Realty Services, Houston, TX.

"The Transaction Coordinator an Underutilized Asset to Residential Real Estate," Jun., 2003; by Clareity Consulting & Communications, Inc., Scottsdale, AZ; http://www.callclarity.com/Clareity-TC-WhitePaper.pdf.

Stephen Bedikian, Transaction Management, Realizing Operating Efficiencies and Achieving Marketplace Advantage, Jan. 2003; RealIQ Cobsulting, Los Angeles, CA.

"First American Introduces SourceMasterTm Powered by Dorado—A Next Generation Technology for Vendor and Transaction Management With Advanced Bundling Capabilities" Mar. 10, 2003; First American Corporation, Los Angeles, CA; http://www.firstam.com/pressrelease.cfm?pr=949.

FARES Transaction Management System, Prepared by First American Residential Group, Nov. 10, 2004, Santa Ana, CA.

"Realty Plus Online Launches CloseYourDeal.com Nationally;" Sep. 18, 2000; Business Wire, New York, NY; http://findarticles.com/p/articles/mi_m0EIN/is_2000_Sept_18/ai_65268702.

http://www.rateplug.com, HandHeld Power LLC, Naperville, IL (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf).

http://www.closeyourdeal.com/ (Web site no longer available).

http://www.eREALTOR.com (Web site no. longer available) (formerly RealtyLinks.com) operated by Homestore.com, Inc.

http://www.dealtrack.com (Web site no longer available) (RELAY Transaction Management; REBT, LLC, 525 South Virgil Ave, Los Angeles, CA 90020 which operates www.rebt.com).

http://www.realtydesktop.com (Web site no longer available) (formerly operated by Microsoft Corp).
http://www.synteleos.com; (Web site no longer available) (Synteleos, Inc. Pleasanton, California sold technology to GURU NETworks, Inc., 11145 Glade Dr. Suite 100, Reston, VA 20191 which operates www.gurunet.net).
http://www.MSHomeAdvisors.com (Web site no longer available) (formerly operated by Microsoft Corp; Redmond, WA).
http://base.google.com/; Google (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (revised Aug. 2007).pdf; by Neil Thomas, Silver Spring, MD).
http://www.realestate.msn.com/buying/; MSN; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD; by Neil Thomas, Silver Spring, MD).
http://www.Realtor.com; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD; by Neil Thomas, Silver Spring, MD).
http://www.realestate.yahoo.com; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD; by Neil Thomas, Silver Spring, MD).
http://www.realestate.aol.com; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD; by Neil Thomas, Silver Spring, MD).
http://www.coldwellbanker.com; Coldwell Banker Real Estate; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD).
http://www.weichert.com; Weichert Real Estate; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD).
http://www.longandfoster.com; Long and Foster Real Estate; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD).
http://www.remax.com; RE/MAX; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD).
http://www.cbmove.com; Coldwell Banker Real Estate; (As shown in Memorandum Regarding Major Internet Home Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD).
http://www.prufoxroach.com; Prudential Fox Roach; (As shown in Memorandum Regarding Major Internet Home.Search and Real Estate Company Websites Oct. 12, 2006 to Oct. 29, 2006.pdf; Exhibit A Major Internet Home Search Portals Oct. 12, 2006 to Oct. 30, 2006 (Revised Aug. 2007).pdf; Exhibit B Major Real Estate Company Portals Oct. 24, 2006 to Oct. 30, 2006 (Revised Aug. 2007).pdf; by Neil Thomas, Silver Spring, MD).
Janis Mara, Case studies of paperless success, Inman News Oct. 19, 2005; http://www.alta.org/press/release.cfm?newsID=3210.
Glenn Roberts Jr., The new page-turner: Paperless real estate technology, Inman News, Oct. 20, 2005, http://www.alta.org/indynews/news.cfm?newsID=3209.
First American Expands Technology Offerings to Help Lenders and Settlement Agents Streamline Closing Process, The First American Corporation, Oct. 19, 2005; http://www.alta.org/indynews/news.cfm?newsID=3194.
The First American Corporation Acquires Interealty, by The First American Corporation, Oct. 3, 2005; http://www.alta.org/indynews/news.cfm?newsID=3149.
Stewart's eClosingRoom(TM) Technology Transforms Home Buying Experience for Fresno, Calif Buyers, Jul. 22, 2005, Stewart Title Co; http://www.alta.org/indynews/news.cfm?newsID=2961.
Another Texas county adopts paperless real estate closing system,Inman News Jun. 2, 2005; http://www.alta.org/indynews/news.cfm?newsID=2835.
Real estate loan closing processes get fuller automation, Inman News, Jun. 13, 2005; http://www.alta.org/indynews/news.cfm?newsID=2864.
Fidelity National Financial Division Enhances Real Estate Transaction Management Solution Jan. 6, 2005 Fidelity National Financial, Inc; http://www.alta.org/indynews/news.cfm?newsID=2409.
Hall Settlement Systems Offers Insight on the Future of Total Transaction Management Systems at ALTA® Annual Convention Oct. 11, 2006, Hall Settlement Systems; http://www.alta.org/technology/news.cfm?newsID=4245.
RamQuest Makes the Right Connections With Closing MarketT Oct. 3, 2006, RamQuest Software, Inc; http://www.alta.org/technology/news.cfm?newsID=4226.
RamQuest Releases Newest Version of Flagship Solution Aug. 17, 2006 RamQuest Software, Inc; http:www.alta.org/technology/news.cfm?newsID=4067.
Janis Mara, Google moves further into real estate Apr. 7, 2006, Inman News; http://www.alta.org/technology/news.cfm?newsID=3711.
First American Launches Real Estate Information Technology Company, Marketlinx, Inc, Jan. 30, 2007, First American Corporation; http://www.alta.org/technology/news.cfm?newsID=4597.
Stewart Transaction Solutions Strengthens End-to-End Electronic Real Estate Transaction with Majority Investment Feb. 5, 2007, Stewart Information Services Corp; http://www.alta.org/technology/news.cfm?newsID=4611.
Marketlinx Recognized As a Top Ten Technology Trendsetter Mar. 22, 2007, MarketLinx; http://www.alta.org/technology/news.cfm?newsID=4749.
http://www.alta.org/technology/technews.cfm; American Land Title Association® 1828 L Street, NW, Suite 705 Washington, DC 20036-5104.
2007 Swanepoel Trends Report; http://www.retrends.comi; RealSure, Inc. 8 Argonaut, Suite 100 Aliso Viejo, CA 92656.
RETrends Aritcles and Writings; http://www.retrends.com/real_estate_trends_articles.asp; RealSure, Inc. 8 Argonaut, Suite 100 Aliso Viejo, CA 92656.
http://www.retechnologynews.com; Real Estate Technology News an October Research Corporation publication PO Box 370 Richfield, Ohio 44286 877-662-8623.
Danny Sullivan, "Google Launches Comparison Ads, Starting With Mortgages," Oct. 29, 2009, Search Engine Land; http://searchengineland.com/google-launches-comparison-ads-starting-with-mortgages-28810.
http://www.cbmove.com; (As copied off Web site Oct. 2009).

http://www.coldwellbanker.com/; (As copied off Web site Oct. 2009).
http://www.homesdatabase.com/; (As copied off Web site Oct. 2009).
http://www.weichert.com/; (As copied off Web site Oct. 2009).
http://www.prufoxroach.com/; (As copied off Web site Oct. 2009).
http://www.remax.com/; (As copied off Web site Oct. 2009).
http://www.realestate.com/; (As copied off Web site Oct. 2009).
http://maps.google.com/maps?h1=en&tab=f1; (As copied off Web site Oct. 2009).
https://www.google.com/comparisonads/mortgages#ti=0; (As copied off Web site Nov. 2009).
http://www.har.com/; (As copied off Web site Oct. 2009).
http://www.longandfoster.com/; (As copied off Web site Oct. 2009).
http://realestate.yahoo.com/; (As copied off Web site Sep. 2009).
http://realestate.aol.com/; (As copied off Web site Oct. 2009).
http://www.realestate.msn.com/; (As copied off Web site Oct. 2009).
http://www.realtor.com/; (As copied off Web site Oct. 2009).
http://www.zillow.com/; (As copied off Web site Oct. 2009).
https://www.google.com/comparisonads/mortgages#ti=0; ; (As copied off Web site Nov. 2009).

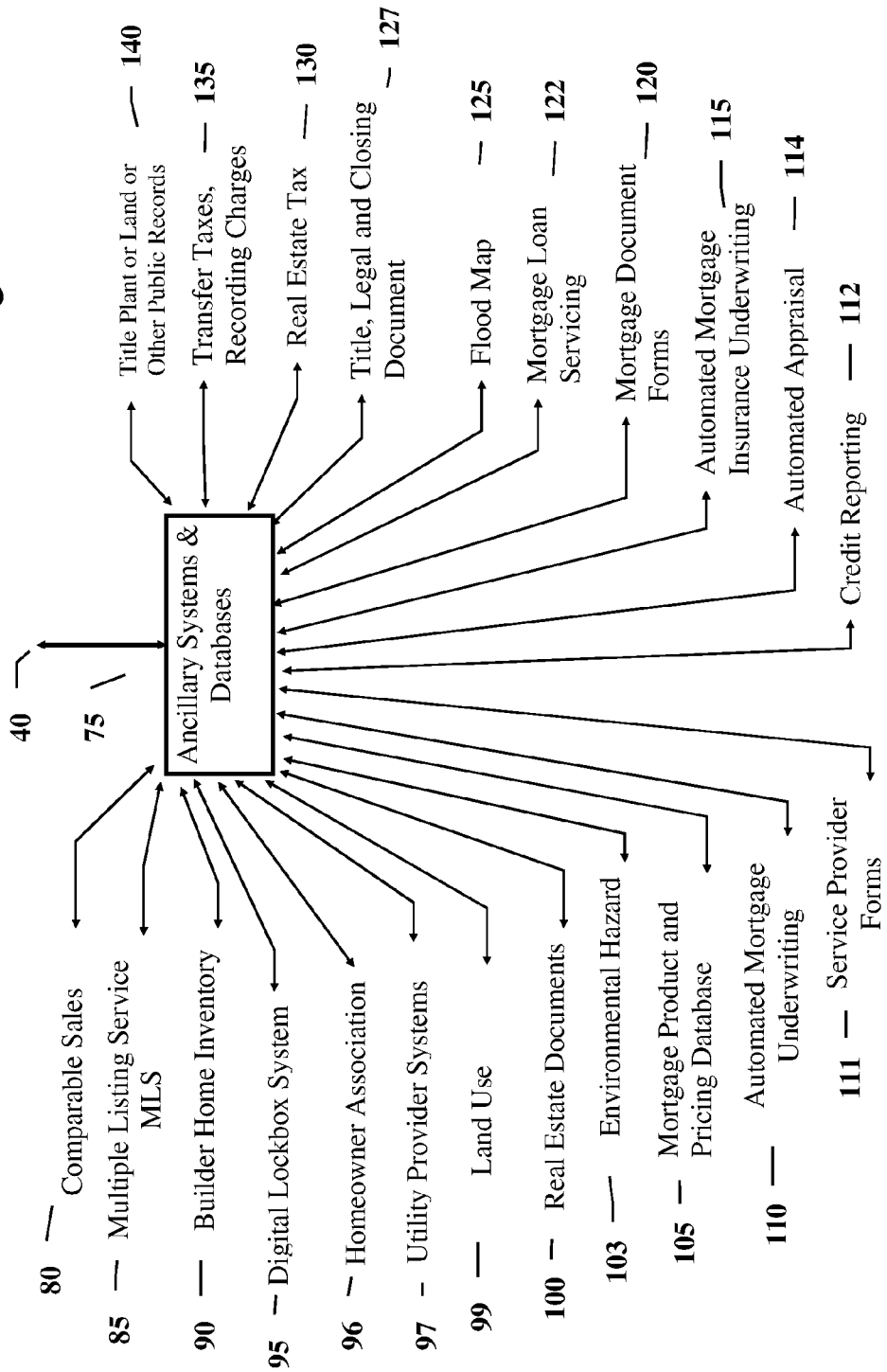

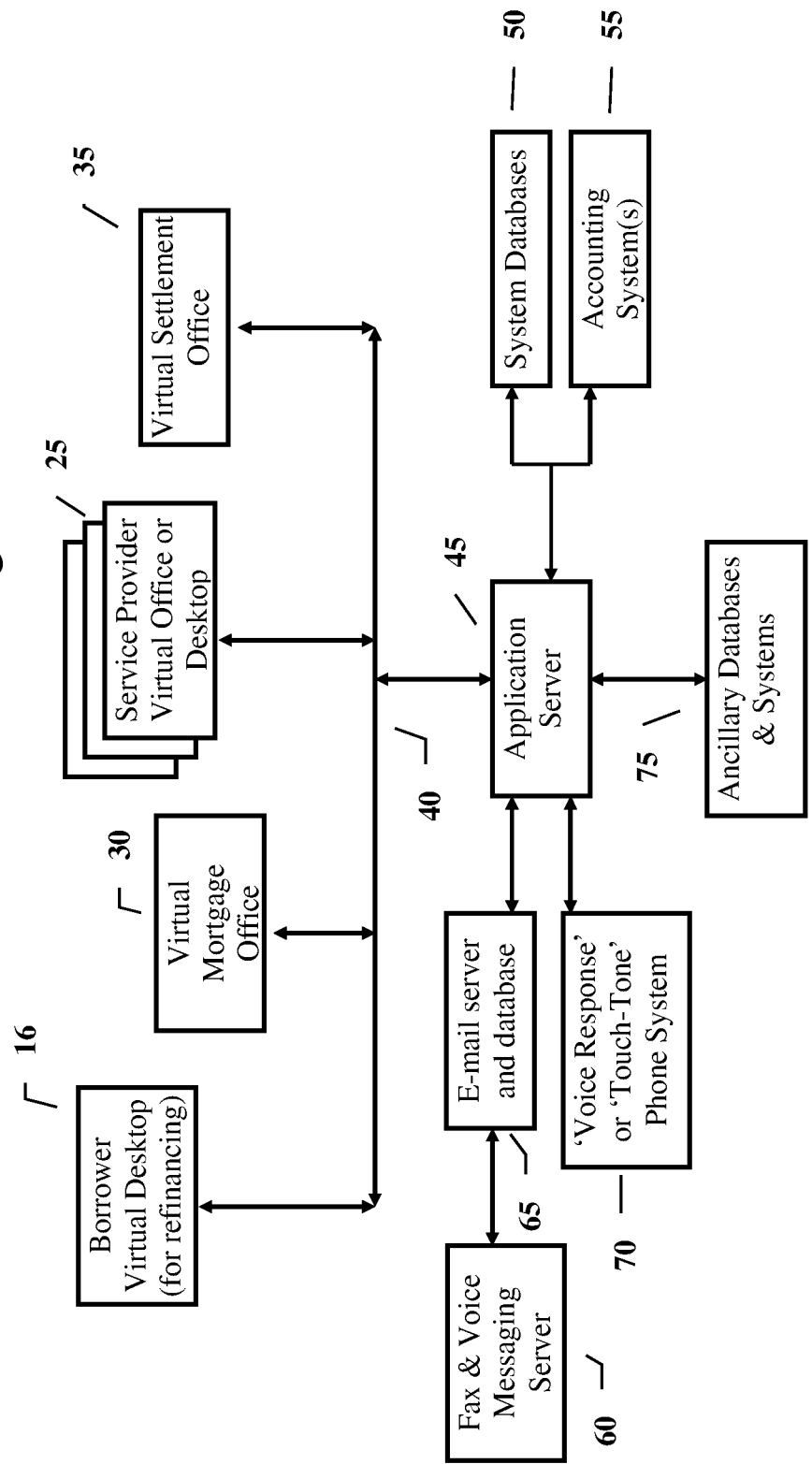

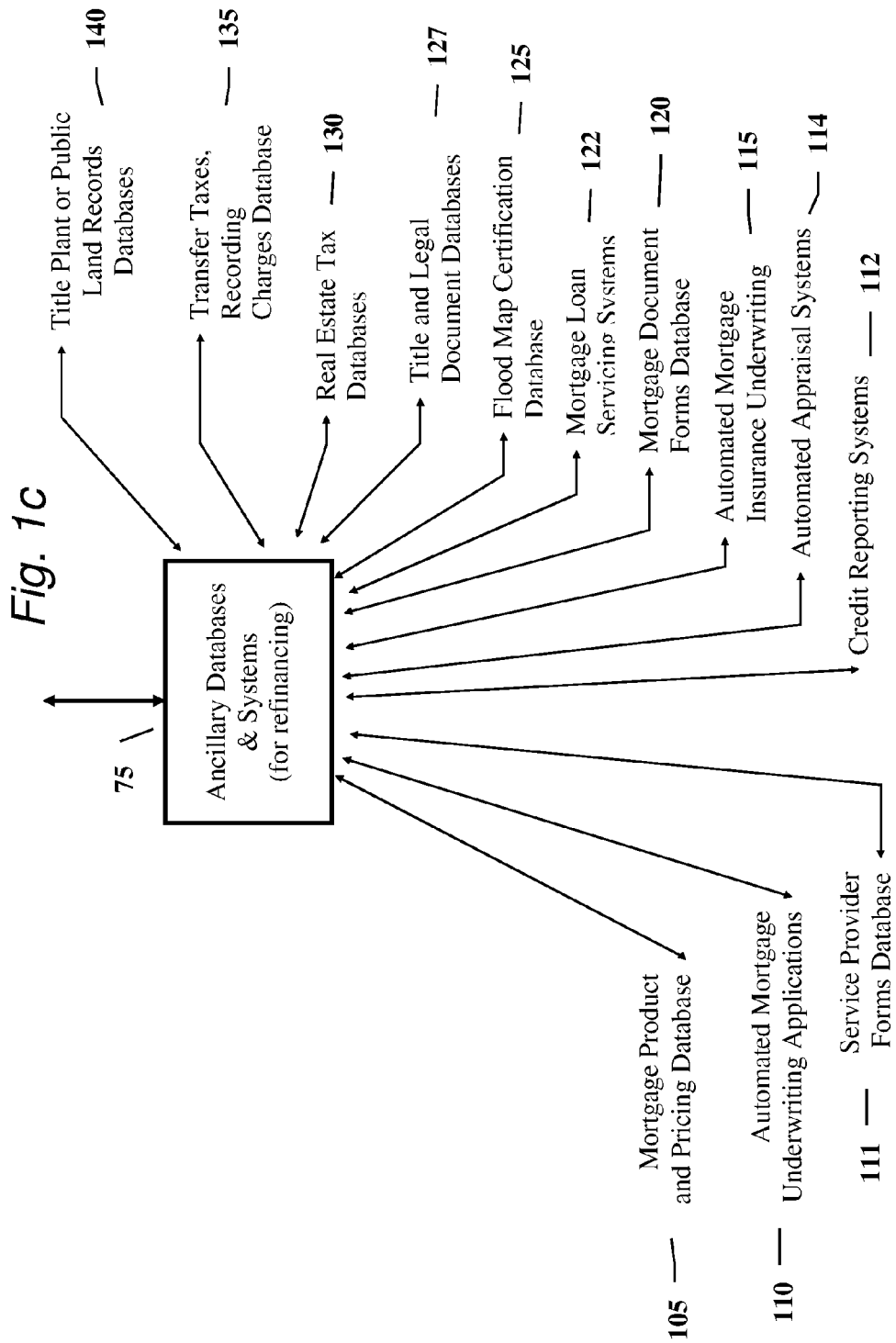

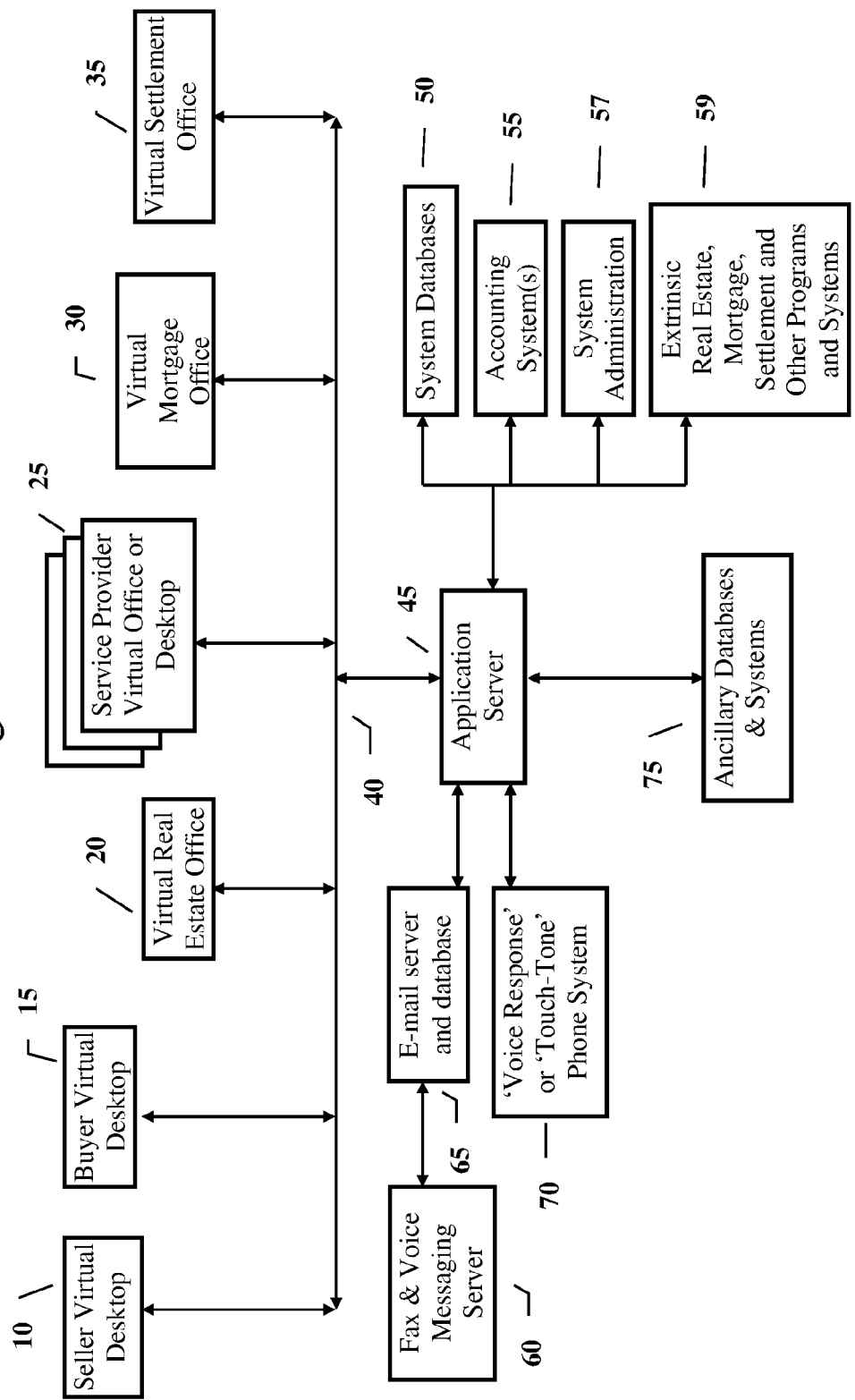

Example of a Web Portal

*Fig. 1e*

For Sellers:

I'm Interested in Selling a Home — 153

(and/or)

I'm Interested in Selling a Home Myself (FSBO) — 154

(and/or)

I'm Interested in Selling a Home with an Agent — 155

For Buyers:

I'm Interested in Buying a Home — 156

(and/or)

I'm Interested in Buying a Home Myself — 157

(and/or)

I'm Interested in Buying a Home with an Agent — 158

Example for a Real Estate Broker Website

Welcome

*Fig. 1f*

I am the best real estate broker in Montgomery County, Maryland..........

To access my Virtual Real Estate Office please select one of the options below.

[ I'm Interested in Selling a Home ] — 153

[ I'm Interested in Buying a Home ] — 156

Example for a Mortgage Lender Website

ABC Mortgage Company

I'm Interested in a Mortgage to Buy a Home —— 159

I'm Interested in Refinancing My Home —— 160

Example for Seller Prompts

Would you like to sell without the help of a real estate agent to save on the sales commission? (optional; omit if seller interested in using a real estate agent)

"Would you like to have real estate agents and all 'service providers' bid (or send quotes) for all services you'll need such as advertising, home improvement, home warranty, settlement, home owner warranty (HOW), home inspection, and moving and storage for the best pricing, terms and service? (omit real estate agent and certain services if not appropriate, for example for FSBO)

"Would you like to like a free 'comprehensive market analysis' (CMA) to help determine the value of your home?

Have found a new home yet? "Would you like a real estate agent (or move consultant or transaction coordinator), lender and service providers to assist you in finding your next home?

Everything will be arranged in a few easy steps. All your information will be automatically saved so it can be used for the entire sale process from beginning to end so you don't have to worry about it later and you'll get faster, better service at the best possible prices.

We'll do all the work. It's simpler and easier

— 165

| Yes | No | Chat | VoIP | Prompt me Later |

*Fig. 1i*

Example for Buyer (Borrower for Refinancing) Prompts

Would you like to buy without the help of a real estate agent? You will receive a credit for any sales commission the seller saves. (optional, omit if home refinancing)

"Would you like to have real estate agents, mortgage lenders, and all 'service providers' bid for (or send quotes) for all services you'll need such as home inspection, home improvement, insurance, and settlement for the best pricing, terms and service? (omit real estate agents and certain services if not appropriate if buying without agent or if a home refinancing)

Everything will be arranged in a few easy steps. All your information will be automatically saved so it can be used for the entire sale process from beginning to end so you don't have to worry about it later and you'll get faster, better service at the best possible prices. —— 167

We'll do all the work. It's simpler and easier

| Yes | No | Chat | VoIP | Prompt me Later |

| | C | D E F G | H |
|---|---|---|---|
| 2 | Buyer Property and Loan Search Criteria (240) (from "buyer-search") | | |
| 3 | | | |
| 4 | Buyer Property Purchase Criteria (Price Range, Type, City, State, Zip, N | | |
| 5 | Gross Monthly Income (GMoInc): | | 20000 |
| 6 | Monthly Debt Payments (MoDP): | | 2000 |
| 7 | Money For Down Payment and Closing Costs (MoDP&CC): | | 150000 |
| 8 | FICO Credit Score (240 or 112) | | 700 |
| 9 | Property Will Be: | | Primary Residence |
| 10 | Loan Type: | | 30 Year Fixed |
| 11 | First-time Homebuyer (Yes, No) | | No |
| 12 | | | |

240, 1330, 1630

| | C | D E F G | H |
|---|---|---|---|
| 2 | Buyer Property and Loan Search Criteria (240) (from "buyer-search") | | |
| 3 | | | |
| 4 | Buyer Property Purchase Criteria (Price Range, Type, City, State, Zip, No. Br., No Ba.) | | |
| 5 | Gross Monthly Income (GMoInc): | | $ 20,000.00 |
| 6 | Monthly Debt Payments (MoDP): | | $ 2,000.00 |
| 7 | Money For Down Payment and Closing Costs (MoDP&CC): | | $ 150,000.00 |
| 8 | FICO Credit Score (240 or 112) | | 700 |
| 9 | Property Will Be: | | Primary Residence |
| 10 | Loan Type: | | 30 Year Fixed |
| 11 | First-time Homebuyer (Yes, No) | | No |

240, 1330, 1630

| | K | L M N | O |
|---|---|---|---|
| 2 | Property Database (PDB) 50, 75, 85, 90 | | |
| 3 | | | |
| 4 | Sale Price | | 525000 |
| 5 | Hazard Insurance Premium(s): | | 1400 |
| 6 | City Real Estate Taxes (annual): | | 0 |
| 7 | County Real Estate Taxes (annual): | | 2500 |
| 8 | HOA Fees (annual): | | 350 |
| 9 | Utilities Total (Avg./Mo.): | | 150 |
| 10 | 1201. Recording fees: | | 0 |
| 11 | 1202. City/County tax/stamps: | | 0.01 |
| 12 | 1203. State tax/stamps: | | 0.005 |

Fig. 1l

| | K | L M N | O |
|---|---|---|---|
| 2 | Property Database (PDB) 50, 75, 85, 90 | | |
| 3 | | | |
| 4 | Sale Price | | $ 525,000.00 |
| 5 | Hazard Insurance Premium(s): | | $ 1,400.00 |
| 6 | City Real Estate Taxes (annual): | | $ - |
| 7 | County Real Estate Taxes (annual): | | $ 2,500.00 |
| 8 | HOA Fees (annual): | | $ 350.00 |
| 9 | Utilities Total (Avg./Mo.): | | $ 150.00 |
| 10 | 1201. Recording fees: | | 0 |
| 11 | 1202. City/County tax/stamps: | | 0.01 |
| 12 | 1203. State tax/stamps: | | 0.005 |

Fig. 1m1

| | R | S | T | U | V |
|---|---|---|---|---|---|
| 2 | Loan P&P Database (LP&PDB) 50, 75, 105 | | | | |
| 3 | | | | | |
| 4 | Loan Type: | | | | 30 Year Fixed |
| 5 | Location: | | | | Y/N |
| 6 | Property Will Be: | | | | Primary Residence |
| 7 | Interest Rate | | | | 0.06 |
| 8 | Term (months) | | | | 360 |
| 9 | 801. Loan Origination Fee % | | | | 0.01 |
| 10 | 802. Loan Discount % | | | | 0.005 |
| 11 | 803. Appraisal Fee to | | | | =AI5 |
| 12 | 804. Credit Report Fee | | | | =AI6 |
| 13 | 805. Lender's Inspection Fee | | | | 0 |
| 14 | 806. Mortgage Ins. App. Fee | | | | 100 |
| 15 | 901. Interest from to @ $ per day | | | 15 | =G28*V7/365*U15 |
| 16 | 902. Mortgage Insurance Premium for mos. to | | | 3 | =U16*E38 |
| 17 | 903. Hazard Insurance Premium for yrs. to | | | 1 | =O5 |

| | X | Y | Z | AA | AB |
|---|---|---|---|---|---|
| 2 | Loan P&P Database (LP&PDB) 50, 75, 105 | | | | |
| 3 | | | | | |
| 4 | Max. Loan Amount (Max LA) | | | 417000 | |
| 5 | Debt Service Constant (DSC) (6%, 30 year) | | | =IF(V7=0.06,0.0053682,IF(V7=0.0625,0.0055222,IF(V7=0.055,0.0056779,IF(V7=0.06,0.0059955,IF(V7=0.0625,0.0061572)))))  | |
| 6 | Max Front-End Ratio (MaxFE%) | | | 0.25 | |
| 7 | Max Back-End Ratio (MaxBE%) | | | 0.33 | |
| 8 | Min FICO Score | | | 680 | |
| 9 | Max Loan to value (Max LTV) | | | 0.95 | |
| 10 | Max Loan to value w/o MI | | | 0.8 | |
| 11 | MIP | | | 0.0032 | |
| 12 | Mortgage Insurance Factor (MIF) | | | =AB11/12 | |
| 13 | 1001. Hazard insurance reserve (mos.) | | 3 | =AA13*O5/12 | |
| 14 | 1002. Mortgage Insurance reserve | | 3 | =IF(H22=0,0,AA14*AB12*G28) | |
| 15 | 1004. County property taxes mos. @ $ /mo. | | 3 | =AA15/12*O7 | |
| 16 | 1005. Annual assessments | =0.83 | | =Z16/12*AA16 | |
| 17 | | | | | |

| | R | S | T | U | V | W | X | Y | Z | AA | AB |
|---|---|---|---|---|---|---|---|---|---|---|---|
| 2 | Loan P&P Database (LP&PDB) 50, 75, 105 | | | | | | Loan P&P Database (LP&PDB) 50, 75, 105 | | | | |
| 3 | | | | | | | | | | | |
| 4 | Loan Type: | | | | 30 Year Fixed | | Max. Loan Amount (Max. LA) | | | | $ 417,000.00 |
| 5 | Location: | | | | Y/N | | Debt Service Constant (DSC) (6%, 30 year.) | | | | 0.0059955 |
| 6 | Property Will Be: | | | | Primary Residence | | Max Front-End Ratio (MaxFE%) | | | | 0.25 |
| 7 | Interest Rate | | | | 0.06 | | Max Back-End Ratio (MaxBE%) | | | | 0.33 |
| 8 | Term (months) | | | | 360 | | Min. FICO Score | | | | 680 |
| 9 | 801. Loan Origination Fee % | | | | 0.01 | | Max Loan to Value (Max.LTV) | | | | 0.95 |
| 10 | 802. Loan Discount % | | | | 0.005 | | Max Loan to Value w/O MI | | | | 0.8 |
| 11 | 803. Appraisal Fee to | | | | $ 350.00 | | MIP | | | | 0.0032 |
| 12 | 804. Credit Report Fee | | | | $ 35.00 | | Mortgage Insurance Factor (MIF) | | | | 0.000266667 |
| 13 | 805. Lender's Inspection Fee | | | | $ - | | 1001. Hazard insurance reserve (mos.) | | | 3 | $ 350.00 |
| 14 | 806. Mortgage Ins. App. Fee | | | | $ 100.00 | | 1002. Mortgage Insurance reserve | | | 3 | $0.00 |
| 15 | 901. Interest from to @ $ per day | | | 15 | $975.98 | | 1004. County property taxes mos. @ $/mo. | | | 3 | $ 625.00 |
| 16 | 902. Mortgage Insurance Premium for mos | | | 0 | $ - | | 1005. Annual assessments | | $ 350.00 | 3 | $ 87.50 |
| 17 | 903. Hazard Insurance Premium for yrs. to | | | 1 | $ 1,400.00 | | | | | | |

*Fig. 1n*

| | AD | AE | AF | AG | AH | AI |
|---|---|---|---|---|---|---|
| 2 | Ancillary DB & Systems (ABD&S) 75. Service Providers (SP) | | | | | |
| 3 | Bills & Quotes 25, 35, 50, 59, 75 | | | | | |
| 4 | | | | | | |
| 5 | 803. Appraisal Fee to | | | | | 350 |
| 6 | 804. Credit Report to | | | | | 35 |
| 7 | | | | | | |
| 8 | | | | | | |
| 9 | 1101. Settlement or closing fee to | | | | | 250 |
| 10 | 1102. Abstract or title search to | | | | | 170 |
| 11 | 1103. Title examination to | | | | | 65 |
| 12 | 1104. Title insurance binder to | | | | | 35 |
| 13 | 1105. Document preparation to | | | | | 0 |
| 14 | 1106. Notary fees to | | | | | 10 |
| 15 | 1108. Title insurance to | | | | | =(AG16*AH16)+(AG17*AH17) |
| 16 | 1109. Lender's coverage | | | =G28 | 0.0025 | |
| 17 | 1110. Owner's coverage | | | =O4 | 0.002 | |
| 18 | | | | | | |
| 19 | 1201. Recording fees: | | | 0 | | |
| 20 | 1202. City/County tax/stamps: | | | 0.01 | | |
| 21 | 1203. State tax/stamps: | | | 0.005 | | |
| 22 | | | | | | |
| 23 | 1301. Survey to | | | | | 135 |
| 24 | 1302. Pest Inspection to | | | | | 45 |
| 25 | 1303. Broker Adm. Fee | | | | | 0 |
| 26 | 1304. Home Warranty | | | | | 350 |

| | AD | AE | AF | AG | AH | AI | AJ |
|---|---|---|---|---|---|---|---|
| 2 | Ancillary DB & Systems (ABD&S) 75. Service Providers (SP) Bids & Quotes 25, 35, 50, 59, 75 | | | | | | |
| 3 | | | | | | | |
| 4 | | | | | | | |
| 5 | 803. Appraisal Fee to | | | | | $ 350.00 | |
| 6 | 804. Credit Report to | | | | | $ 35.00 | |
| 7 | | | | | | | |
| 8 | | | | | | | |
| 9 | 1101. Settlement or closing fee to | | | | | $ 250.00 | |
| 10 | 1102. Abstract or title search to | | | | | $ 170.00 | |
| 11 | 1103. Title examination to | | | | | $ 65.00 | |
| 12 | 1104. Title insurance binder to | | | | | $ 35.00 | |
| 13 | 1105. Document preparation to | | | | | $ - | |
| 14 | 1106. Notary fees to | | | | | $ 10.00 | |
| 15 | 1108. Title insurance to | | | | | $ 2,039.54 | |
| 16 | 1109. Lender's coverage | | | $395,815.25 | 0.25% | | |
| 17 | 1110. Owner's coverage | | | $ 525,000.00 | 0.20% | | |
| 18 | | | | | | | |
| 19 | 1201. Recording fees: | | | 0 | | | |
| 20 | 1202. City/County tax/stamps: | | | 0.01 | | | |
| 21 | 1203. State tax/stamps: | | | 0.005 | | | |
| 22 | | | | | | | |
| 23 | 1301. Survey to | | | | | $ 135.00 | |
| 24 | 1302. Pest Inspection to | | | | | $ 45.00 | |
| 25 | 1303. Broker Adm. Fee | | | | | $ - | |
| 26 | 1304. Home Warranty | | | | | $ 350.00 | |

| | J | K | L | M | N | O | P |
|---|---|---|---|---|---|---|---|
| 20 | Underwriting Calculations (AU) to HUD 1 1/2 & Good Faith Estimate (GFE) Calculations | | | | | | |
| 21 | | | | | | | |
| 22 | 800. ITEMS PAYABLE IN CONNECTION WITH LOAN | | | | | | |
| 23 | | | | | | | |
| 24 | 801. Loan Origination Fee % | | | | =V9 | | =G28*N24 |
| 25 | | | | | | | |
| 26 | 802. Loan Discount % | | | | =V10 | | =G28*N26 |
| 27 | | | | | | | |
| 28 | 803. Appraisal Fee to | | | | =V11 | | =N28 |
| 29 | | | | | | | |
| 30 | 804. Credit Report to | | | | =A16 | | =N30 |
| 31 | | | | | | | |
| 32 | 805. Lender's Inspection Fee | | | | =V13 | | =N32 |
| 33 | | | | | | | |
| 34 | 806. Mortgage Ins. App. Fee | | | | =IF(H22=0, 0, V14) | | =N34 |
| 35 | | | | | | | |
| 36 | 807. Assumption Fee | | | | 0 | | 0 |
| 37 | | | | | | | |
| 38 | 808. to | | | | | | 0 |
| 39 | | | | | | | |
| 40 | 900. ITEMS REQUIRED BY LENDER TO BE PAID IN ADVANCE | | | | | | |
| 41 | | | | | | | |
| 42 | 901. Interest from to @ $ per day | | | | =G28*V7*U15/365 | | =N42 |
| 43 | | | | | | | |
| 44 | 902. Mortgage Insurance Premium for | | | | =IF(H22=0, 0, H22*G28) | =U16 mos. | =N44*O44 |
| 45 | | | | | | | |
| 46 | 903. Hazard Insurance Premium | | | =V17 | for | =U17 yr. | =M46*O46 |
| 47 | | | | | | | |
| 48 | 904. yrs. to | | | | | | 0 |
| 49 | | | | | | | |
| 50 | 1000. RESERVES DEPOSITED WITH LENDER FOR | | | | | | |
| 51 | | | | | | | |
| 52 | 1001. Hazard insurance mos. @ $ /mo. | | | | =AB13 | | =N52 |
| 53 | | | | | | | |
| 54 | 1002. Mortgage Insurance mos. @ $ /mo. | | | | =AB14 | | =N54 |
| 55 | | | | | | | |
| 56 | 1003. City property taxes mos. @ $ /mo. | | | | | | |
| 57 | | | | | | | |
| 58 | 1004. County property taxes mos. @ $ /mo. | | | | =AB15 | | =N58 |
| 59 | | | | | | | |
| 60 | 1005. Annual assessments | | | =AA16 | mos. | @ =Z16/12 | =M60*P60 |
| 61 | | | | | | | |
| 62 | 1006. mos. @ $ /mo. | | | | | | 0 |

*Fig. 1q*

| | J | K | L | M | N | O | P | Q |
|---|---|---|---|---|---|---|---|---|
| 20 | Underwriting Calculations (AU) 110 HUD-1 372 & Good Faith Estimate (CC&PPI) Calculations | | | | | | | |
| 21 | | | | | | | | |
| 22 | 800. ITEMS PAYABLE IN CONNECTION WITH LOAN | | | | | | | |
| 23 | | | | | | | | |
| 24 | 801. Loan Origination Fee % | | | | 0.01 | | | $3,958.15 |
| 25 | | | | | | | | |
| 26 | 802. Loan Discount % | | | | 0.005 | | | $1,979.08 |
| 27 | | | | | | | | |
| 28 | 803. Appraisal Fee to | | | | $ 350.00 | | $ | 350.00 |
| 29 | | | | | | | | |
| 30 | 804. Credit Report to | | | | $ 35.00 | | $ | 35.00 |
| 31 | | | | | | | | |
| 32 | 805. Lender's Inspection Fee | | | | $ - | | $ | - |
| 33 | | | | | | | | |
| 34 | 806. Mortgage Ins. App. Fee | | | | $ - | | $ | - |
| 35 | | | | | | | | |
| 36 | 807. Assumption Fee | | | | $ - | | $ | - |
| 37 | | | | | | | | |
| 38 | 808. to | | | | | | | |
| 39 | | | | | | | | |
| 40 | 900. ITEMS REQUIRED BY LENDER TO BE PAID IN ADVANCE | | | | | | | |
| 41 | | | | | | | | |
| 42 | 901. Interest from to @ $ per day | | | | $975.98 | | | $975.98 |
| 43 | | | | | | | | |
| 44 | 902. Mortgage Insurance Premium for | | | | $ - | | 0 mos. | |
| 45 | | | | | | | | |
| 46 | 903. Hazard Insurance Premium | | | $ 1,400.00 for | | | 1 yr. | $ 1,400.00 |
| 47 | | | | | | | | |
| 48 | 904. yrs. to | | | | | | | |
| 49 | | | | | | | | |
| 50 | 1000. RESERVES DEPOSITED WITH LENDER FOR | | | | | | | |
| 51 | | | | | | | | |
| 52 | 1001. Hazard insurance mos. @ $ /mo. | | | | $ 350.00 | | | $ 350.00 |
| 53 | | | | | | | | |
| 54 | 1002. Mortgage Insurance mos. @ $ /mo. | | | | $0.00 | | | $0.00 |
| 55 | | | | | | | | |
| 56 | 1003. City property taxes mos. @ $ /mo. | | | | | | | |
| 57 | | | | | | | | |
| 58 | 1004. County property taxes mos. @ $ /mo. | | | | $ 625.00 | | | $ 625.00 |
| 59 | | | | | | | | |
| 60 | 1005. Annual assessments | | | | | @ | $ 29.17 | 87.50 |
| 61 | | | | | | | | |
| 62 | 1006. | | | mos.@ $ | 3 mos. /mo. | | | - |

| | T | U | V | W | X | Y | Z |
|---|---|---|---|---|---|---|---|
| 20 | Underwriting Calculations a.k.a. HUD-1 Settlement Statement & Good Faith Estimate (GFE) Calculations | | | | | | |
| 21 | | | | | | | |
| 22 | 1100. TITLE CHARGES | | | | | | |
| 23 | | | | | | | |
| 24 | 1101. Settlement or closing fee to | | | | | | =AI9 |
| 25 | | | | | | | |
| 26 | 1102. Abstract or title search to | | | | | | =AI10 |
| 27 | | | | | | | |
| 28 | 1103. Title examination to | | | | | | =AI11 |
| 29 | | | | | | | |
| 30 | 1104. Title insurance binder to | | | | | | =AI12 |
| 31 | | | | | | | |
| 32 | 1105. Document preparation to | | | | | | 0 |
| 33 | | | | | | | |
| 34 | 1106. Notary fees to | | | | | | =AI14 |
| 35 | | | | | | | |
| 36 | 1108. Title insurance to | | | | | | =(W38*Y38)+(W40*Y40) |
| 37 | | | | | | | |
| 38 | 1109. Lender's coverage | | | =AG16 | @ | =AH16 | |
| 39 | | | | | | | |
| 40 | 1110. Owner's coverage | | | =AG17 | @ | =AH17 | |
| 41 | | | | | | | |
| 42 | | | | | | | |
| 43 | 1200. GOVERNMENT RECORDING AND TRANSFER CHARGES | | | | | | |
| 44 | | | | | | | |
| 45 | 1201. Recording fees: | | Deed | 40 | Mortgage | 40 | =W45+Y45 |
| 46 | | | | | | | |
| 47 | 1202. City/County tax/stamps | | Deed | =E27*G20 | Mortgages | | =X47 |
| 48 | | | | | | | |
| 49 | 1203. State tax/stamps | | Deed | =E27*G21 | Mortgages | | =X49 |
| 50 | | | | | | | |
| 51 | 1300. ADDITIONAL SETTLEMENT CHARGES | | | | | | |
| 52 | | | | | | | |
| 53 | 1301. Survey to | | | | | | 0 |
| 54 | | | | | | | |
| 55 | 1302. Pest Inspection to | | | | | | =AI23 |
| 56 | | | | | | | |
| 57 | 1303. Broker Adm Fee | | | | | | =AI24 |
| 58 | | | | | | | |
| 59 | 1304. Home Warranty | | | | | | 0 |
| 60 | | | | | | | |
| 61 | | | | | | | |
| 62 | 1400. TOTAL SETTLEMENT CHARGES | | | | | | =SUM(Q24:Q62,AA24:AA60) |

| | T | U | V | W | X | Y | Z | AA |
|---|---|---|---|---|---|---|---|---|
| 20 | Underwriting Calculations (AU) 110 HUD-1 372 & Good Faith Estimate (CC&PPI) Calculations | | | | | | | |
| 21 | | | | | | | | |
| 22 | 1100. TITLE CHARGES | | | | | | | |
| 23 | | | | | | | | |
| 24 | 1101. Settlement or closing fee to | | | | | | | $ 250.00 |
| 25 | | | | | | | | |
| 26 | 1102. Abstract or title search to | | | | | | | $ 170.00 |
| 27 | | | | | | | | |
| 28 | 1103. Title examination to | | | | | | | $ 65.00 |
| 29 | | | | | | | | |
| 30 | 1104. Title insurance binder to | | | | | | | $ 35.00 |
| 31 | | | | | | | | |
| 32 | 1105. Document preparation to | | | | | | | $ - |
| 33 | | | | | | | | |
| 34 | 1106. Notary fees to | | | | | | | $ 10.00 |
| 35 | | | | | | | | |
| 36 | 1108. Title insurance to | | | | | | | $ 2,039.54 |
| 37 | | | | | | | | |
| 38 | 1109. Lender's coverage | | | $395,815.25 | @ | 0.25% | | |
| 39 | | | | | | | | |
| 40 | 1110. Owner's coverage | | | $ 525,000.00 | @ | 0.20% | | |
| 41 | | | | | | | | |
| 42 | | | | | | | | |
| 43 | 1200. GOVERNMENT RECORDING AND TRANSFER CHARGES | | | | | | | |
| 44 | | | | | | | | |
| 45 | 1201. Recording fees | | Deed | $ 40.00 | Mortgage | $ 40.00 | | $ 80.00 |
| 46 | | | | | | | | |
| 47 | 1202. City/County tax/stamps | | Deed | | $ 5,250.00 | Mortgages | | $ 5,250.00 |
| 48 | | | | | | | | |
| 49 | 1203. State tax/stamps | | Deed | | $ 2,625.00 | Mortgages | | $ 2,625.00 |
| 50 | | | | | | | | |
| 51 | 1300. ADDITIONAL SETTLEMENT CHARGES | | | | | | | |
| 52 | | | | | | | | |
| 53 | 1301. Survey to | | | | | | | $ - |
| 54 | | | | | | | | |
| 55 | 1302. Pest Inspection to | | | | | | | $ 135.00 |
| 56 | | | | | | | | |
| 57 | 1303. Broker Adm. Fee | | | | | | | $ 45.00 |
| 58 | | | | | | | | |
| 59 | 1304. Home Warranty | | | | | | | $ - |
| 60 | | | | | | | | |
| 61 | | | | | | | | $ 350.00 |
| 62 | 1400. TOTAL SETTLEMENT CHARGES | | | | | | | $20,815.25 |

| | C | D | E | F | G | |
|---|---|---|---|---|---|---|
| 20 | Underwriting Calculations (AU) 110 | | | | | |
| 21 | | | | | | |
| 22 | 101, 401, Sale Price | | =O4 | | PMI (Y, N) | =IF(G28<=AB10,E22, AB12, 0) |
| 23 | | | | | | |
| 24 | MtDP&CC | | =H7 | | | |
| 25 | | | | | | |
| 26 | CC&PPI | | =AA52 | | | |
| 27 | | | | | | |
| 28 | 202, Principal amount of new loans(s) (LA) | | | | =E22-E24+E26 | |
| 29 | | | | | | |
| 30 | FICO Credit Score > or = Min. FICO Score for Loan Product | | | | | =IF(AB6<=H8, "Yes", "No") |
| 31 | | | | | | |
| 32 | Calculate Housing Payment (HP = PI + TI + HOA + MI) | | | | =SUM(E34:E38) | |
| 33 | | | | | | |
| 34 | | PI | =G28*AB5 | | | |
| 35 | | T | =O7/12 | | | |
| 36 | | I | =O5/12 | | | |
| 37 | | HOA | =O8/12 | | | |
| 38 | | MI | =IF(H22=0, 0, H22*G28) | | | |
| 39 | | | | | | |
| 40 | Calculate if LA < or = Max LA for Loan Product (Yes, No) | | | | | =IF(G28<=AB4, "Yes", "No") |
| 41 | | | | | | |
| 42 | Calculate if LTV < or = Max LTV for Loan Product (Yes, No) | | | | | =IF(G28/E22<=AB9, "Yes", "No") |
| 43 | | | | | | |
| 44 | Calculate Max. Housing Payment (MaxHP) = Lesser of: | | | | | |
| 45 | | | | | | |
| 46 | MaxFEHP = GMoInc x Max FE% | | | | | =H5*AB6 |
| 47 | | | | | | |
| 48 | MaxBEHP = (GMoInc x Max BE%) - Mo Debit Payments (MoDP) | | | | | =H5*AB7-48 |
| 49 | | | | | | |
| 50 | MaxHP = lesser of MaxFEHP or MaxBEHP | | | | | =IF(H46<H48, H46, H48) |
| 51 | | | | | | |
| 52 | Calculate HP < or = Max. Housing Payment (MaxHP) (Yes, No) | | | | | =IF(G32<=H50, "Yes", "No") |
| 53 | | | | | | |
| 54 | Does Buyer, Property, ect. Meet Loan Product and Underwriting Criteria | | | | | =IF(H30=H40=H52, "Display", "Don't Display") |

*Fig. 1u*

| | C | D | E | F | G | H |
|---|---|---|---|---|---|---|
| 20 | Underwriting Calculations (AU) 110 | | | | | |
| 21 | | | | | | |
| 22 | 101. 401. Sale Price | | $525,000.00 | | PMI (Y, N) | 0.0000000000 |
| 23 | | | | | | |
| 24 | MfDP&CC | | $150,000.00 | | | |
| 25 | | | | | | |
| 26 | CC&PPI | | $20,815.25 | | | |
| 27 | | | | | | |
| 28 | 202. Principal amount of new loan(s) (LA) | | | | $395,815.25 | |
| 29 | | | | | | |
| 30 | FICO Credit Score > or = Min. FICO Score for Loan Product | | | | | Yes |
| 31 | | | | | | |
| 32 | Calculate Housing Payment (HP = PI + TI + HOA + MI) | | | | $2,727.28 | |
| 33 | | | | | | |
| 34 | | PI | $2,373.11 | | | |
| 35 | | T | $ 208.33 | | | |
| 36 | | I | $ 116.67 | | | |
| 37 | | HOA | 29.17 | | | |
| 38 | | MI | $0.00 | | | |
| 39 | | | | | | |
| 40 | Calculate if LA < or = Max LA for Loan Product (Yes, No) | | | | | Yes |
| 41 | | | | | | |
| 42 | Calculate if LTV < or = Max.LTV for Loan Product (Yes, No) | | | | | Yes |
| 43 | | | | | | |
| 44 | Calculate Max. Housing Payment (MaxHP) = Lesser of: | | | | | |
| 45 | | | | | | |
| 46 | MaxFEHP = GMoInc x Max FE% | | | | | $ 7,500.00 |
| 47 | | | | | | |
| 48 | MaxBEHP = (GMoInc x Max BE%) - Mo Debt Payments (MoDP) | | | | | $ 4,900.00 |
| 49 | | | | | | |
| 50 | MaxHP = lesser of MaxFEHP or MaxBEHP | | | | | $ 4,900.00 |
| 51 | | | | | | |
| 52 | Calculate HP < or = Max. Housing Payment (MaxHP) (Yes, No) | | | | | Yes |
| 53 | | | | | | |
| 54 | Does Buyer, Property, ect. Meet Loan Product and Underwriting Criteria | | | | | Display |

110

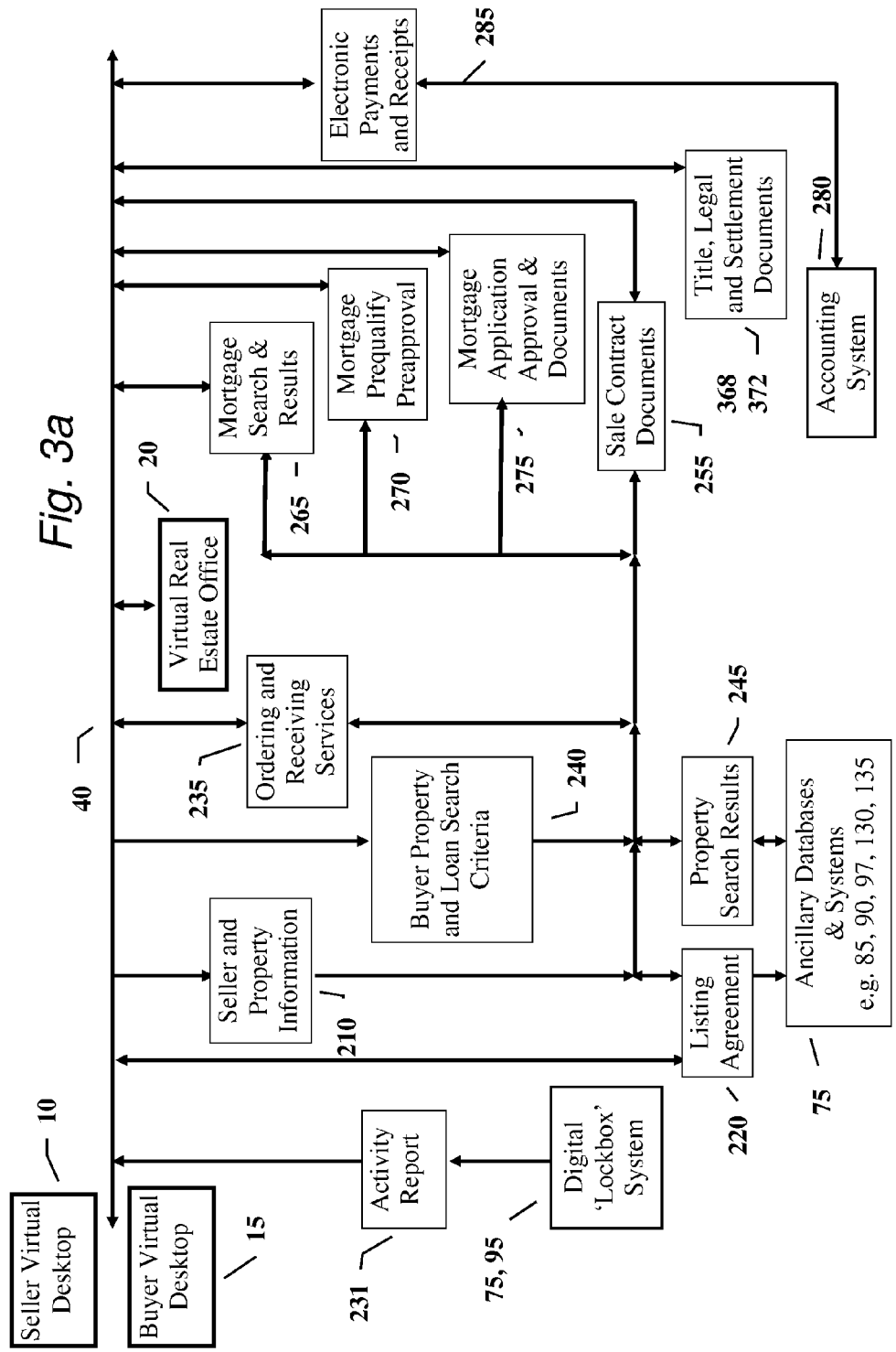

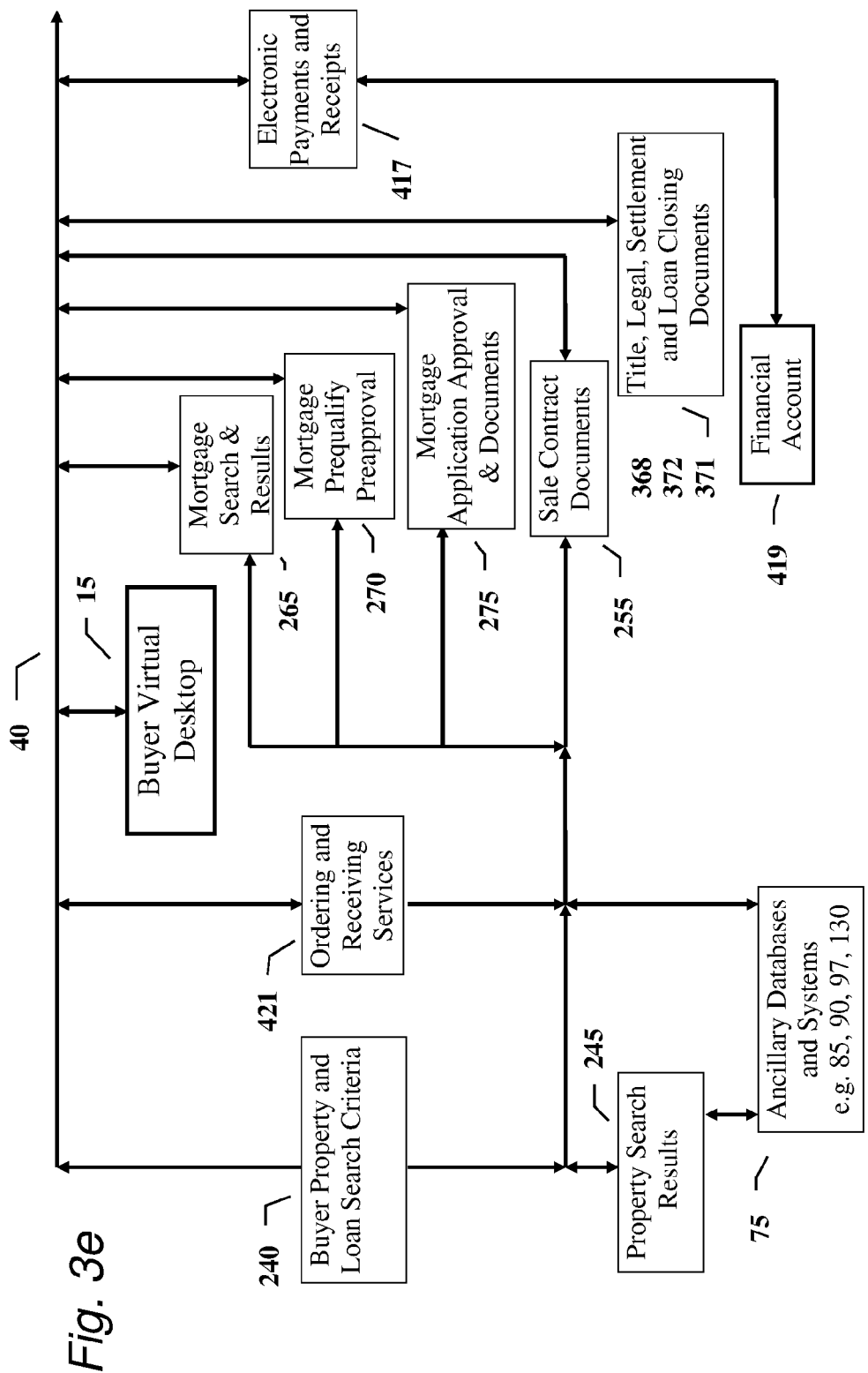

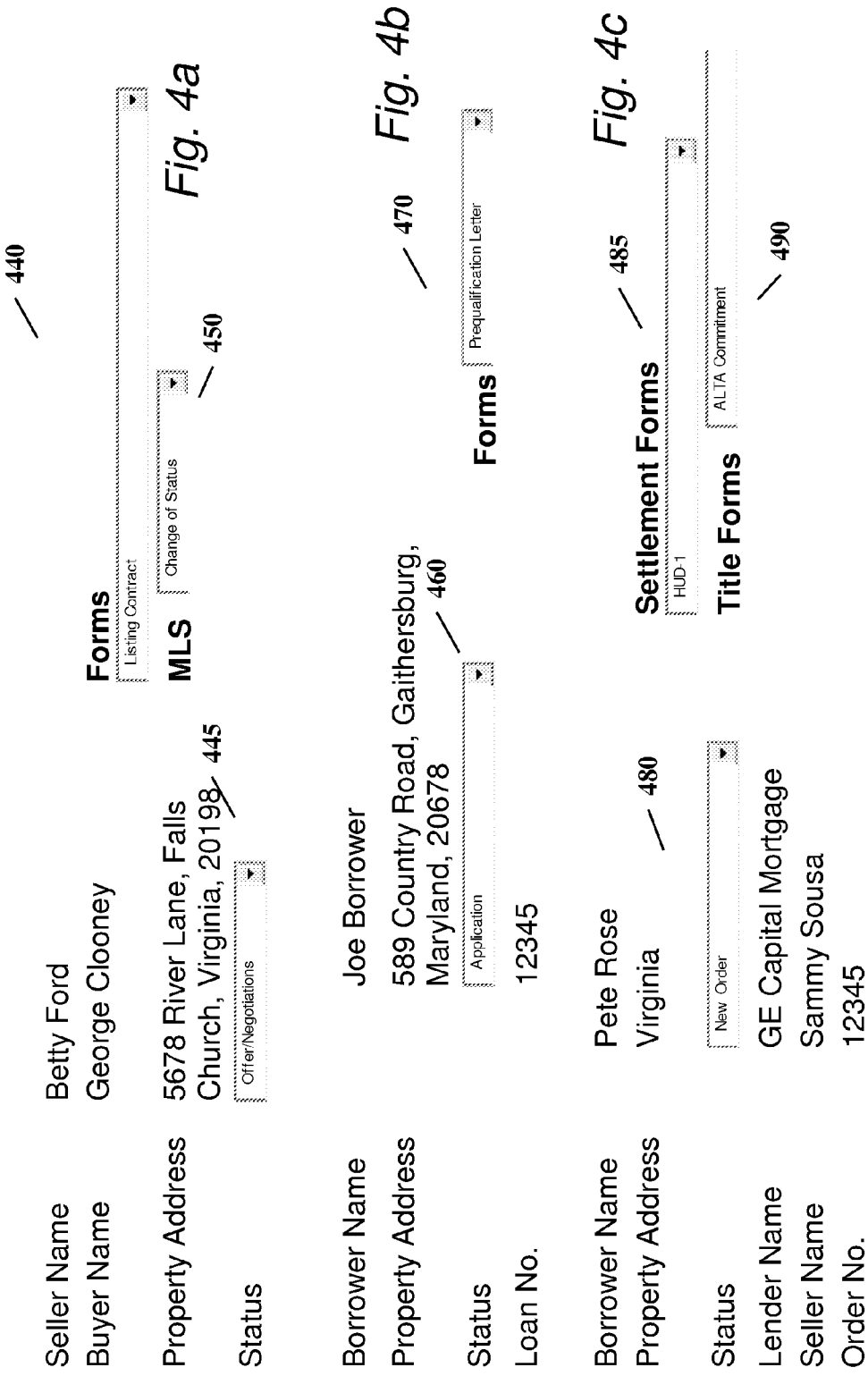

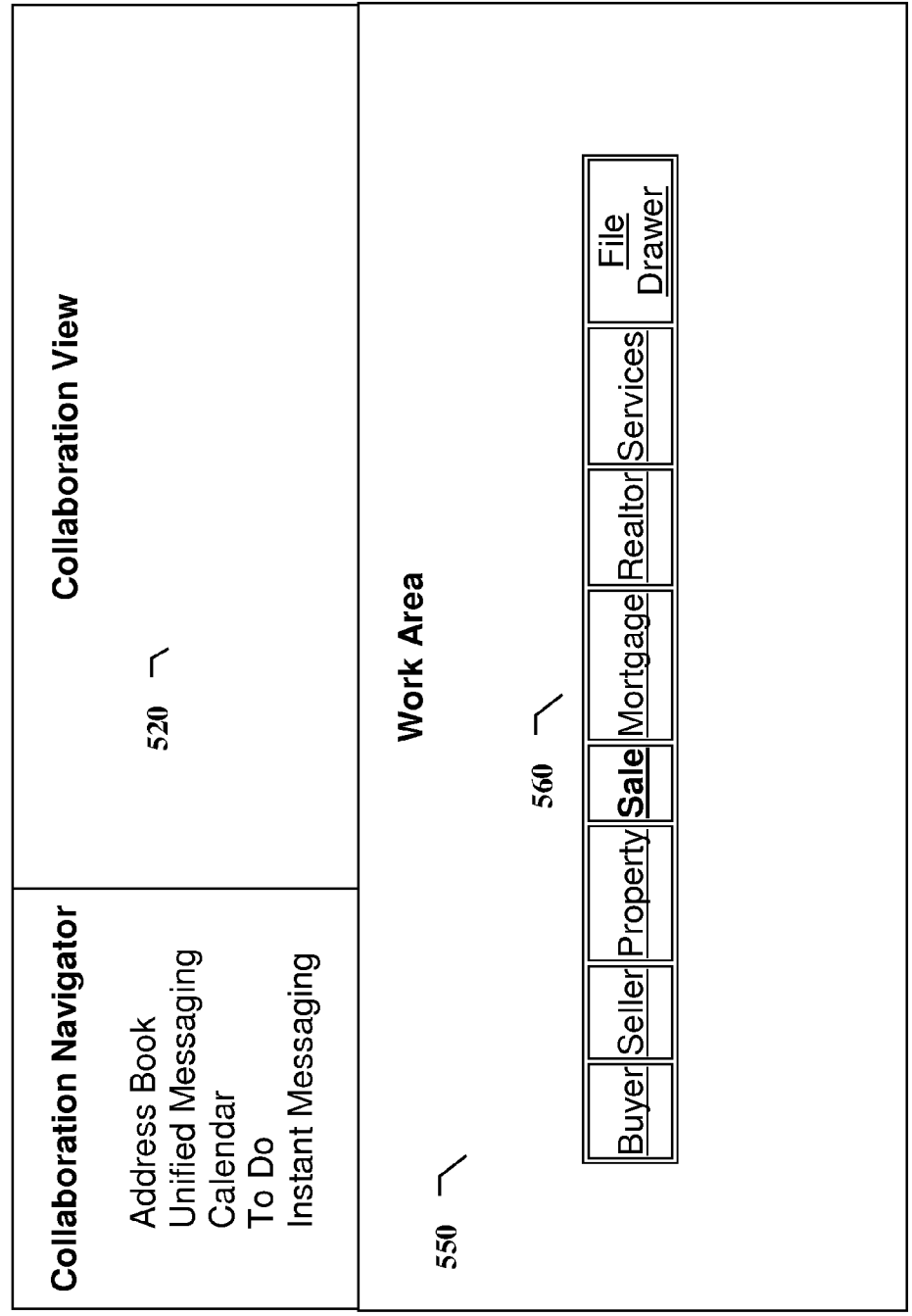

*Calendar*

← Previous                                                                    Next →

July 2003                                                                  July 2

21 Monday
05:45 PM    Sam Seller Must Have Pool Cleaned at 123 Elm Street

Thursday
                                        03:30 PM -04:30 PM  Settlement for 123 Elm Street
                                                            Chair: Lana Cloud

22 Tuesday
10:30 AM - 11:30 AM    Termite Inspection for 123 Elm Street
                       Chair: Lana Cloud

Friday
                                        05:30 PM - 06:30 PM  ABC Sign remove sign at 123 Elm Street
                                                             Chair: Lana Cloud

23 Wednesday
10:30 AM    ABC Mortgage Co. Must Send Instructions and Documents to Settlement Co. for Joe Buyer on 123 Elm Street 04:30 PM - 05:30 PM    Buyer Walk-thru Final Inspection for 123 Elm Street
                       Chair: Lana Cloud

Saturday

Sunday

| Buyer | Seller | Property | Sale | Realtor | Mortgage | Services | File Drawer |
|---|---|---|---|---|---|---|---|

— 810

| Subject ⇵ | Date ⇵ | Author ⇵ |
|---|---|---|
| Comparative Market Analysis | 07/19/2000 | Roger Realtor |
| Policy Of Title Insurance | 08/24/2000 | ABC Settlement Co. |
| Prequalification Letter | 05/20/2002 | Chase Mortgage |
| Jim Roberts wants to prequalify | 05/14/2001 | Roger Realtor |
| Marketing Proposal | 07/19/2000 | Roger Realtor |
| Title Policy Endorsement | 08/24/2000 | Chase Mortgage |
| Good Faith Estimate | 12/12/2001 | Chase Mortgage |
| Residential Contract Of Sale | 07/19/2000 | Roger Realtor |
| Exclusive Right To Sell Listing Agreement | 07/24/2000 | Roger Realtor |
| Mortgage Loan Documents | 12/12/2001 | Chase Mortgage |

| | Property Address | Seller Name | Contract Price | Contract Date | Contract Expires | Buyer Name |
|---|---|---|---|---|---|---|
| New Buyer | | | | | | |
| New Seller | | | | | | |
| Prospect- Buyers | 345 Blue Ridge Ct., Arlington, Virginia, 22177 | Diane Farrington | 575000 | 08/07/2001 | 10/06/2001 | Bobby Bragalot |
| | 123 Elm Street, Silver Spring, Maryland | Bill Seller | 375000 | 01/15/2002 | 03/16/2002 | Alex Gorlenko |
| Prospect- Sellers | 7802 Loan Oak Cir., McLean, Virginia, 21770 | Ralph Nader | 975000 | 02/15/2002 | 04/16/2002 | Jack Smith |
| Listings | 345 Dolly Madison, McLean, Virginia, 21222 | James Madison | 1050000 | 01/15/2002 | 03/16/2002 | Alex Gorlenko |
| Contracts | 8429 Greenbelt Rd #201, Greenbelt, Maryland, 20770 | HUD | 66000 | 02/10/2002 | 04/11/2002 | Jim Roberts |
| Sold | 3456 River Road, Potomac, Maryland, 20822 | Henry Hudson | 500000 | 02/10/2002 | 04/11/2002 | Jack Szalasny |
| Office Management | 7802 Hanover Pkwy., Bethesda, Maryland, 20814 | Rickey Ricardo | 117000 | 12/20/2001 | 02/18/2002 | Fred Mertz |

920

| Status | Loan | Inspect | Radon | Term | HOA | W/T Util | HUD-1 | Sett Date | Sett Co | Comm $ | Comm Rec'd |
|---|---|---|---|---|---|---|---|---|---|---|---|
| Under Contract | 1 | 1 | 1 | 1 | 1 | 1 | 1 | 1 | 1 | 1 | 1 |
| Inspections - Home | 2 | 2 | 2 | 2 | 2 | 2 | 2 | 2 | 2 | 2 | 2 |
| Settlement Scheduled | 3 | 3 | 3 | 3 | 3 | 3 | 3 | 3 | 3 | 3 | 3 |
| Under Contract | 4 | 4 | 4 | 4 | 4 | 4 | 4 | 4 | 4 | 4 | 4 |
| Under Contract | 5 | 5 | 5 | 5 | 5 | 5 | 5 | 5 | 5 | 5 | 5 |
| Financing Contingency | 6 | 6 | 6 | 6 | 6 | 6 | 6 | 6 | 6 | 6 | 6 |
| Financing Approved | 7 | 7 | 7 | 7 | 7 | 7 | 7 | 7 | 7 | 7 | 7 |

*Fig. 10*

| Buyer | Seller | Property | Real Estate Broker | Sale | Mortgage | Services | File Drawer |

Seller Information

Seller Name: Betty Ford
Street Address: 5678 River Lane
Address
City: Falls Church
State: VA
ZIP: 20198
Home Phone: 703-555-1212
Work Phone: 703-987-6543
Fax:
Cell:
Pager:
E-mail:

Seller Attorney
Seller Attorney Phone No.

Co-Seller Information

Seller Name:
Street Address:
Address
City:
State:
ZIP:
Home Phone:
Work Phone:
Fax:
Cell:
Pager:
E-mail:

*Fig. 11*

| General | Utilities, Insurance, HOA/Condo | Taxes | Title and Legal |

Location

Street Address:: (Form 1003)  5678 River Lane

Address (Cont.):
Unit No.
City:  Falls Church
Township
County,
State:  Virginia
ZIP Code:  20198

MAPS

PHOTOS

Details

Property Type  Single Family Detached
Property Style
No. of Units (Form 1003)  1
Number of Floors  2
Number of Bedrooms  5 Bedrooms
Number of Full Baths  4
Number of Half Baths  5+
Land Area  6,500 s.f.
Amenities:  Barrier Free
Land Zoning:
Finished Building Area  2,100
Year built: (Form 1003)  1963
Basement
Garage  None - Street Parking
Water & Sewer  Public Water

Fig. 12

| Buyer Information | Employment Information |

Buyer Information

| Buyer Name: | George |
| Social Security Number (Form 1003) | |
| Age | |
| Yrs. School | |
| Street Address: | |
| Address (Cont.): | |
| City: | |
| State: | Alaska |
| ZIP: | |
| ☐ Own ☐ Rent |
| ☐ No Yrs. |
| If residing at present address for less than two years complete the following |
| Former Address (street, city, state, ZIP) | ☐ Own ☐ Rent |
| Home Phone: | |
| Work Phone: | |
| Fax: | |
| No Yrs. | |
| Cell: | |
| ☐ Married ☐ Separated |
| ☐ Unmarried (single divorced widowed) |
| Pager: | |
| E-mail: | |
| Dependents (not listed by Co-Borrower) no. ages |

Co-Buyer Information

| Buyer Name: | |
| Social Security Number | |
| (Form 1003) | |
| Age | |
| Yrs. School | |
| Street Address: | |
| Address (Cont.): | |
| City: | |
| State: | Alaska |
| ZIP: | |
| ☐ Own ☐ Rent |
| ☐ No Yrs. |
| If residing at present address for less than two years complete the following |
| Former Address (street, city, state, ZIP) | ☐ Own ☐ Rent |
| Home Phone: | |
| Work Phone: | |
| Fax: | |
| No Yrs. | |
| Cell: | |
| ☐ Married ☐ Separated |
| ☐ Unmarried (single divorced widowed) |
| Pager: | |
| E-mail: | |
| Dependents (not listed by Borrower) no. ages |

| MONTHLY INCOME INFORMATION | | | |
|---|---|---|---|
| Gross Monthly Income | Borrower | Co-Borrower | Total |
| Base Employment Income * | $ | $ | $ |
| Overtime | | | |
| Bonuses | | | |
| Commissions | | | |
| Dividends/Interest | | | |
| Net Rental Income | | | |
| Other (before completing, see the notice in "describe other income," below) | | | |
| Total | $ | $ | $ |

* Self Employed Borrower(s) may be required to provide additional documentation such as tax returns and financial statements

| B/C | Describe Other Income *Notice*: Alimony, child support, or separate maintenance income need not be revealed if the Borrower (B) or Co-Borrower (C) does not choose to have it considered for repaying this loan. | Monthly Amount |
|---|---|---|
| ☐ B ☐ C | | $ |
| ☐ B ☐ C | | |
| ☐ B ☐ C | | |

Fig. 12c

Liabilities and Pledged Assets. List the creditor's name, address and account number for all outstanding debts, including automobile loans, revolving charge accounts, real estate loans alimony, child support stock pledges etc. use continuation sheet, if necessary. Indicate by (*) those liabilities which will be satisfied upon sale of real estate owned or upon refinancing of the subject property.

| LIABILITIES | Monthly Pmt. & Mos. Left to Pay | Unpaid Balance |
|---|---|---|
| Name and address of Company<br>Attention:<br>Acct. no.<br>In Name of: ☐ Borrower ☐ To Be Paid Off | $ _____ Mos. Left to Pay | $ |
| Name and address of Company<br>Attention:<br>Acct. no.<br>In Name of: ☐ Borrower ☐ To Be Paid Off | $ _____ Mos. Left to Pay | $ |
| Alimony/Child Support/Separate Maintenance Payments Owed to: | $ | |
| Job Related Expense (child care, union dues, etc.) | $ | |
| Total Monthly Payments | $ | |
| Net Worth (a minus b) $ | Total Liabilities b. | $ |

Fig. 12d

| Source | Amount |
|---|---|
| Sale of Current Residence | $ |
| Savings | $ |
| Liquidation of Investments | $ |
| Sale of Personal Property | $ |
| Gift | $ |
| Subordinate Financing | $ |
| Seller Financing | $ |
| Other | $ |
| Total | $ |

Fig. 13

Search For Home

| State | Maryland |
| Zip Codes | |
| City | |
| County | |
| Subdivision | |
| Property Type | Single Family Detached |

Price Range $ [No minimum] to $ [No maximum]
Min. Bedrooms [4]
Min. Full Baths [3]
Min. Half Baths [Any]
School District

— 1330

/— 1350

| Photo | Address | Price ▲ | Property Type ▲ | Beds ▲ | Baths ▲ | Description |
|---|---|---|---|---|---|---|
| | Gaithersburg | $250000 | Single Family Detached | 3 | 1 1/2 | (This beautiful home has a pool and tennis courts...more) |
| | Gaithersburg | $279900 | Single Family Detached | 3 | 3 | This two level home built in 1986 has 3 bedroom(s), 3 full bath(s) and is approximately 1305 sq...(more) |
| | Gaithersburg | $250000 | Single Family Detached | 4 | 2 1/2 | This three level home built in 1978 has 4 bedroom(s), 2 full bath(s), 1 half bath(s)...(more) |
| | Rockville | $200000 | Single Family Detached | 3 | 2 | This two level home built in 1973 has 3 bedroom(s), 2 full bath(s), 1 half bath(s)...(more) |

Fig. 13a

Search For Home

| | | | |
|---|---|---|---|
| State | Maryland ▼ | Price Range | $ [No minimum ▼] to $ [No maximum ▼] |
| Zip Codes | | Min. Bedrooms | 4 ▼ |
| City | | Min. Full Baths | 3 ▼ |
| County | | Min. Half Baths | Any ▼ |
| Subdivision | | School District | |
| Property Type | Single Family Detached ▼ | | |

— 1330
— 1360
— 1350

| Photo | Address | Price ▲ | Property Type ▲ | Beds ▲ | Baths ▲ | Description | Financial Details |
|---|---|---|---|---|---|---|---|
| [img] | Gaithersburg | $250000 | Single Family Detached | 3 | 1 1/2 | (This beautiful home has a pool and tennis courts...more) | Down Payment $14,150<br>& Closing Costs $17,550<br>PITI  $ 1,250<br>HOA  $<br>35<br>Utilities (Ave.) $<br>376<br>Good Faith Estimate |
| [img] | Gaithersburg | $279900 | Single Family Detached | 3 | 3 | This two level home built in 1986 has 3 bedroom(s), 3 full bath(s) and is approximately 1305 sq...(more) | Down Payment $19,250<br>& Closing Costs $21,550<br>PITI  $ 1,475<br>Good Faith Estimate |

Fig. 13aa

| Buyer | Search for Property | Sale | Mortgage | Services | File Drawer |

State: Maryland
Zip Codes:
City:
County:
Subdivision:
Property Type: Single Family Detached
Downpayment: 300000
FICO Score: Very Good 720 to 749

Search for Property

Price Range: $ No minimum to $ No maximum
Min. Bedrooms: Any
Min. Full Baths: Any
Min. Half Baths: Any
School District:
Gross Monthly Income: 25000.00
Monthly Debt Payments: 2000.00

— 1350
— 1330
— 245
— 265, 270, 275
— 255
— 1660 / 1670

| City | Price | Type | Bedrooms | Baths | Year | Amenities |
|---|---|---|---|---|---|---|
| Rockville | 450000 | Single Family Detached | 4 Bedrooms | 3 | 1998 | Whirlpool Gym Senior/Retirement |

Change purchase price $ 450000
Change downpayment $ 300000
Change loan type 30 Year Fixed
Recalculate

| Lender | Type | Amount | Interest | APR | Points | Monthly Payments | Closing Costs | Lock-in | |
|---|---|---|---|---|---|---|---|---|---|
| ABC Mortgage | 30 Year Fixed | 166036.78 | 4.625 | 6.15 | 3 | 1335.99 | 18036.78 | 30 | Good Faith Estimate   Apply |
| Country Wide Mortgage | 30 Year Fixed | 164343.54 | 4.75 | 6.15 | 2 | 1340.63 | 14343.54 | 60 | Good Faith Estimate   Apply |
| US Bank Mortgage | 30 Year Fixed | 162684.48 | 4.875 | 6.15 | 1 | 1344.28 | 12684.48 | 45 | Good Faith Estimate   Apply |

Submit Contract

1630 —

| City | Price | Type | Bedrooms | Baths | Year |
|---|---|---|---|---|---|
| Silver Spring | 500000 | Single Family Detached | 4 Bedrooms | 3 | |

Change purchase price $ 500000
Change downpayment $ 300000
Change loan type 30 Year Fixed
Recalculate

| Lender | Type | Amount | Interest | APR | Points | Monthly Payments | Closing Costs | Lock-in | |
|---|---|---|---|---|---|---|---|---|---|
| ABC Mortgage | 30 Year Fixed | 218905.5 | 4.625 | 6.15 | 3 | 1675.48 | 18905.5 | 30 | Good Faith Estimate   Apply |
| Country Wide Mortgage | 30 Year Fixed | 216673.1 | 4.75 | 6.15 | 2 | 1680.28 | 16673.1 | 60 | Good Faith Estimate   Apply |
| US Bank Mortgage | 30 Year Fixed | 214485.78 | 4.875 | 6.15 | 1 | 1685.08 | 14485.78 | 45 | Good Faith Estimate   Apply |

Submit Contract

Home Search

State: Maryland
Zip Codes:
City: Kensington
Property Type: Single Family Detached Price Range: $ No minimum to $ No maximum — 1330
Min. Bedrooms: 4
Min. Full Baths: 3
Min. Half Baths: Any

Search for a Mortgage

Full Name: Joseph P. Smith
SS No.: 111-22-3333
Monthly Income: $ 15000.00
Monthly Debt Payments: $ 1000
Property will Be: Primary Residence What type loan?: 30 Year Fixed Rate / 15 Year Fixed Rate / 10/1 ARM / 7/1 ARM — 1630
Down Payment: $ 20000
Run my credit score: 720

Order one or more Services (Select all, one or more and you will receive quotes shortly and again later in the selling process when the service is needed.)

Real Estate Agent
Contractor Home Improvement
Home Warranty
Home Inspection
Insurance - Homeowners
Settlement

— 1920

Search for Home, Mortgage and All        All information is automatically saved for the entire sale process

Search For Home

State: Maryland
Zip Codes:
City:
County:
Subdivision:
Property Type: Single Family Detached — 240

Price Range: $ No minimum to $ No maximum — 1330
Min. Bedrooms: Any
Min. Full Baths: Any
Min. Half Baths: Any
School District:

Search for Mortgage Quotes — 240

First Name:
Last Name:
E-mail:
Loan Type: 30 Year Fixed
PreApprove Me

○ My FICO Credit Score Is
○ Please Obtain My Credit Report

Number of Buyers: 1 — 1630
Gross Monthly Income:
Monthly Debt Payments:
Property Will Be: Primary Residence
Money For Down Payment and Closing Costs:

☐ First-time Homebuyer

[ Search for Home, Mortgage Loan and All Services ]

Fig. 13c

| Buyer | Seller | Property | Real Estate Broker | Sale | Mortgage | Services | File Drawer |

| Listing | Sale | Existing Financing |

Sale Information

Offer Date: 01/15/2002
Contract Date: 01/15/2002
Deposit: $
Deposit Interest: $
Deposit Held by:
Contract Price: $ 375000
Personal Property: $ Dollars
Financing Contingency Date: 03/15/2002
Settlement Date: 03/15/2002

*Fig. 14*

CONTRACT OF SALE

*Fig. 15*

1. DATE OF OFFER:

2. SELLER: NAME:

3. BUYER: NAME:       / 1505

4. PROPERTY DESCRIPTION: Seller does sell to Buyer all of the following described Property (hereinafter "Property") known as Street,   City,   County,   State,   Zip   together with the improvements thereon, and all rights and appurtenances thereto.

5. ESTATE: The Property is being conveyed: [Fee simple ▼]  / 1510

6. PURCHASE PRICE: The purchase price is

[Two Hundred Fifty Thousand & 00/100] Dollars ($ 250,000 ). Buyer shall pay Twenty Five Thousand & 00/100 ($25,000) down. Buyer has arranged a new first mortgage of Two Hundred Twenty-five Thousand & 00/100 dollars ($225,000) 30 year fixed rate at 5.5% with monthly payment of $2,550 (PI) Chevy Chase Bank, Loan No. 123456, as evidenced by commitment letter attached hereto.

7. SETTLEMENT AND SETTLEMENT COSTS: Date of Settlement

Seller and Buyer agree to pay the following fees and charges:  / 1520

| | | |
|---|---|---|
| 800. ITEMS PAYABLE IN CONNECTION WITH LOAN | $ | $ |
| 801. Loan Origination Fee   % | $ | $ |
| 803. Appraisal Fee   to | $ | $ |
| 804. Credit Report   to | $ | $ |
| 1000. RESERVES DEPOSITED WITH LENDER | $ | $ |
| 1004. County property taxes   mos. @ $ | $ | $ |
| 1200. GOVERNMENT RECORDING AND TRANSFER CHARGES | $ | $ |
| 1201. Recording fees: Deed $  ; Mortgage $ | $ | $ |
| 1202. City/County tax/stamps: Deed $ ; Mortgages $ | $ | $ |

| 303. CASH  From  To BORROWER | $ | 603. CASH  From  To SELLER | $ |
|---|---|---|---|

Fig. 16

Search & Prequalify

| | |
|---|---|
| How many borrowers | 2 |
| Purpose of loan | Purchase |
| Property type | Single Family Detached |
| Property will be | Primary Residence |
| State where property is located | Maryland |
| Monthly income | $ $50000.00 |
| Monthly debt payments | $ 10000 |
| What type of loan do you want? | Are you a Veteran who wants to use your Department of Veteran Affairs (VA) eligibility? Is buyer a 'first-time homebuyer?' If so, he may be eligible for certain government-sponsored savings when he purchases a home. |
| Money for down payment | $ 20000 |
| Purchase price | $ 1000000 |

Select Mortgage Lenders

| Lender | Amount | Type | Interest Rate | APR | Points | Monthly P&I | Closing Costs | Cash Required | Lock-in Period | |
|---|---|---|---|---|---|---|---|---|---|---|
| B. F. Saul Mortgage | $450,000 | 30 Year | 6% | 6.111% | 1 | $3,456 | $5,678 | $56,789 | 60 | Apply |
| Citi Mortgage | $435,000 | 15 Year | 6.125% | 6.234% | 0 | $4,432 | $6,789 | $67,890 | 30 | Apply |
| B of A | $375,000 | 10/1 | 5.875% | 6.123% | 1 | $2,456 | $3,456 | $45,678 | 45 | Apply |

B. F. Saul Mortgage Company

Dear New Buyer One:

We are pleased to prequalify you for the following loan:

| Principal Amount: | $450,000.00 | Purpose of Loan | Purchase |
|---|---|---|---|
| Interest Rate | 6% | Property will be APR | Primary Residence 6.11% |
| Type of Loan | 30 Year Fixed Rate | Points | 1 |
| Loan Term | 30 Years | Monthly Payment (P&I) | $1,234.00 |

Your loan will be conditioned upon the receipt of satisfactory:
A fee of $450 for the cost of Credit Report and an Appraisal
Residential Loan Application
Credit Report
Appraisal
Verification of Employment
Verification of Assets
Copy of past two years W2 forms for each borrower
Most recent pay-stubs for most recent 30-day period for each borrower
Most recent bank statements - all pages - for investment, savings and checking accounts Please review the Good Faith Estimate and HUD Handbook we are sending you with this prequalification letter pursuant to the Real Estate Settlement Procedures Act of 1974, as amended (RESPA).

The Good Faith Estimate is the best estimate at this time of your expected settlement costs. We would suggest you contact a number of settlement companies to get the best price on your settlement and title services.
Thank you for applying for a loan with B. F. Saul Mortgage Company

☐ ACCEPT LETTER

Fig. 18

| | Buyer | Property | Mortgage | File Drawer |
|---|---|---|---|---|
| | Prequalified | | Mortgage Lender | |
| How many borrowers | 2 | | Monthly income | $ 10,000 | |
| Purpose of loan | Purchase | | Monthly debt payments | $ 1,000 | |
| Property type | Single Family Detached | | Borrower requested loan quotes for following type of mortgages | 30 Year Fixed Rate | |
| Property will be | Primary Residence | | | | |
| State where property is located | Maryland | | | | |
| Money for down payment | $ 50,000 | | Purchase price | $ 500,000 | |
| Loan amount | $ 450,000 | | Points | 1 | |
| Interest rate | 6.00% | | APR | 6.11% | |
| Monthly Payments (P&I) | $ 1,234 | | Closing costs | $ 2,345 | |
| Cash To/From borrower | $ 45,000 | | Lock-in period | 60 | |
| Fees | $ 450 | | | | |
| Conditions | Residential Loan Application<br>Credit Report<br>Appraisal<br>Verification of Employment<br>Most recent pay-stubs for most recent 30-day period for each borrower<br>Verification of Assets<br>Most recent bank statements - all pages - for investment, savings and checking accounts to verify amounts on application<br>If Self-employed: Copies of complete signed last two years 1040's (Federal Income Tax Returns) with all schedules and a current year-to-date profit & loss statement/balance sheet | | | | |

Fig. 20

| Order New Service | Utilities - Electric | Advertising - Signs | Advertising - Magazine | Home Inspection | Home Inspection - Termite |

Service Order Status: Bidding

Order Details
Type Of Service — Full Service
Due date — 07/26/2001
Fee/Premium Amount
Fee/Premium Paid By — Buyer/Borrower
Billing Arrangement — HUD-1
Billing Account No — NA
HUD 1 Line
Instruction Comments — Please check the roof, and all utilities and mechanical systems. Access is by appointment with agent Ordered By
Order Made on

/ 2030

| | Company Name | Service Fee | Service Date |
|---|---|---|---|
| ● | ABC Inspections | $150.00 | 07/30/2001 |
| ☐ | Dogwood Contractors | $235.00 | 07/28/2001 |
| ☐ | Fast Work Contractors | $350.00 | 07/26/2001 |

Lowest Bid/Quote Results

| | | |
|---|---|---|
| Real Estate Agent, Discount Agent, or 'Move Consultant' | $2500 | Accept |
| Complete Home Inspection | $250 | Accept |
| Pest Inspection | $50 | Accept |
| Homeowners Insurance (12 mo) | $765 | Accept |
| Settlement | $650 | Accept |
| Title Insurance (Owners and Lenders) | $1300 | Accept |
| Survey | $150 | Accept |
| Total | $5665 | Accept All and Relax! |

Fig. 20a

BID REQUEST FOR SERVICE

FORMS — 2110 / 2120

Fig. 21

| Order Information | Property | Sale | Mortgage | Realtor | File Drawer |
|---|---|---|---|---|---|
| Property Address | Maryland | | | | |
| Type Of Service | Inspection; Treat; Treatment Estimate | | | | |
| Requested Date of Service | 08/29/2003 | | | | |
| Special Instructions | Testing | | | | |
| Ordered By | Neil J Thomas | | | | |
| Order Date | 8/29/2003 10:03:48 AM | | | | |
| Enter Your Bid Price | | | | | |
| Date of Service | 08/29/2003 | | | | |
| Time Of Service | | | | | |
| Company Name | | | | | |
| Phone Number | | | | | |
| Fax Number | | | | | |
| Contact Name | | | | | |
| Contact Phone | | | | | |
| Contact Fax | | | | | |
| Contact Cell | | | | | |
| Contact Email | | | | | |

Submit Bid — 2130

Fig. 22

SERVICE ORDER

FORMS

| Order Information | Property | Sale | Mortgage | Realtor | File Drawer |
|---|---|---|---|---|---|
| Property Address | Maryland | | | | |
| Type Of Service | Repairs/Renovation | | | | |
| Requested Date of Service | 08/29/2003 | | | | |
| Time of Service | 8 AM | | | | |
| Special Instructions | Please repair broken window; Replace flooring in bath; fix downspout; repair sidewalk; fix sink leak in bathroom | | | | |
| Ordered By | Neil J Thomas | | | | |
| Order Date | 8/29/2003 11:01:00 AM | | | | |
| Service Price | $1575 | | SEND INVOICE — 2240 | | |
| Company Name | Big Time Contractors | | | | |
| Phone Number | 301-444-5555 | | | | |
| Fax Number | 301-444-5555 | | | | |
| Contact Name | Joe Repair | | | | |
| Contact Phone | 301-444-5555 | | | | |
| Contact Fax | 301-444-5555 | | | | |
| Contact Cell | 301-444-5555 | | | | |
| Contact Email | joe@fixit.com | | | | |

2210 — Termite Report

2220 — Confirm

Fig. 23

| Seller | Property | Services | | File Drawer |
|---|---|---|---|---|
| Order New Service | Utilities - Electric | Advertising - Signs | Advertising - Magazine | Home Inspection |

― 2340

Service Order Status: Confirmed Order

Service Provider

| | | |
|---|---|---|
| Provider | Washingtonian | |
| Phone Number | 202-555-1212 | |
| Fax Number | | |
| Contact Name | Betty | |
| Contact Phone | | |
| Contact Fax | | |
| Contact Cell | | |
| Contact Email | | |

Order Details

| | |
|---|---|
| Type Of Service | Display Full Page |
| Due date | 08/26/2001 |
| Fee/Premium Amount | |
| Fee/Premium Paid By | Real Estate Broker |
| Billing Arrangement | Bill Our Account # 1234 |
| Billing Account No | |
| HUD 1 Line | |
| Instruction Comments | |
| Ordered By | |
| Order Made on | |

Fig. 24

New Customer

▨ Prospects
▨ Applications
▨ Approved
▨ Settled
▨ Inactive

Office Management

/ 2410                    Applications / 2420

| Borrower Name ⇕ | Address ⇕ | Purpose ⇕ | Type ⇕ | Amount ⇕ | Status ⇕ |
|---|---|---|---|---|---|
| Betty Borrower | 4321 Kaboom Street, Bethesda, Maryland, 20815 | Purchase | 30 Year Fixed | 550000 | Application |
| Bill Buyer | 7432 Pleasant Valley Dr., Fairfax, Virginia, 20121 | Refinance | 15 Year Fixed | 275000 | Application |
| Buster Big Bucks | 555 Oak Ave., Smog City, California, 90210 | Refinance | 30 Year Fixed | 500000 | Application |
| Joe Borrower | 589 Country Road, Gaithersburg, Maryland, 20678 | Purchase | 30 Year Fixed | 375,000 | Application |
| Lester Lowrate | 5432 Main Street, Silver Spring, Maryland, 20902 | Purchase | 10/1 ARM | 225000 | Application |

/ 2420

| APPRAISAL ⇕ | CREDIT ⇕ | FLOOD ⇕ | TAX ⇕ | SETT. DATE |
|---|---|---|---|---|
| O | O | O | O | 6/7/03 |
| PD | O | O | R | 6/15/03 |
| O | R | R | PD | 6/21/03 |
| A | A | O | R | 6/13/03 |
| A | O | A | R | 7/18/03 |

Fig. 25

| Borrower | Property | Sale | Existing Financing | Lender | Loan Quote | Verification | Services | File Drawer |
|---|---|---|---|---|---|---|---|---|

Number of Borrowers [1]

Purpose of Loan (Form 1003) [Purchase]

Loan Position:  Other (Explain): ____
☐ 1st  ☐ 3rd
☐ 2nd

Property type [Single Family Detached]

Property will be (Form 1003) [Primary Residence]

Type of loan [30 Year Fixed]

Are you a Veteran who wants to use your Department of Veteran Affairs (VA) eligibility? ☐ Yes State where property is located [Alaska]

Money for Down Payment $ _____

Down Payment $ 100,000

Monthly income $ 5,000

Monthly debt payments for all borrowers $ 1,000

Mortgage Applied For
☐ Conventional
☐ FHA
☐ VA

Purchase price (Either enter the Purchase Price (if not yet determined estimate what you would like to spend), Or leave blank to calculate maximum purchase price you can afford.) $ 500,000

*Fig. 25a*

| Lender | Amount | Type | Interest Rate | APR | Points | Monthly P&I | Closing Costs | Cash Required | Lock-in Period |
|---|---|---|---|---|---|---|---|---|---|
| B. F. Saul Mortgage | $450,000 | 30 Year Fixed Rate | 6% | 6.111% | 1 | $3,456 | $5,678 | $56,789 | 60 |
| Citi Mortgage | $435,000 | 15 Year Fixed Rate | 6.125% | 6.234% | 0 | $4,432 | $6,789 | $67,890 | 30 |
| B of A | $375,000 | 10/1 ARM | 5.875% | 6.123% | 1 | $2,456 | $3,456 | $45,678 | 45 |

| Borrower | Property | Sale | Existing Financing | Lender | Prequalify | Verification | Services | File Drawer |

*Fig. 26*

Number of Borrowers: 1

Purpose of Loan (Form 1003): Purchase
Other (Explain):

Loan Position: ☐ 1st ☐ 3rd
☐ 2nd

Property type: Single Family Detached

Property will be (Form 1003): Primary Residence

Type of loan: ☒ Conventional
☐ FHA ☐ VA

Monthly income $ 5000.00

Housing Expense $

Monthly debt payments for all borrowers $ 30000
Total Monthly Payments $
Mortgage Applied For

Qualifying Ratios

Primary Housing Expense/Income [ ] %
Total Obligations/Ir [ ] %

Loan-to-Value Ratios

Actual LTV [ ] %
CLTV [ ] %

Are you a Veteran who ☐ Yes
wants to use your
Department of Veteran
Affairs (VA) eligibility?
State where property is located: Alaska Purchase price $ If yes, enter monthly amount
Money for Down Payment $ 100,000
Down Payment $

Fig. 26a

| Loan Amount: | $ 500,000 | Monthly Payments (PI): | $ 1,234 |
| --- | --- | --- | --- |
| Type of Loan: | 30 Year Fixed ▼ | Closing Costs: | $ 2,345 |
| Interest Rate: | 5.5 % | Cash From/To borrower: | $ 76,543 |
| Loan Term (No. of Months) | 360 months | Prepayment Penalty | NA |
| Amortization Period (Months): | 360 | Balloon After No. Months | NA |
| APR: | % | Lock-in period (days): | 60 |
| Points: | 0 | | |

Fig. 27

| Borrower | Property | Sale | Existing Financing | Lender | Application | Verification | Services | File Drawer |
|---|---|---|---|---|---|---|---|---|
| I Type & Terms | II Property & Purpose | III Borrower Info | IV Employment | V Income & Housing Expense | 1003 Entry Screen | VI Assets & Liabilities | VII Details of Trans | VIII Credit & Declarations |

I. TYPE OF MORTGAGE AND TERMS OF LOAN

| Mortgage Applied for: ☐ V.A. ☐ Conventional ☐ Other ☐ FHA ☐ FmHA | Agency Case Number | Lender Case Number |
|---|---|---|
| Amount $ | Interest Rate % | No. of Months ___ months | Amortization Type ☐ Fixed Rate ☐ Other (explain) ☐ GPM ☐ ARM (type) |

| Borrower | Property | Sale | Existing Financing | Lender | Application | 1003 Entry Screens | Verification | Services | File Drawer |

*Fig. 28*

Number of Borrowers: 2

Purpose of Loan (Form 1003): Purchase

Other (Explain):

Loan Position: ☑ 1st  ☐ 3rd  ☐ 2nd

Property type: Single Family Townhouse

Property will be (Form 1003): Secondary Residence

Type of loan: ☑ Conventional  ☐ FHA  ☐ VA

Monthly income: $ 20000.00

Housing Expense: $ 2400

Monthly debt payments for all borrowers: $ 2000

Total Monthly Payments: $ 4400

Mortgage Applied For

Are you a Veteran who wants to use your Department of Veteran Affairs (VA) eligibility? ☐ Yes State where property is located: Alaska If yes, enter monthly amount Money for Down Payment: $ 50000

Qualifying Ratios

Primary Housing Expense/Income: 23 %

Total Obligations/Income: 27 %

Purchase: $ 350000

Loan-to-Value Ratios

Actual LTV: 66 %

CLTV: 88 %

Appraised Value (form 1008): $ 375000

*Fig. 28a*

| Lender Case No (Form 1003). | | Agency Case No (Form 1003). | |
|---|---|---|---|
| Loan No. | 1234 | Mortgage Insurance Case No. | 54321 |
| Mortgage Applied for (Form 1003): | ☐ V.A. ✓ Conventional<br>☐ Other<br>☐ FHA ☐ FmHA<br>Other: | Amortization Type (Form 1003) | ✓ Fixed Rate ☐ Other (explain)<br>☐ GPM ☐ ARM (type) |
| Loan Amount: | $ 550000.00 | Monthly Payments (PI): | $ 2466.00 |
| Type of Loan: | 30 Year Fixed | Closing Costs: | $ 4567.00 |
| Interest Rate: | 6.00 % | Cash From/To borrower: | $ 50000.00 |
| Loan Term (No. of Months) | 360 months | Prepayment Penalty | 0 |
| Amortization Period (Months): | 360 | Balloon After No. Months | |
| APR: | 6.12 % | Lock-in period (days): | 60 |
| Points: | 0 | | |

Fig. 29

New Orders (2910 / 2920)

New File:
- New Orders
- Scheduled
- Settled
- Inactive
- Office Management

| Order No | Order Date | Property Address | Buyer | Seller | Lender |
|---|---|---|---|---|---|
| 0002 | 10/23/2001 | 12209 Horse Center Rd, N Potomac, Maryland | Ralph Bunch | Yassar Arafat | Bank of America Mortgage |
| 0003 | 10/29/2001 | 6 Big Cave, Kabul, Virginia, 22101 | George Bush | Osama Bin Ladin | Chase Manhattan Mortgage |
| 0004 | 01/30/2002 | 555 Pine Ave, McLean, Virginia, 22101 | King Tut | Ramses II | GE Capital Mortgage |
| 0005 | 04/08/2002 | 567 Happy Street, Pleasantville, Virginia, 22071 | J. Edgar Hoover | Al Capone | Homeside Lending |

New Orders — 2920

| Type Service | Type Policy | Status | Abstract | Survey | HOA | Sett. Date | Rescission |
|---|---|---|---|---|---|---|---|
| Title Abstract/Search | Sale | Title Report/Abstract Ordered | O | O | O | 6/7/03 | 6/10/03 |
| Document preparation | Sale | New Order | R | O | PD | 6/15/03 | 6/18/03 |
| Full Escrow Settlement | Refinance | Title Report/Abstract Ordered | R | R | NA | 6/21/03 | 6/25/03 |
| Full Escrow Settlement | Refinance | Commitment Preparation | O | R | R | 6/13/03 | 6/18/03 |

| Order | Buyer | Seller | Property | Sale | Mortgage | Title Insurance | HUD-1 & Accounting | Services | File Drawer |
|---|---|---|---|---|---|---|---|---|---|

Ordered by

Order Information

Name     Pager:     Order/Case/File No     Title Commitment Date/Time due by

Address:     E-mail:     Settlement Date/Time due by

Address:     Contact Name:     Date/Time ordered     07/25/2003     Reminder (days/hrs.prior)

City:     Contact Work Phone:     Ordered by     Date Completed/Issued

State:     Contact Home Phone:     Title     Date Received     07/25/2003

Zip Code:     Contact FAX:

Phone:     Contact Cell Phone:     Order Taken by     Date Approved     07/25/2003

FAX:     Contact Pager:     Assigned to: Title Officer     Approved By

Cell Phone:     Contact E-mail:     Escrow Officer

Order Details

Type Service Requested     Document preparation

Type of Transaction:     Sale

Fee/Premium Amount $

Fee/Premium Paid By

Policy Types to be Issued a. ☐ Owner Policy    Amount: $ b. ☐ Lender Policy    Amount: $

| Order | Buyer | Seller | Property | Sale | Mortgage | Title Insurance | HUD-1 & Accounting | Services | File Drawer |

| Commitment Summary | Title Report | Title Documents | Endorsements | Requirements | Exceptions |

| Title Document | Number | Brief Description |
|---|---|---|
| ALTA Commitment | | |
| ALTA Commitment Schedule A | | |
| ALTA Commitment Schedule B-Section II | | |
| ALTA Commitment Schedule B-Section III | | |
| ALTA Commitment Schedule C | | |
| ALTA Loan/Construction Policy Schedule A | | |
| ALTA Leasehold Loan Policy Schedule A | | |
| ALTA Loan/Construction Loan Policy Schedule A | | |
| ALTA Residential Policy Schedule A | | |
| ALTA Residential Policy Schedule B | | |
| ALTA Policy Schedule C | | |

*Fig. 32*

| Order | Buyer | Seller | Property | Sale | Mortgage | Title Insurance | HUD-1 & Accounting | Services | File Drawer |
|---|---|---|---|---|---|---|---|---|---|
| | HUD-1 Entry Screens | | | | | | Accounting/Disbursements | | |

| Sections A-H | 100 Gross Amount Due From Borrower | 200 Amount Paid by Borrower | Taxes | 400 Gross Amount Due Seller | 500 Reductions To Seller | 700 Commissions | 800 Items Payable With Loan | 900 Items Required In Advance | 1000 Reserves With Lender | 1100 Title Charges | 1200 Record & Trans |
|---|---|---|---|---|---|---|---|---|---|---|---|

| 100. GROSS AMOUNT DUE FROM BORROWER | | | | |
|---|---|---|---|---|
| 101. Contract sales price | | $ | | |
| 102. Personal property | | $ | | |
| 103. Settlement charges to borrower (line 1400) | | $ | | |
| Adjustments for items paid by seller in advance | | | | |
| 106. City/town taxes $ | to | | $ | |
| 107. County taxes $ | to | | $ | |

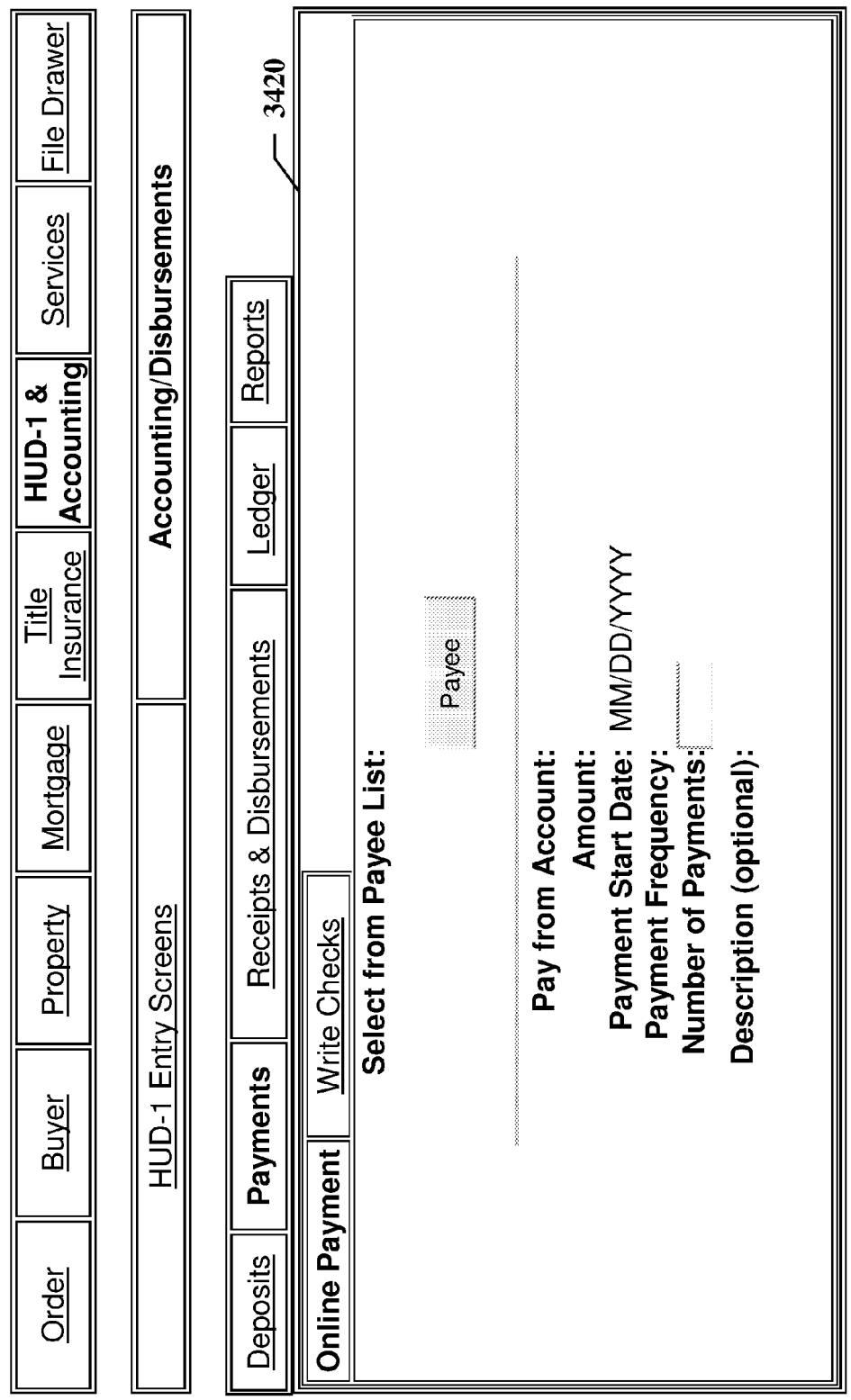

Fig. 35

State of Maryland Land Instrument Intake Sheet
[ ] Baltimore City    [ X ] County: Montgomery
*Information provided is for the use of the Clerk's Office and State Department of Assessments and Taxation, and the County Finance Office only.*

| 1 | Type(s) of Instruments | ( [ ] Check Box if Addendum Intake Form is Attached.) | | | | | | |
|---|---|---|---|---|---|---|---|---|
| | | 1 | Deed | | Mortgage | | Other | | Other |
| | | 2 | Deed of Trust | | Lease | | | | |
| 2 | Conveyance Type Check Box | X | Improved Sale Arms-Length *[1]* | | Unimproved Sale Arms-Length *[2]* | | Multiple Accounts Arms Length *[3]* | | Not an Arms-Length Sale *[9]* |
| 3 | Tax Exemptions (if Applicable) Cite or Explain Authority | Recordation | | | | | | | |
| | | State Transfer | | | | | | | |
| | | County Transfer | | | | | | | |

| 4 | | Consideration | Amount | Finance Office Use Only | |
|---|---|---|---|---|---|
| | Consideration and Tax Calculations | Purchase Price/Consideration | $ 415,000.00 | Transfer and Recordation Tax Consideration | |
| | | Any New Mortgage | $ 332,000.00 | Transfer Tax Consideration | $ |
| | | Balance of Existing Mortgage | $ | x ( ) % = | $ |
| | | Other: | $ | Less Exemption Amount - | $ |
| | | | | Total Transfer Tax = | $ |
| | | Other: | $ | Recordation Tax Consideration | $ |
| | | | | x ( ) = per $500 | $ |
| | | Full Cash Value | $ 415,000.00 | TOTAL DUE | $ |

| 5 | | Amount of Fees | Doc. 1 | Doc. 2 | Agent: |
|---|---|---|---|---|---|
| | Fees | Recording Charge | $ 40.00 | $ 40.00 | |
| | | Surcharge | $ 0.00 | $ 0.00 | Tax Bill: |
| | | State Recordation Tax | $ 2,518.50 | $ 0.00 | |
| | | State Transfer Tax | $ 1,037.50 | $ 0.00 | C.B. Credit: |
| | | County Transfer Tax | $ 4,150.00 | $ 0.00 | |
| | | Other | $ | $ | Ag. Tax/Other: |
| | | Other | $ | $ | |

ABC Title Company, Inc
SUITE 100
10 CONNECTICUT AVENUE
KENSINGTON, MARYLAND 20895
Tel: (301) 946-0000
Fax: (301) 946-1111

ABC Bank, F.S.B.,
3465 E Foot Drive
Oakland, CA 91111

Loan Number: 123456

Our File Number: 76543

Borrower: Celestin Bonto

Property Address: 29 Schuler Drive, Silver Spring, MD 20902

Enclosed are the following:

- X All original documents that were in closing package
- X Certified copies of the HUD-1 signed by all parties
- X Original Note
- ___ Certified copies of the Note
- ___ Original Deed of Trust
- X Certified copies of the Deed of Trust
- X Hazard/binder policy and paid receipt
- ___ Check to _____ for $_____

Notes:
_____
_____
_____

The undersigned representative of ABC Title Company, Inc. certifies that the disbursements have been made and the documents and other items transmitted herein have been completed. If we can be of further assistance, please feel free to contact our office.

Sincerely,

COMPUTERIZED PROCESS TO, FOR EXAMPLE, AUTOMATE THE HOME SALE, MORTGAGE LOAN FINANCING AND SETTLEMENT PROCESS, AND THE HOME MORTGAGE LOAN REFINANCING AND SETTLEMENT PROCESSES

CROSS-REFERENCE TO RELATED APPLICATIONS

This application is a continuation-in-part of and claims priority to U.S. application Ser. No. 11/881,360 entitled "A Computerized Process To, For Example, Automate the Home Sale, Mortgage Loan Financing and Settlement Process, And The Home Mortgage Loan Refinancing And Settlement Processes," filed Jul. 26, 2007 by Neil Thomas, now abandoned, which is a continuation-in-part of and claims priority to U.S. application Ser. No. 10/979,822 entitled "A Computerized Process To, For Example, Automate the Home Sale, Mortgage Loan Financing and Settlement Process, And The Home Mortgage Loan Refinancing And Settlement Processes," filed Nov. 3, 2004 now U.S. Pat. No. 7,548,884 by Neil Thomas, which is a continuation of and claims priority to U.S. application Ser. No. 10/969,242, entitled "A Computerized Process To, For Example, Automate the Home Sale, Mortgage Loan Financing and Settlement Process, And The Home Mortgage Loan Refinancing And Settlement Processes," filed on Oct. 21, 2004 by Neil Thomas, now abandoned, which claims priority under 35 U.S.C. 119 to U.S. Provisional Patent Application No. 60/512,776 entitled "A Computerized Process To, For Example, Automate The Home Sale, Mortgage Loan Financing and Settlement Process, And The Home Mortgage Loan Refinancing And Settlement Processes" filed on Oct. 21, 2003 by Neil Thomas. The complete disclosures, specifications and drawings of U.S. application Ser. No. 11/881,360, U.S. application Ser. No. 10/979,822, U.S. application Ser. No. 10/969,242 and U.S. Provisional Application No. 60/512,776 are incorporated herein by specific reference.

BACKGROUND OF THE INVENTION

1. Technical Field of Invention

The preferred embodiments of the invention relates to a comprehensive computer system for automating and facilitating the performing and processing of tasks, information transfer, and information storage associated with the home sale, mortgage loan origination and settlement process, and the home mortgage refinancing origination and settlement process, over a distributed computing network.

2. Discussion of Background References

Traditionally the home sale process, the mortgage loan origination process and the settlement process have been considered to be three entirely separate functions. Typically the real estate company is in one office, the mortgage company in another and the settlement company in still another. They typically have never been looked at as parts of one larger, continuous process, particularly when it comes to technology.

Consequently, real estate sales, mortgage companies and settlement companies use various and differing technology to assist them in performing their respective sale, mortgage and settlement activities. The existing programs for the real estate office do only portions, but not all of the functions for the real estate agent, or real estate sales office of a new home builder; some only access the 'multiple listing service' or MLS, or builder home inventory in the case of the builder, others only create the contract of sale or other contract documents, others keep track of buyers, sellers, and service providers such as home inspectors, termite inspectors, etc., while still other programs only order and track services. Some technology called 'transaction management' have tried to combine or 'connect' several of these features.

Similarly, various programs for mortgage loan origination do portions of the origination process. Some display multiple mortgage 'loan products' to the borrower with a sample interest rate and allow them to select a loan product to pursue with a lender; other mortgage 'point of sale' (POS) programs allow the borrower to interact with a Internet web page to fill in loan application information to request a loan; other programs allow a mortgage loan officer to take down the borrower's application information and enter it into a loan (Form 1003) application which can often be used with another 'loan origination system' (LOS) to underwrite the loan, and still other mortgage lender programs prepare loan documents such as the note, deed of trust, disclosures, affidavits, etc. after the loan is approved.

Then there are still other programs which settlement companies use that perform strictly the title, settlement and closing functions such as taking orders, ordering services such as title reports and surveys, preparing a settlement statement (HUD-1), including escrow accounting, and preparing documents such as the title commitment and policy, affidavits, and legal documents such as recording forms, deeds, etc.

In addition to these programs, the real estate agent, the lender and the settlement company may use a combination of e-mail, faxes and phones to communicate with others to complete their part of the process.

These multitudes of programs have limited value and slow the process because users have to rehandle, reenter, and wait for information from other parties; they have limited functionality in common and require use of more than one tool for users to perform their jobs thereby causing needless, repetitive work, delay and expense.

To date, no one has operationally developed the real estate agent, mortgage lender and settlement technologies together in one comprehensive solution.

Transaction Management Systems

The numerous so-called 'transaction management' systems, which appeared in the late 1990s, with a few still being marketed today, were attempts to 'patch together' existing sale, mortgage and settlement technology. They were primarily designed to provide features for the real estate agent to use, 'connected to' a property 'listings' or home database such as the MLS systems, and a 'contact database' for keeping track of buyers, seller, service providers, etc. They typically combined features for ordering services and scheduling and tracking tasks, a 'group calendar' for parties to monitor activities and status of the transaction. There were, however, numerous fundamental and fatal problems with that approach; they were incomplete, leaving gaps in the process, pointing to the old adage, 'a job half done takes twice the time,' they were more costly to build and operate, they were complex requiring significant and difficult programming to integrate numerous, diverse technologies, they provided little 'automation' of the process, and resulted in a lack functionality giving users little value.

Further, these 'transaction management' systems dealt with only portions of the over-all home sale, mortgage and settlement process, requiring many of the users to reenter information in different programs, or requiring 'integration' with other real estate, mortgage and settlement programs to communicate. None of these 'transaction management' programs allowed, among other things, the lender or the settlement provider to perform most of their transaction tasks and processes within these programs. Instead they had to use their separate, existing, older technology together with these 'transaction management' programs. For example, while the lender may receive some loan application information and a settlement company may receive order information from a "TM" website, receive documents created in other programs and 'uploaded' by the other parties, 'communicate' with others in the process via some sort of messaging process, and view the status on a webpage in the 'transaction management system' all this information still had to be transported at some point to their other loan origination or settlement technology to perform their respective tasks of the process, either manually by a person, or by 'integrating' the 'transaction management' system with their existing mortgage loan origination or settlement technologies. These 'transaction management programs' typically would only allow 'posting' or 'uploading' of sale, loan, or settlement closing documents created in other programs to be sent or shared with others. There are literally dozens of real estate, mortgage origination programs and settlement and title programs, each having different design structures, field names, etc. To try to integrate these technologies is very complex, ineffective and costly with the resulting information shared and functionality being limited, with little automation of the process, and therefore the value to the users was limited. The alternative, for example, was to have a loan officer wait for and reenter information into their existing loan origination technology, and then the settlement company personnel reenter information into their existing settlement software and then somehow send information back and forth to the others in the process. If there were any changes, or information was incorrect, the then whole waiting, communication and reentry process would begin over again.

Because they do little to actually simplify and automate the transaction, a number of these 'transaction management' programs added additional people to the transaction in the form of a 'transaction coordinator' or a 'move consultant' which simply added to the overall cost of doing the process and did little to simplify the process.

All of these existing technologies were incomplete, leaving gaps in the process, and as a result they were not well received in the market. Not surprisingly, there have been dozens of failures by the companies which have produced them. Despite huge investments of time, money and 'expertise,' including by some of the largest companies, none of these efforts have been successful with such notable failures as HomeStore.com's 'RealtyLink', Microsoft's 'Home Advisor.com,' First American Real Estate Solutions' (FARES) 'Transaction Management', and Fidelity Real Estate Solutions' 'Transaction Point.'

Despite these numerous attempts, there has been no complete program that performs, for example, the entire home sale, mortgage origination and settlement process in one single technology platform including, for example, all the sale activities of the real estate agent or builder sales office, all the loan origination activities of the mortgage loan office, and all the activities of the settlement company. Similarly, there is no complete program that performs, for example, the entire home mortgage refinancing origination and settlement process in one highly automated technology platform.

The various embodiments of the present invention provide substantial improvements over, among other things, the forgoing background technologies and the technologies disclosed in, for example, the following references:

| | |
|---|---|
| U.S. Pat. No. 5,239,462 | U.S. patent application 20040030631 |
| U.S. Pat. No. 6,594,633 | U.S. patent application 20040010451 |
| U.S. Pat. No. 6,321,202 | U.S. patent application 20040002915 |
| U.S. Pat. No. 6,049,781 | U.S. patent application 20020049624 |
| U.S. Pat. No. 5,689,705 | U.S. patent application 20030172006 |
| U.S. Pat. No. 5,991,769 | U.S. patent application 20030187756 |
| U.S. Pat. No. 6,539,401 | U.S. patent application 20020046159 |
| U.S. Pat. No. 5,870,721 | U.S. patent application 20020059137 |
| U.S. Pat. No. 6,385,594 | U.S. patent application 20020029194 |
| U.S. patent application 20040133493 | U.S. patent application 20020038280 |
| U.S. patent application 20030220807 | U.S. patent application 20020065739 |
| U.S. patent application 20030220805 | U.S. patent application 20020095311 |
| U.S. patent application 20020095385 | U.S. patent application 20020095385 |
| U.S. patent application 20010034607 | U.S. patent application 20020174090 |
| U.S. patent application 20020052814 | U.S. patent application 20030055747 |
| U.S. patent application 20040088181 | U.S. patent application 20030078897 |
| U.S. patent application 20040039581 | U.S. patent application 20040054606 |

Internet Home Search Portals and Real Estate Websites

In the traditional home sale market the buyer and seller are typically only offered mortgage loans, settlement and other services later in the sale process; in the case of the seller only after the seller has contacted a real estate agent and is about to or have already listed the property for sale with an agent, or in the case of a 'for sale by owner or FSBO' for example after they have advertised their home or have a contract on their home; and in the case of a buyer, for example, when the buyer has contacted or met with the agent or is about to start a search for a home, the agent may suggest that the buyer be prequalified or preapproved for a mortgage which might entail the buyer calling by phone, or using a lender 'link' on the agent's Website or going on the Internet to a lender's Website directly. Further, buyers are not typically offered other services such as settlement, homeowners insurance, home warranties, moving services, etc. until later in the process, after they have started to look for or found a house or submitted a contract.

These delays in ordering and pricing services in the traditional home sale market also appear in the processes employed on the Internet. According to the Realtor associations 70%-80% of homebuyers used the Internet to buy their homes in 2006. That amounted to approximately 6 million homes representing approximately $1 trillion of value in 2006. Yet, none of the Internet sites offer buyers and sellers an easy, efficient, competitive process to receive quotes and arrange for a mortgage or services at the beginning of and as an integrated part of the home selling and buying process.

Internet sites including those of the major real estate companies such as RE/MAX, Long & Foster Real Estate, Prudential Fox and Roach, ColdwellBanker.com, CBMove.com and Weichert Real Estate as well as Internet portal home search sites such as AOL.com, MSN.com, Realtor.com, Yahoo.com, HomeGain.com and Goggle.com offer only a time-consuming, overly complicated and inefficient process for finding and securing a mortgage, settlement, and other services, if they offer any process at all.

For example, with regard to the home buyer, while all these sites have home search functions which display home search results, they only have simple 'mortgage calculators' and/or 'links' to separate mortgage Websites to arrange for a mortgage. These calculators simply display 'hypothetical' interest rates and monthly payment estimates for different loan types. Some sites such as Weichert, Yahoo, RE/MAX, and Realtor.com do enter the 'sales price' from the 'home search results' into their 'loan calculators,' but they enter no other information from the home search process such as location, HOA assessments, insurance, real estate taxes, etc. One technology, called 'RatePlug' discussed below does apparently use real estate taxes, HOA assessments, or insurance' estimates in their monthly payment calculations.

Only one 'loan calculator' used by Realtor.com allows information for 'estimated payments' to be 'saved,' but only for use in doing additional searches and viewing additional home search results on the Realtor.com website. It does not allow any information to be saved and used for anything else later in the sale, mortgage or settlement processes. None of the 'calculators' on other Websites allow any information to be saved for any other purpose.

However, none of these 'calculators' account for accurate information about the buyer's credit, income or debt information or perform any actual loan underwriting process to provide accurate quotes or generate other accurate service or closing cost information to be used in the transaction.

These Internet home search sites have 'links' to separate mortgage lender Websites, which are not part of the home search process. All these Internet portals and real estate Websites require a buyer searching for a home to navigate via a 'link' to a separate mortgage Webpage such a LendingTree.com, or eLoan.com and use a separate loan application processes, whereby all information regarding the property, the borrower, and sale, etc. has to be entered 'de novo'; in other words in all cases the home search information and mortgage search and approval processes are not integrated, and a totally separate 'process' must be utilized to apply for and obtain a mortgage. This diverts the buyer from one task, namely searching for a home, to find for instance a mortgage quote or apply for a mortgage on another Website; if the buyer wants to go back to their original task of searching for a home which they've begun, they have to either 'navigate back' through a series of WebPages and try to relocate work that they were doing, which may or may not still be there, or simply start over again.

Some home search sites such as Yahoo.com and Realtor.com provide multiple 'rate quotes' from more than one lender on separate sites such as BankRate.com but they are not part of home search process. None of these 'multiple lender rate quote sites' provide actual 'rate quotes' based on home search results or any actual borrower financial, credit or underwriting criteria, but are only rough estimates based on 'hypothetical' assumptions of a buyers credit worthiness, etc. These 'multiple lender rate quote sites' then provide additional 'links' to third-party mortgage lenders' Websites where all information must be entered de novo in a separate mortgage process which is not part of the home search or any subsequent sale, loan and settlement process.

One 'calculator' called RatePlug.com has the buyer enter a down payment amount, generates the home sales price, real estate taxes, HOA assessment and homeowners insurance information from the MLS home search process, generates the home search results, and calculates a monthly payment estimate for a loan, tax, HOA, PMI, and insurance for particular homes using several 'loan types' but: 1. does not appear to generate multiple quotes or bids from multiple lenders, 2. does not perform automated underwriting using the property search results and the buyer's actual credit, income, debt or other underwriting criteria, 3. does not save or use the home search, loan search criteria, or buyer information for a sale contract or an actual loan application, underwriting, preapproval, approval or closing process, 4. does not generate accurate bids, quotes or information from other actual service providers such as, home inspections, settlement, etc. 5. does not generate accurate closing cost or escrow information and 6. does not save and use the information in the remaining sale, mortgage or settlement process. Rather, RatePlug requires the buyer to contact the loan officer by phone, e-mail or go to a separate website where information has not been saved, requiring all the property and buyer information to be reentered by either the loan officer or by buyer, and the remaining sale, loan and settlement process remain essentially separate.

None of these Websites and technologies provide a way of generating accurate quotes and information for settlement and other services such as home inspections or other costs at the beginning of the buying process. In those that do provide some process for providing any settlement or other service information, they merely provide 'links' to separate Websites, some owned by the real estate company and some third-party Websites for those such services. None of these sites for settlement or other services are part of either the home search or the mortgage search and approval processes. As a result all information must be either entered de novo in these Websites or worse the home buyer must contact the service provider by phone or e-mail address to order those services and information must be entered manually by office personnel into a separate settlement program and a separate process utilized.

None of these home search Websites provide a simple process whereby a buyer can receive accurate loan quote, 'preapproval' or approval information or other cost information based on home search results, borrower information and actual loan 'underwriting'. If the buyer wants accurate loan quotes, payment, closing and other cost information, the buyer has to go through a long loan application process requiring dozens of steps, and has to go elsewhere for pricing and information for settlement and other service information. In addition, none of these Internet portals or real estate Websites provide any process for saving and incorporating the home search, loan, or other service information into the subsequent sale, mortgage and settlement process as the subject teachings do.

With regard to the home seller, those Internet portals that allow the seller to enter information about their home which they intend to sell such as Yahoo.com and base.google.com, while they allow the seller to enter limited seller information such as user name and password and property information such as price, property type, number of bedrooms and photographs, location, etc. there is no provision for receiving competitive quotes and ordering any services such as for a real estate agent, home improvement, title insurance or any other types of services, and there is no provision for saving and utilizing the information in the subsequent sale and settlement process.

With regard to other prior patent art, while many talk about 'ordering services' they do not describe doing this 1. at the beginning of the buying and selling process, 2. in the simplest and most efficient manner possible while the buyers and sellers are performing other tasks in the process, or 3. as part of a comprehensive sale, mortgage and settlement process.

Industry Resistance to Transparency, Competition and Changes to RESPA

This traditionally complicated process has encouraged long-standing abuses by industry participants which have cost home sellers and buyers perhaps 100s of millions of dollars of unnecessary expense for decades. There is a wealth of literature discussing how, for example, the Realtors have used their virtual monopoly, market dominance, association and MLS rules, and control of the sale process to restrict competition resulting in the pubic being charge significantly higher commissions. They have used control of their copyrighted sale forms, for example in California, to prevent unwanted technologies from entering the marketplace without their consent and approval. They have attempted to restrict use and access to their MLS data by 'discount brokers,' thus preventing them from offering a lower commission structure to the public. This has required the US Department of Justice and the Federal Trade Commission to pursue repeated legal action against them to stop these practices. And they, along with the mortgage banking and title insurance industry have expended enormous effort successfully resisting legislative efforts to reform of The Real Estate Settlement and Procedures Act better known as RESPA to make the sale process more transparent, simpler and less costly for the home buyer and seller.

Some Illustrative Disadvantages of Background References

Some of the many disadvantages of the various background references including the 'transaction management' technology discussed above include one or more of the following disadvantages: 1. they are incomplete solutions, 2, leaving crucial gaps in process, 3 requiring multiple entry of information. 4. they are complex 'patchwork' solutions 5. they are more costly to build, maintain and upgrade, 5. they have much less functionally and value for users, 6. they have little true automation of the process, 7. there is little simplification of the process, in fact most add work and steps on the process, 8. there are delays which result in an inefficient and time-consuming process, 9. they are less likely to provide accurate information to users on a timely basis, and/or 10. they are more prone to errors, mistakes and confusion.

The Internet home search processes being utilized currently are wasteful and inefficient for both the buyer and seller. When the buyer and seller first go to these Websites and enter valuable information, this information could and should be saved and automatically used later to provide services and automate and simplify the entire sale, mortgage and settlement process. However, the information is not saved and has to be reentered again later in separate mortgage, settlement and other services processes. Some of the many other disadvantages of the various Internet home search portals and real estate Websites background references discussed above include one or more of the following disadvantages: 1. they do not provide accurate or competitive pricing for mortgage loans, settlement and other services, but rather provide incomplete, rough estimates of only some costs for users adding to uncertainty and an uninformed buyer seller, 2. they are confusing, awkward and difficult for users to use, 3. they require more work and time, 4. a home buyer cannot compare the costs of different homes, loans and services at one time early in the buying process, 5. the homebuyer and seller do not receive competitive quotes or bids from multiple sources, 6. the information is not saved automatically for use in the subsequent comprehensive home sale, loan, and settlement process, 7. there are delays in the process, and 8. information has to be reentered later in the process in multiple technologies.

The inefficiencies in the current state of the art are born out by the California Association of Realtors' study, Internet vs. Traditional Buyer, Real Estate Research Report 2006-2007 which found, "Homebuyers who used the Internet as an integral part of the home buying process increased significantly from 28 percent of all buyers in 2000 to 70 percent in 2006 . . . . With more than half of all homebuyers experiencing a problem in closing their escrows (settlement) on time in 2006, over 40 percent chose 'escrow closing on time' as the one thing they would like to change most about their home buying experience." This is a direct result in part due to the inadequacies of the current Internet home search processes, the many different technologies being used for the remaining sale, mortgage and settlement process, including the inadequacies of 'transaction management' technology, and the inefficiencies of the current process overall.

The current Internet home search portals and real estate Websites processes also lose potential revenue opportunities for Internet portals, real estate companies, mortgage lenders, settlement and other service providers because 'the sale' is not make at the earliest possible time in the sale process, the processes are awkward, difficult and time-consuming to perform, users are likely to become impatient, frustrated and distracted, and are given an opportunity to go elsewhere such as other Websites for loans and services. Internet portals make money from 'advertising links' and many real estate companies rely on selling mortgages, settlement and other services to add to their profits. If the Internet home search process used is not effective in capturing mortgage, settlement and other service business at the earliest opportunity, then Internet portals potentially lose valuable revenues. Similarly real estate companies, mortgage lenders, settlement and title companies, and other service providers also make money selling loans and other services to buyers and sellers, and it is also to their advantage, 1. to 'sell' these as early as possible in the home sale and buying process, and 2. to make that sale process as simple and as easy as possible.

Advantages of Some Illustrative Embodiments of the Invention

In some preferred embodiments, some advantages that may be achieved, if desired, (such as, e.g., with a comprehensive computer system for the entire home sale, mortgage loan origination and settlement process according to some embodiments described herein) can include, among other things, for example one or more of the following and/or other advantages: 1. generate complete, accurate pricing and ownership costs of purchasing and owing a property at the beginning of the home buying process, or at other times; 2. automatically filter for homes, loans and other costs a purchaser can afford; 3. generate competitive pricing including quotes or bids from multiple lenders, service providers or other sources; 4. promotes competitive use of 'discount real estate brokers' in lieu of "6 percent brokers;" 5. allows lenders to quickly determine the creditworthiness of the borrower and the value of the security for a loan; 6. buyer can receive a loan 'prequalification,' 'preapproval,' and 'approval' based on actual 'underwriting' results and rates while searching for a home and other services; 7. will reduce costs for both the home buyer and seller; 8. allow the buyer to see a more complete picture and the ramifications of selecting a particular property and type of loan prior to signing a binding contract rather than finding surprises later; 9. automatically generates accurate disclosures required by RESPA and other regulations such as the 'Good Faith Estimate' (GFE) and truth-in-lending (TIL) at the very beginning of the sale process; 10. is of particular importance and value because selling or purchasing a home is the largest single financial decision for most families; 11. is of particular value for low- or moderate-income families with limited knowledge and sophistication; 12. allow any information to be automatically saved and used for further home searches or used later in the sale, mortgage and settlement processes; 13. automatically enters property, loan, service and other information into the entire sale, loan, settlement and services process and documents and automatically generates and displays information and documents; 14. automatically orders and performs one or more service tasks; 15. automatically prompts one or more users to perform or perform one or more sale, loan, service, settlement or other tasks or performs one or more processes automatically; 16. preempts and overcomes resistance to change by traditional real estate, mortgage, and title industry; 17. allows lenders and service providers to sell mortgage products and services at the earliest point in the home sale and buying process thereby preempting other vendors from capturing business, 18. it reduces work by all parties allowing the process to be more highly automated, eliminating and reducing work currently being performed manually; 19. it reduces redundant and repetitive tasks of manually entering the same information numerous times in different computer programs, so information can be entered once for the entire transaction, not just portions of the transaction; 20. it reduces work, time, cost and chances of error associated with having to manually rehandle information numerous times, first having the real estate personnel reenter information to perform tasks or transfer to more than one program, having the mortgage personnel reenter information to perform tasks or transfer to other programs, and then having the settlement personnel again reenter or transfer information to other programs; 21. it allows transaction information to be instantly available to immediately perform additional tasks anywhere in the process automatically; 22. it allows transaction information and status information to be instantly available to all parties as appropriate, thus reducing confusion, delays, uncertainty and chances of errors in the process; 23. it reduces the cost of completing a transaction; 24. it reduces the number of personnel necessary to complete a transaction; 25. it reduces or even eliminates waiting time and reduces the overall time required to complete a transaction; 26. it provides greater reliability in the process; 27. it assures that important sale and mortgage disclosure information and documents required by laws or regulations be given to the seller or the buyer, or the refinancing home owner, on a timely basis; 28. it greatly reduces the cost, complexity, unreliability, and design limitations of trying to 'patch together,' or 'integrate' different computer systems, one for the real estate sale personnel, another for the mortgage company personnel, and another for the settlement company personnel, etc.; 29. it results in a system with greater and more functional features for users; 30. it provides a much more highly automated system without gaps in the process; in other words, for example, the instant the loan officer does something to approve the loan, the documents can be automatically prepared and sent to the settlement company and the borrower in seconds; 31. it is easier and cheaper to change or modify, add features, or upgrade the system from time to time; this is important with ever-changing technology and constantly changing market conditions; 32. a comprehensively designed system is more reliable and less likely to malfunction or 'crash'; 33. it is less costly to build and maintain; 34. the process can be simplified, streamlined and made more user-friendly by combining, eliminating one or more functions or steps, or presenting information or allowing functions to be performed in a more understandable and efficient way; and/or 35. it provides a smoother, simpler, continuous process from the beginning to the end of the entire home sale, mortgage origination and settlement process.

SUMMARY OF THE INVENTION

The preferred embodiments of the invention provide, among other things, a comprehensive computer system for automating, simplifying and facilitating the performing and processing of tasks, information transfer, and storage associated with the home sale, mortgage loan financing and settlement process, and the home mortgage loan refinancing origination and settlement process over a distributed computing network in one technology. The technology can, among other things, automate the entire real estate home sale, mortgage loan, and settlement process in one program, including many or all of the activities performed by many or all of the various participants in the transaction: the seller, the buyer, the sales agent, the mortgage loan officer, loan underwriter and loan processor, and the settlement service provider, as well as service providers such as home inspectors, appraisers, surveyors, title abstractors, etc. It can also be modified to automate just the mortgage loan refinancing origination and settlement process in one program for the borrower, mortgage loan and the settlement company personnel and corresponding service providers.

The preferred embodiments can be implemented using computer processes that, among other things, automate, simplify, change and enhance 'real world' processes currently being used, ineffectively and with significant limitations, by the real estate, mortgage, and settlement markets today. In the preferred embodiments, the computer processes are not needed to be performed using an unusual hybrid system. In some embodiments, in addition to enhancing 'real world' processes and enhancing the way real estate is sold today, the process could be modified for other environments, such as, for example for a 'self-help' buyer or seller to use, or a 'for sale by owner' solution without the help of a real estate agent or sales person, could be used on a kiosk in a shopping mall or other public area, or could be adapted to be used with a 'move consultant' or 'transaction coordinator,' or the like.

In some embodiments, the real estate agent or sales person can send and receive detailed information between the seller and buyer, lender and/or settlement company, enter and search for information on homes for sale from a property database 50, 75, 85, create a listing agreement, a contract of sale and other sale documents and share with others, search for, select a mortgage loan quote 265, apply for and completely arrange for mortgage financing 270, 275 for the buyer, and/or order and receive services from third-party service providers. In some embodiments, the mortgage lender can provide the buyer a loan quote for various loan products, receive detailed buyer, property and sale information, prequalify or preapprove the borrower for a loan product selected by the borrower, take the full loan application, underwrite, approve and prepare and send all loan documents. In some embodiments, the settlement company can receive orders including some or all of the buyer, seller, property, sale information and/or mortgage loan information and documents, including, e.g. complete lender instructions and loan closing documents, and/or can prepare all legal, title and/or settlement documents including the settlement statement with full escrow accounting functions.

In the preferred embodiments, all or substantially all of the processes can be done using one technology platform.

In some embodiments, In the case of a home mortgage refinance, the borrower can, for example, search for, select a mortgage loan quote, enter and send borrower and property information; the mortgage lender can receive detailed borrower, and property information, prequalify or preapprove the borrower for a loan product selected by the borrower, take the full loan application, underwrite, approve and prepare and send all loan documents; and the settlement company can receive orders including all borrower, property information and mortgage loan information and documents, including complete lender settlement instructions, and prepare all legal, title and settlement documents including the settlement statement with full escrow accounting functions.

In some embodiments, the technology allows all or substantially all information to be entered once (and, in some embodiments, corrected if necessary) for the entire transaction, be transmitted instantly over a distributed computing network, either manually or automatically, and made immediately available to all appropriate parties to perform all their respective tasks and process, or perform one or more tasks and processes automatically within the same program, as necessary, thus saving time, work and expense.

In some embodiments, a single technology can, in contrast to existing systems, integrate an entire real estate sale, mortgage, and settlement process into one system—connecting the seller, buyer, real estate agent (or sales office in the case of a new home builder), or for a home refinancing with the borrower, and the mortgage loan origination activities for the lender, and settlement activities for the settlement company and service provider activities, allowing each user to perform all the activities for their portion of the process.

In some embodiments, a marked improvement can be achieved over the state of existing technology. Among other things, the preferred embodiments do not require use of one or more separate program for each of the real estate sale office, the mortgage office, settlement office and service providers, which might otherwise allow the performance of only portions of the process and require parties to do repetitive tasks. When combined with many manual tasks which users have to perform such as making phone calls, copying, faxing, etc., current existing technologies require considerable repetitive work, greater delay, greater errors, and more uncertainty.

In some embodiments, there is a separate Virtual Office for each primary user, for example in a real estate sale transaction the real estate office, the mortgage lender, the settlement company, and service providers, allowing each to access appropriate information and perform all the appropriate tasks associated with their roll for each transaction over a secure distributed network. In addition, the seller, the buyer, or home owner if a refinancing, and service providers will be able to access and participate in the process via a 'Virtual Desktop' which allows them to enter, send and receive information perform tasks and processes for the entire transaction within this one single technology.

The preferred embodiments of the invention allow, among other things, the buyer and seller to be prompted, at the very beginning of the process, or later throughout the process if desired, to generate accurate pricing, quotes and information and order a mortgage loan and services, and use that information to simplify and automate the entire sale, mortgage and settlement process. The bidding and/or ordering process can, among other things, be done automatically without prompting buyer or seller, and can be done with or without automating the remaining sale, mortgage and settlement process, i.e. as a way to provide accurate and competitive pricing and capture mortgage, settlement and other service business at the beginning of the home sale process.

SUMMARY

Objects and Advantages of the Preferred Embodiments of the Invention

In some preferred embodiments, objectives and advantages that can potentially be achieved can include one or more of the following: 1. it provides a smoother, simpler, continuous process from the beginning to the end of the entire home sale, mortgage origination and settlement process; 2. it reduces work by all parties allowing the process to be highly automated, eliminating and reducing work currently being performed manually; 3. it reduces redundant and repetitive tasks of manually entering the same information numerous times in different computer programs; so information can be entered once for the entire transaction, not just portions of the transaction; 4. it reduces work, time, cost and chances of error associated with having to manually rehandle information numerous times, first having the real estate agent reenter information to perform tasks or transfer to more than one program, having the mortgage company reenter information to perform tasks or transfer to other programs, and then having the settlement personnel have to once again reenter or transfer information to other programs; 5. it allows transaction information to be instantly available to immediately perform additional tasks anywhere in the process, thus reducing confusion, delays and uncertainty and chances of errors in the process; 6. it reduces the cost of completing a transaction; 7. it reduces the number of personnel necessary to complete a transaction; 8. it reduces or even eliminates waiting time and reduces the overall time required to complete a transaction; 9. it provides for greater reliability to be built into the process; 10. it assures that important sale and mortgage disclosure information and documents required by law be given to the seller or the buyer, or the refinancing home owner, on a timely basis; 11. it greatly reduces the cost, complexity, unreliability, and design limitations of trying to 'patch together,' or 'integrate' different computer systems, one for the real estate agent, another for the mortgage company, and another for the settlement company, etc, in an effort to perform this process; 12. it results in a system with greater and more functional features for users; 13. it provides a more highly automated system without any gaps in the process; 14. it provides a simpler system which is less costly to build and maintain; 15. it is easier and cheaper to change or modify, add features, or upgrade the system from time to time; this is important with ever-changing technology and constantly changing market conditions; 16. it is more reliable and less likely to malfunction or 'crash'; and/or, 17. the process can be simplified, streamlined and made more user friendly by combining, eliminating one or more functions or steps, or presenting information or allowing functions to be performed in a more understandable and efficient way.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE SEVERAL VIEWS OF THE DRAWINGS

The accompanying figures are provided by way of example, without limiting the broad scope of the invention or various embodiments of the invention.

FIG. 1a is a System Overview and Architecture Showing Ancillary Databases & Systems Detail for Home Sale, Mortgage Financing and Settlement Computer Process;

FIG. 1b is a System Overview and Architecture of a Home Mortgage Refinancing and Settlement Computer Process;

FIG. 1c is a System Overview and Architecture Showing Ancillary Databases & Systems Detail for Home Mortgage Refinancing and Settlement Computer Process;

FIG. 1d is a System Overview and Architecture of a Home Sale, Mortgage Financing and Settlement Computer Process Integrated with Extrinsic Real Estate, Mortgage, Settlement and Other Programs;

FIG. 1e is a view depicting an Example of an Internet Portal;

FIG. 1f is a view depicting an Example of a Real Estate Broker Website;

FIG. 1g is a view depicting an Example of a Mortgage Search or Mortgage Lender Website FIG. 1h is a view depicting an Example of a Seller Prompt to Bid and Order Services;

FIG. 1i is a view depicting an Example of a Buyer Prompt to Bid and Order Services;

FIGS. 1k-1u is an Example of an Automated Property Database, Loan Product and Pricing Database, Ancillary Database and System, Database and Service Provider Search and Automated Underwriting Process Using MS Excel Spreadsheet;

FIG. 3a is a view depicting Detailed Virtual Real Estate Office Information and Document Workflow Process;

FIG. 3e is a view depicting Detailed Buyer Virtual Desktop Information and Document Workflow Process;

FIG. 4a is a view depicting Virtual Real Estate Office Work Area Summary Information;

FIG. 4b is a view depicting Virtual Mortgage Office Work Area Summary Information;

FIG. 4c is a view depicting Virtual Settlement Office Work Area Summary information;

FIG. 5 is a view depicting Customer (Buyer, Seller) Virtual Desktop and Work Area Screen Layout;

FIG. 7 is a view depicting Sample Virtual Office Calendar;

FIG. 8 is a view depicting Sample Virtual Office Tab Table File Drawer;

FIG. 9 is a view depicting Virtual Real Estate Office Transaction Navigator and View;

FIG. 10 is a view depicting Seller Information Tab Table;

FIG. 11 is a view depicting Property Information Tab Table;

Figure 12A:
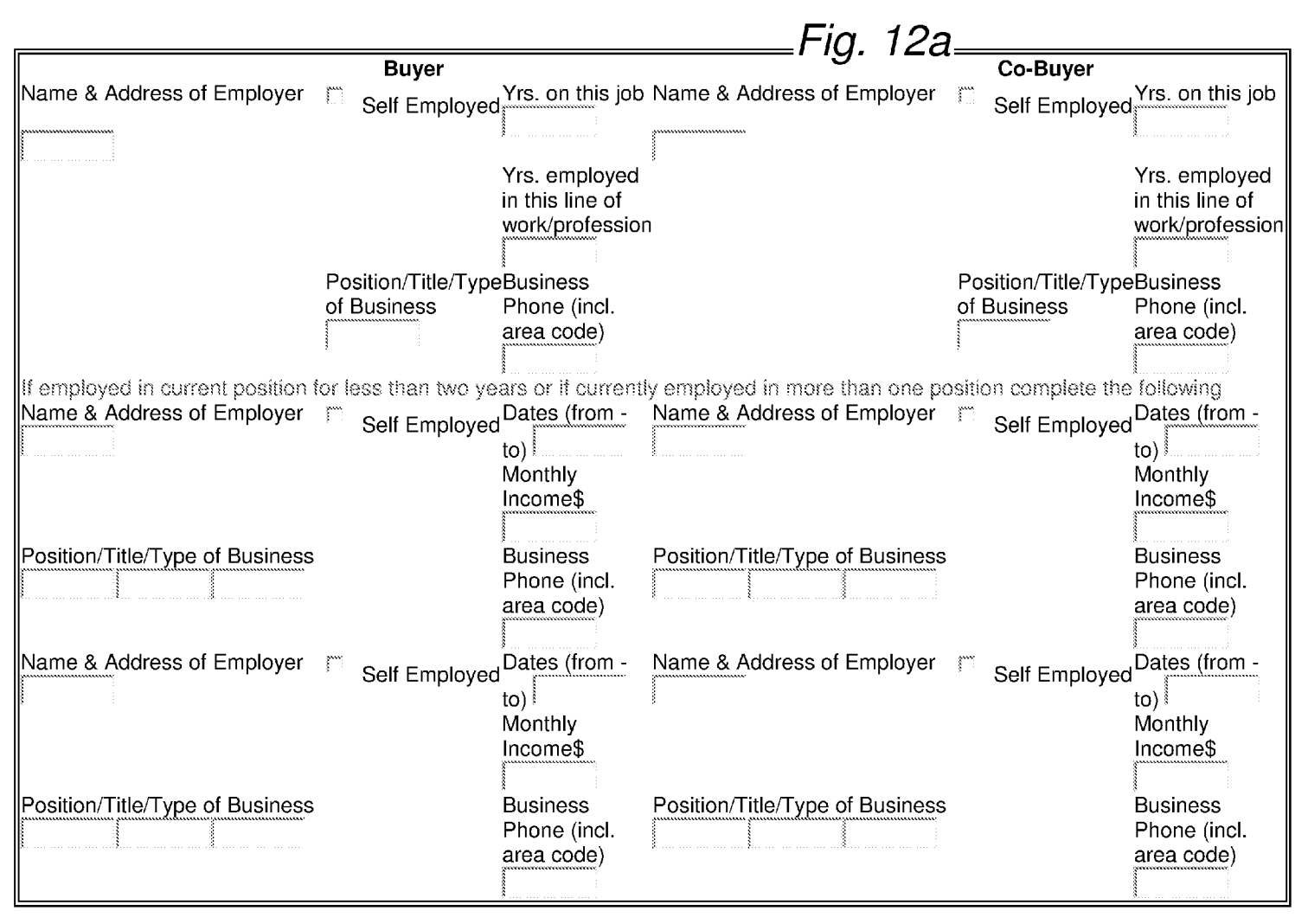

FIG. 12 is a view depicting Buyer Information Tab Table;

FIG. 12a is a view depicting Buyer Employment Information Tab Table;

FIG. 12b is a view depicting Buyer Income Financial Information Tab Table;

FIG. 12c is a view depicting Buyer Liabilities Financial Buyer Information Tab Table;

FIG. 12d is a view depicting Buyer Source of Downpayment Financial Information Tab Table;

Figure 13C:
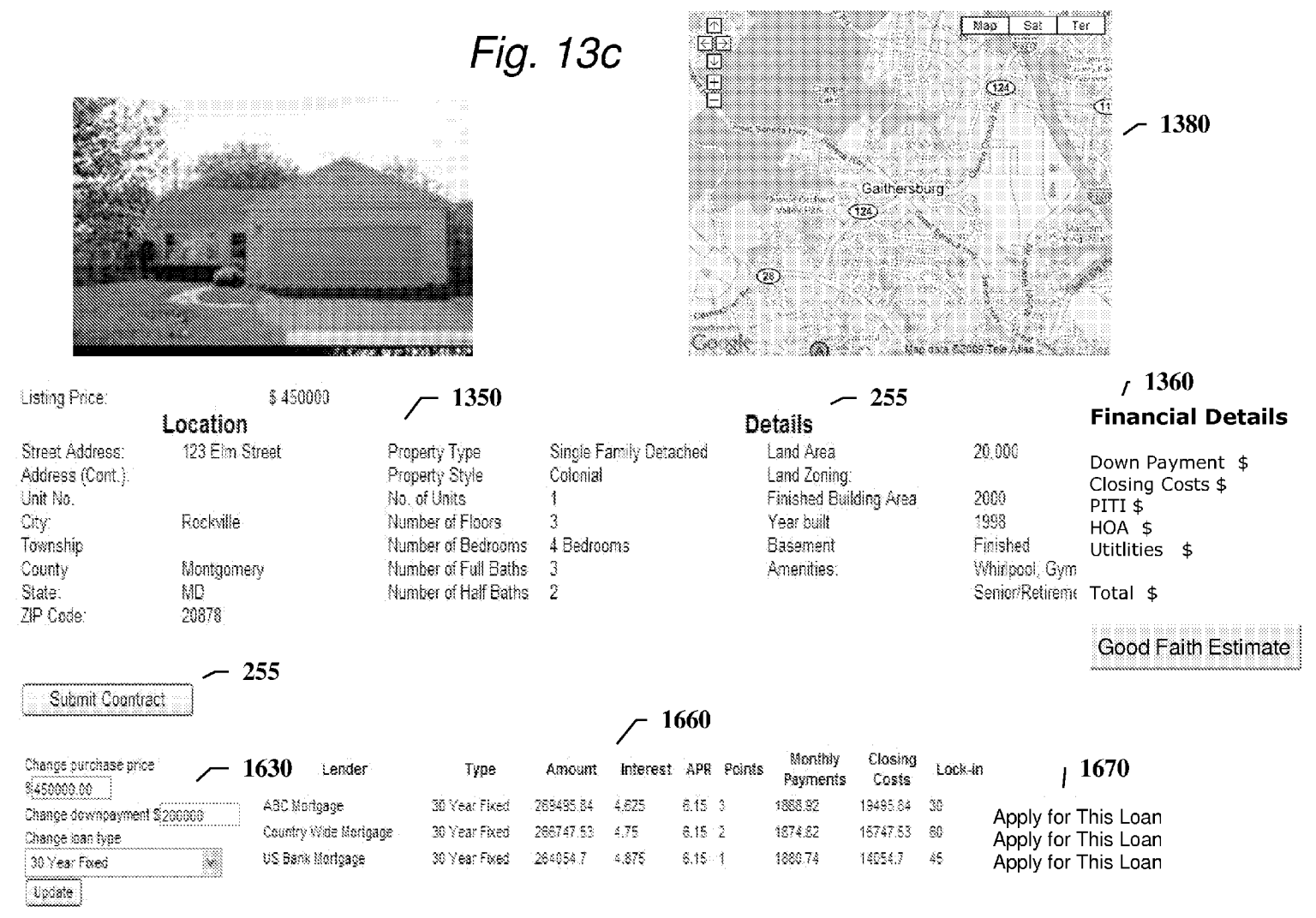

FIG. 13 is a view depicting Property Search for Home Tab Table with Home Search Results;

FIG. 13a is a view depicting Property Search for Home Tab Table with Home Search Results, Loan Information, Service Information, and Ownership Cost Information;

FIG. 13aa is a view depicting Property Search for Home Tab Table with Home Search Results and Multiple Search Results for Loan Information, Service Information, and Ownership Cost Information;

FIG. 13b is a view depicting combined Property Search for Home, Mortgage Search & Prequalify/Pre-approve, and Services Search Screen;

FIG. 13bb is a view depicting combined Simplified Property Search for Home, Mortgage Search & Prequalify/Pre-approve, and Services Search Screen;

FIG. 13c is a view depicting Property Search for Home Details with Multiple Search Results for Loan Information, Service Information, and Ownership Cost Information;

FIG. 14 is a view depicting Property Sale Summary Information Tab Table;

FIG. 15 is a view depicting Contract of Sale (Sample);

FIG. 16 is a view depicting Mortgage Search & Prequalify/Pre-approve Tab Table with Search Results;

FIG. 17 is a view depicting Mortgage Prequalified/Pre-approved Letter;

FIG. 18 is a view depicting Mortgage Prequalified/Pre-approved Tab Table with Loan Summary Information;

FIG. 20 is a view depicting Services Order New Service Tab Table Showing Bidding Status with Bid Results (Showing Virtual Real Estate Office Services);

FIG. 20a is a view depicting Seller/Buyer Consolidated Bid/Quote Results;

FIG. 21 is a view depicting Service Provider Virtual Desktop Work Area Showing Bid Request and Order Information Tab Table;

FIG. 22 is a view depicting Service Provider Virtual Desktop Work Area Showing Service Order and Order Information Tab Table;

FIG. 23 is a view depicting Services Order New Service Table Showing Confirmed Order Status (Showing Virtual Real Estate Office Services);

FIG. 24 is a view depicting Virtual Mortgage Office Transaction Navigator and View;

FIG. 25 is a view depicting Mortgage Loan Quote Tab Table;

FIG. 25a is a view depicting Mortgage Loan Quote Tab Table Search Results;

FIG. 26 is a view depicting Mortgage Loan Prequalified/Pre-approved Tab Table Showing Loan Summary;

FIG. 26a is a view depicting Mortgage Loan Prequalified/Pre-approved Tab Table Showing Loan Summary (continued);

FIG. 27 is a view depicting Mortgage Residential Loan Application Form 1003 Entry Tab Tables;

FIG. 28 is a view depicting Mortgage Loan Approved Loan Summary Tab Table;

FIG. 28a is a view depicting Mortgage Loan Approved Loan Summary Tab Table (Continued);

FIG. 29 is a view depicting Virtual Settlement Office Transaction Navigator and View;

FIG. 30 is a view depicting Virtual Settlement Office Order Tab Table;

FIG. 31 is a view depicting Virtual Settlement Office Title Documents Tab Table;

FIG. 32 is a view depicting Virtual Settlement Office Settlement Statement HUD-1 Entry Tab Tables;

FIG. 34 is a view depicting Virtual Settlement Office Escrow Accounting Entry Tab Online Electronic Payment Tab Table;

FIG. 35 is a view depicting Virtual Settlement Office Online Electronic Land Records Recording Transmittal (Sample);

FIG. 36 is a view depicting Virtual Settlement Office Online Electronic Final Loan Closing Document Transmittal to Mortgage Lender (Sample).

DETAILED DESCRIPTION OF THE PREFERRED EMBODIMENTS OF THE INVENTION

General Description

The following description sets forth some illustrative preferred embodiments of the invention. It should be understood based on this disclosure that the following description is illustrative and non-limiting and that various modifications, alterations, changes and/or the like can be employed in various embodiments of the invention. In addition, various components of the various embodiments can be replaced with equivalent structures (including presently known equivalents and/or future known equivalents) as would be understood based on this disclosure.

Figure 1:
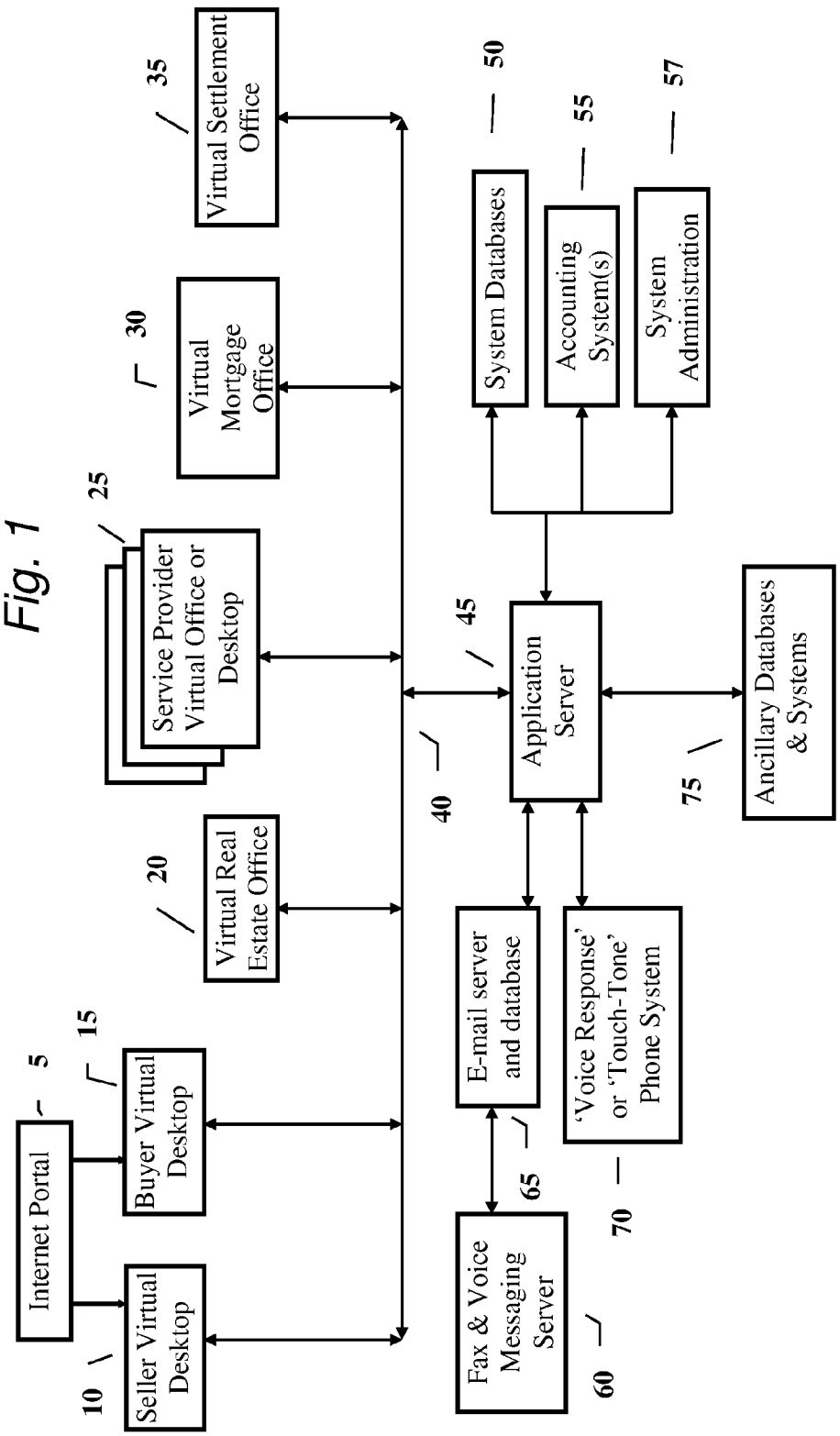
FIG. 1 is a System Overview and Architecture of a Home Sale, Mortgage Financing and Settlement Computer Process.

The preferred embodiments provide, for example, a comprehensive computer system for automating and facilitating the performing and processing of tasks, and information transfer and storage associated with the home sale, mortgage financing and settlement process over a distributed computing network 40 (See FIG. 1). The technology automates one or more tasks or process of the real estate home sale, mortgage loan, and settlement process in one continuous computer program, including one or more, or all of the tasks and process of the various participants including performing one or more tasks, process or activities in the transaction for the seller 10 (See FIG. 3*d*), the buyer 15 (See FIG. 3*e*), the real estate sales personnel 20 (See FIG. 3*a*), the mortgage loan officer, loan underwriter, loan processor and loan closer 30 (See FIG. 3*b*), the settlement service provider 35 (See FIG. 3*c*), and various service providers 25, (See FIGS. 19-23).

A property or home can include, for example any real property including a dwelling such as a home, house, dwelling, single-family home, a condominium, cooperative, mobile home, vacant land for a home, a duplex, or a multiple dwelling unit building. It can also include commercial real estate including land and buildings, as more particularly described in alternative embodiments hereinafter described.

In this disclosure, the term 'user' of the system used hereinafter includes, inter alia, one or more of the following terms: seller 10 and buyer 15 should be construed broadly and read as including someone acting for them or performing the process on their behalf; real estate agent, real estate office, real estate personnel, real estate broker which should be should be construed broadly and read as interchangeable including their functions being performed by one or more of them, or others, or the process and system 45 performing similar tasks and functions; in addition, mortgage lender 20 or mortgage office should be construed broadly including, for example mortgage brokers, direct mortgage lenders, mortgage correspondents, wholesale lenders, finders and their personnel and read as interchangeable and their functions being performed by one or more of them or the process and system 45; in addition, settlement service provider 35, settlement office or settlement personnel should be construed broadly and may include for example attorneys, title insurance companies and their personnel and read as interchangeable and their functions being performed by one or more of them or the process and system 45; move consultant or transaction coordinator can mean any person or entity providing assistance to any of the users of the process and system or in facilitating the processing of the transaction, including performing one or more of their respective tasks and processes for one or more users.

The terms service, service provider, service information, and service provider information used herein should be construed in a very broad sense as any information or the providing of any service or information to sell a property, buy a property (or refinancing where appropriate), make a loan, provide a service, provide a settlement service or transfer title to a property which can include, for example: information available from any source or one or more sources, for example, one or more databases and systems, 50, 75, one or more users 20, 25, 30, 35 or other sources 59, which sources should be construed as interchangeable where appropriate, can include one or more of a quote, bid, order or service information, can include one or more individual or bundled services, can include information previously entered by one or more users 20, 25, 30, 35, 59 into one or more databases and systems, can include one or more information generated automatically 45, or manually, and can include one or more, for example: advertising information, appraisal information, architect information, builder information, building permit information, construction service information, credit information 112, delivery, digital lockbox system information, employment, loan, deposit or other verifications 340, environmental information (including for example biological, air and water quality, earthquake, geological and soil reports), flood information 125, governmental department and agency information, home improvement and repair service information, home inspection information, home photographs, homeowner association (HOA) information, homeowner warranty (HOW) information, homeowner insurance information, land, court and public record information, land use information (including for example building code, zoning and land use information), landscaping service, mortgage lender information 30, mortgage insurance (PMI, VA, FHA) information 115, mortgage investor information, mortgage loan payoff information, mortgage servicing information, mortgage loan verification information (employment, loan, deposit or other verifications) 340, move consultant or transaction coordinator information, moving and storage service 25, 'multiple listing service' (MLS) information 85, real estate agent information 20, real estate broker information 20, real estate signs, real estate tax information 130, settlement or closing service information 35, survey information, termite and pest inspection 25, title information, land or public records information 140, title abstract or search service information, title insurance information, transfer taxes and recording charges information 135, utility (public or private) information 97, well & septic service;

A mortgage loan, loan, or financing can include one or more different types of loans or financing, for example, any granting or extension of credit, a loan, an unsecured loan, a mortgage loan, a first mortgage loan, a second mortgage loan, a loan secured by deed of trust, a loan secured by a security instrument, a land development loan, a construction loan, home equity financing, equity investment, or any combination thereof, and the terms should be construed as interchangeable.

Figure 2:
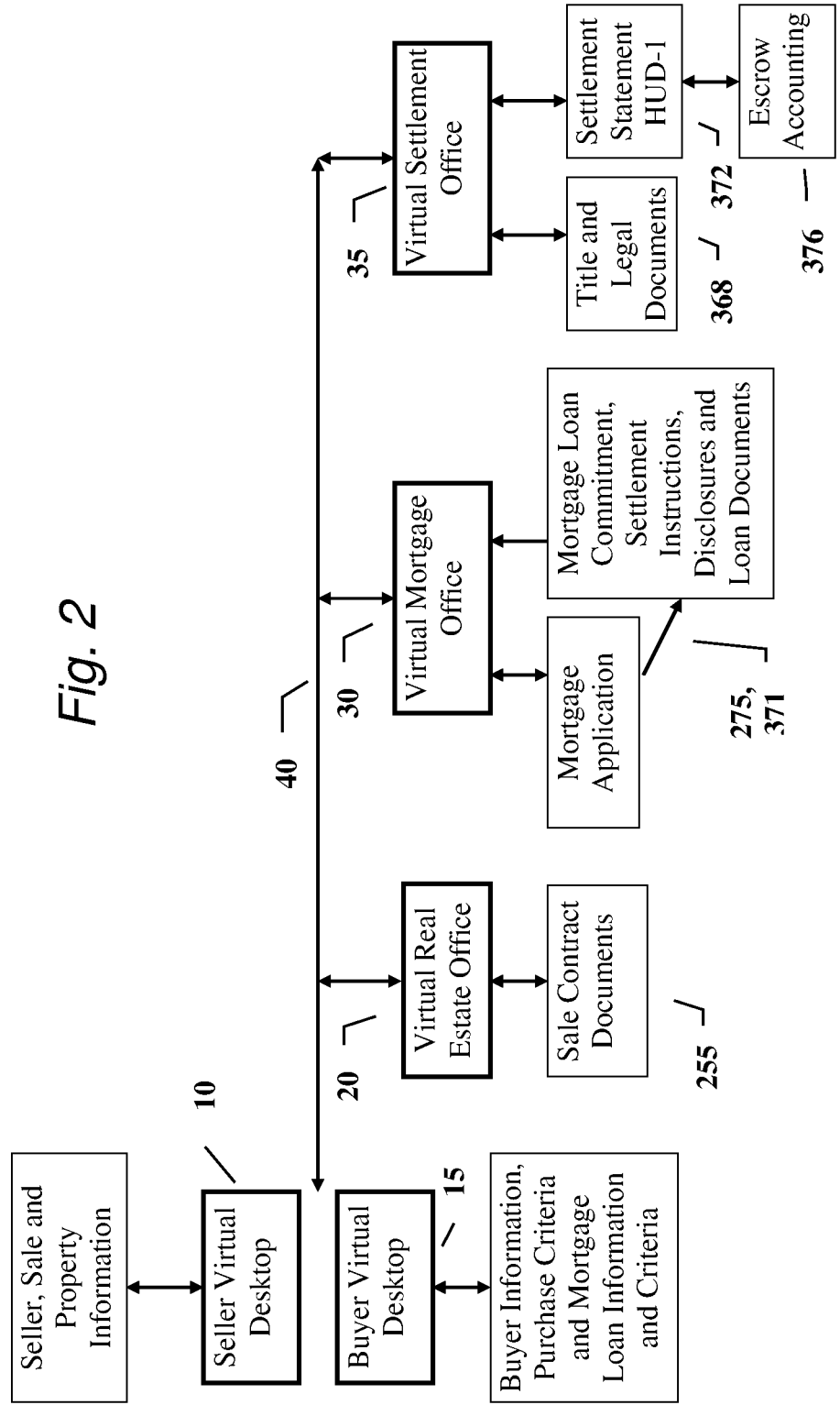
FIG. 2 is a view depicting Basic Home Sale, Mortgage Financing and Settlement, Information and Basic Document Workflow Process.
Figure 2A:
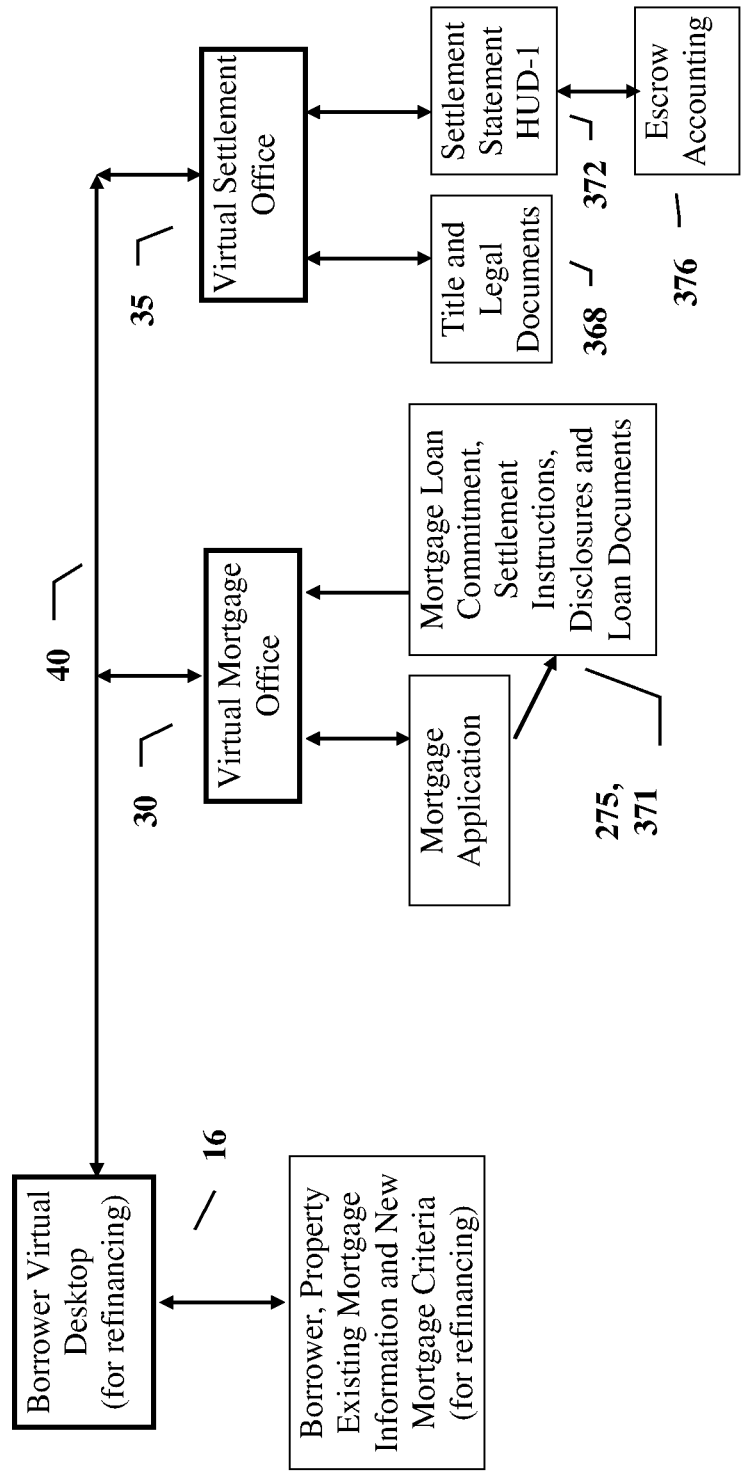
FIG. 2a is a view depicting Basic Home Mortgage Refinancing and Settlement Information and Basic Document Workflow Process.

In addition, a modification of this system is a comprehensive computer system for automating and facilitating the performing and processing of tasks, and information transfer and storage associated with the home mortgage refinancing and settlement process over a distributed computing network (See FIGS. 1b, 1c, 2a). Although the detailed description of the system, hereinafter, describes the home sale, mortgage origination and settlement process, the process, as described, can be modified for the home mortgage refinancing and settlement process (See FIGS. 1b, 1c, 2a) which would, in effect, eliminate the seller 10, real estate agent and office 20, and any sale contract 255 and sale process from the process leaving the buyer a 'borrower' 16 performing the mortgage origination process with the mortgage lender 30 and the settlement company 35 only as well as the respective service providers 25. In regard to this 'refinancing' modification, the reader should hereinafter disregard references to 'sale,' 'seller,' 'Seller Virtual Desktop', 'builder,' 'Virtual Real Estate Office,' 'real estate sale office' or 'real estate sale personnel,' 'sale contract documents,' 'purchase,' 'deed,' etc. and descriptions of any and all associated 'sale' activities, as well as corresponding references in the drawings such as (See FIGS. 1, 1a, 2) which refer to only the sale process, and substitute the term 'borrower' 16 for 'buyer' 15 and 'Borrower Virtual Desktop' 16 for 'Buyer Virtual Desktop,' 15 etc. in understanding any description of the process for a home mortgage refinancing. In addition, embodiments described herein can be modified, by those in the art based on this disclosure, in other environments, such as, e.g., for either the home sale or the refinance process based on this detailed description.

In some of the preferred embodiments, various manipulations herein described are often referred to in terms such as, e.g., adding, entering, requesting, receiving, retrieving, correcting, changing, performing, saving, viewing, sending, comparing, moving, etc. which are often associated with manual operations performed by a human operator. In the preferred embodiments, the various operations described herein are performed, for example either in conjunction with input from a human operator or user interacting with the computer system and processes 45, or, when possible, one or more of such operations may be construed as being performed by the computer system and process 45 itself and should be understood as such.

In the preferred embodiments, a comprehensive technology allows information to be generated or entered once, or subsequently changed or corrected if necessary, either manually by a participant, or automatically by the system and process 45, 45D, 45J, 45P, 45U, 45W or generated from one or more sources of information such as for example, ancillary databases or systems 75 (See FIGS. 1, 1a), said ancillary databases or systems being alternatively internal to the system 50, or external ancillary databases or systems 75, be transmitted over a distributed computing network 40, for example the Internet, saved in one or more medium, for example, one or more databases 50, 75, and appropriate information made available at one or more appropriate times, as necessary, appropriate or expedient, to any appropriate parties or for the application server 45 to perform further activities, tasks, or processes, or generate information or documents for the entire transaction.

Any description of an Internet portal or Website 5 should be construed in a very broad sense including any way Buyer 15, Seller 10 or Borrower 16 or other users 20, 25, 35, 59 can access the system and process, for example, through the Internet or otherwise, which can include, for example: a Website, including an Internet portal, real estate Website, mortgage lender Website, or home appraisal Website including using any means to access including a wireless or other electronic computing device, or alternatively any electronic device such as a touch tone or voice response system 70.

Information and data include one or more information to buy a property, make a loan, provide a service, provide a settlement service or transfer title to a property, and may be in one or more various forms and includes, for example text, formulas, electronic information, digital information, computer data, computer instructions, computer coding, graphics, or audio and video whether recorded or transmitted in real-time.

Information and data can be generated by the process and system 45, 45W or generated or retrieved from one or more sources of information including, for example internal databases 50, 75, external databases and systems 75, or one or more other sources to the extent practicable, such as computer files, web servers, extranets, intranets, file shares, content management systems, and other applications, including using any available tools such as for example, Google's "search appliance," "cloud computing" or other current or further technologies which can generate relevant information from one or more sources.

Ancillary systems 75, whether internal or internal, for example, automated underwriting 110, may also perform one or more tasks and processes described herein where necessary, expedient or practicable.

Information and data can be stored in or retrieved from one or more internal or external medium including for example internal 50, 75 or external databases 75, including relational databases of one or more database structures. It is noted that ancillary databases or systems may be either internal 50 or external 75 to the basic system described herein, but which, nevertheless, are an integral part thereof.

Information and data include information to buy a property, make a loan, provide a service, provide a settlement service or transfer title to a property, and can include such information as, for example, one or more of the following: accounting and financial information, appraisal information, builder information, builder home inventory information, building permit information, buyer information, buyer personal information, buyer employment and financial information, buyer personal information, comparable sale information, credit information, digital lockbox system information, environmental information (including for example biological, air and water quality, earthquake, geological and soil reports), homeowner association (HOA) information, homeowner insurance information, land use information (including for example building code, zoning and land use information), listing information, loan search criteria information, loan search results information, 'multiple listing service' (MLS) information 85, mortgage insurance information, mortgage lender information 30, mortgage insurance (PMI, VA, FHA) information 115, mortgage loan information, mortgage loan application information, mortgage loan document information, mortgage loan funding information, mortgage loan product and pricing information, mortgage loan quote, prequalification, preapproval or approval information, mortgage loan servicing information, mortgage loan underwriting information, property information, property search criteria information, property search results information, real estate agent information, real estate broker information, real estate tax information, sale contract information, seller information, service provider and service information, service provider pricing information, settlement escrow accounting information, settlement instruction information, settlement or closing service information 35, settlement order information, settlement statement information, title and recording information, title insurance information, transaction task and status information, utility information;

While the system may be implemented on one computer system such as a single personal computer, it is more likely to be implemented on a distributed computing network 40 (See FIG. 1). The distributed computing network 40 (See FIG. 1) may be a local area network (LAN) or a wide area network (WAN), such as, for example the Internet, a hard-wired or wireless network, or any combination thereof, and most likely will be implemented on the Internet or an Extranet for the immediate future.

The basic processes can be varied or augmented numerous ways with such things as, for example: 1. screen lay outs and content can be varied; 2. allowing users to input or retrieve information via any wireless Internet device such as a 'digital Internet cell phone' or a 'palm pilot'; 3. portions of the process can be simplified and/or automated, eliminating or combining certain functions, tasks, process or steps or participants, for example by allowing a seller and buyer and seller perform a transaction without the aid of a real estate agent; 4. a customer or user can be allowed to 'input' or retrieve information via a telephone 'voice response' or 'touch-tone' technology 70 (See FIGS. 1, 1b); 5. a system can be developed for multiple companies so that different users will only use portions of the system, i.e. an 'Internet', or one system can be built for one company where everyone within one company, other than the seller, buyer and service providers, use all of the system, i.e. an 'extranet;' or, 6. the process can be simplified and the real estate sales, mortgage and settlement screens, tasks and processes can be combined so that fewer people could perform the enter process in a fraction of the time; and 7. the order of steps and processes can be varied.

One or more application servers 45 run and perform computer program tasks and processes which perform the functions necessary to generate, send, receive and display information to users to enter, manipulate and view information, and perform tasks on remote, or local computing devices 10, 15, 20, 25, 30, 35, such as for example a personal computer connected to a network 40, for example the Internet, receive information back from users, process it if necessary, store it in one or more databases 50, send it if necessary for use or processing by one or more ancillary systems or databases 75 (See FIGS. 1a, 1c) such as a multiple listing service 85 or automated mortgage underwriting systems 110 to perform necessary ancillary tasks or processes 75 (See FIG. 1a), receive back results and save to one or more databases 50, 75 (See FIG. 1) and make it available to all appropriate parties by again sending information and displaying screens to users 10, 15, 20, 25, 30, 35, to view and perform subsequent activities on their respective computing devices.

Although and there are numerous computer technologies with which this computer process could be developed and carried out, including connecting together older extrinsic computer programs 59, such as for example various real estate sales, mortgage and settlement programs, so information can be passed from one program and user to another, the preferred embodiments of the invention, provide a comprehensive client-server technology (See FIG. 1) allowing the users 10, 15, 20, 25, 30, 35 to use a computing device, for example a personal computer (PC) with a display to view 'GUI' screens, and common input devices, for example a mouse and keyboard which access one or more application server(s) 45 over a network, for example, the Internet or over a secure 'Extranet', via TCP/IP 40. The application server(s) 45 would connect to one or more relational databases 50, 75 for transaction data and information to be saved and retrieved. These databases could be built in typical database programs such as, for example, SQL, DB2 and Oracle, and the application server process could be programmed in such tools as, for example, ASP and DOTNET programming environment from Microsoft, PeopleSoft's 'Portal', or IBM's 'Domino,' 'Websphere' and 'Websphere Portal' in conjunction with using, for example, XML, JAVA and HTML or other programming tools. In addition, there are one or more 'ancillary' databases and systems 75, (See FIG. 1a) with which the application server can exchange information. These 'ancillary databases and systems' 75 (See FIGS. 1a, 1c) may be internal to and developed with the system, or they may be provided by third-parties.

The preferred embodiments and best mode of carrying out the invention is client-server architecture with one or more application servers 45 which run and manage the tasks and processes described herein. Actions taken by one or more users 10, 15, 20, 25, 30, 35 on their client computers are sent to and processed by the application server 45 which performs tasks and processes on information, serves up information on client user screens on computing devices, sends and retrieves information to and from databases or ancillary computer processes 50, 75, and distributes information according to one or more application server programming instructions 45 to the various users 10, 15, 20, 25, 30, 35, managing and making the entire process possible.

The terms used hereinafter, such as for example 'application', 'application server', 'computer program,' 'computer process,' 'computer application,' etc., are used interchangeably and deemed for the purposes of this application and the claims to mean one or more computer applications performing the computer tasks, processes and functions herein described unless otherwise indicated. Application servers 45 can include "cloud computing."

As described herein, in various embodiments, one or more server(s), computing devices, client computer(s), application computer(s) and/or other computer(s) can be utilized to implement one or more aspect of the invention. Illustrative computers can include, for example: a central processing unit; memory (e.g., RAM, etc.); data storage (e.g., hard drives, etc.); input/output ports (e.g., parallel and/or serial ports, etc.); data entry devices (e.g., key boards, etc.); etc. In addition, client computers may contain, in some embodiments, browser software for interacting with the server(s), such as, for example, using hypertext transfer protocol (HTTP) to make requests of the server(s) via the Internet or the like.

While users may use any form of electrical computing device or general purpose computing machines or devices for clients to access and Interact with the system 10, 15, 20, 25, 30, 35 which could include for example, personal computes, laptops, kiosks, network terminals, digital Internet cell phones, palm pilots, iPods, PDAs, any other wireless device, or telephone voice response or touch-tone technology 70, the description herein describes the use of a common personal computer with a display, a keyboard and pointing device such as a mouse. Electronic computing devices may also include any other suitable programmable electronic devices consistent with the invention.

It is pointed out that the order of steps or activities, and whether particular tasks are performed manually or automatically, is flexible and can be programmed to be varied to give the process and users as much flexibility as possible. In addition, various steps may be modified, simplified, and one or more tasks may be combined to simplify and streamline the over-all process. For example, while the description is of a real estate office, mortgage office, settlement office and service providers in the process, it is entirely possible and on object of the invention to combine one or more of their tasks and processes, have the process and system 45 perform as many tasks and processes automatically as possible, and have the entire process performed by fewer users.

It is pointed out that although the detailed description describes preferred embodiments including one 'real estate sales office' in the process, in some instances there may be two or more such sale offices, for instance where there is a cooperating seller's agent and a buyer's agent. In such circumstances, the process is substantially the same and the resulting change in the process may be easily inferred by the reader.

In the preferred embodiments, computer processes can be used to automate, streamline, simplify and enhance 'real world' processes currently being ineffectively employed by the real estate, mortgage, and settlement markets today. While the preferred embodiments involve a 'real world' process designed for the way real estate is sold today, the process could be modified for, for example, a 'self-help' buyer or seller to use, or a 'for sale by owner' solution without the help of a real estate agent or sales person, could be used on, for example, a kiosk in a shopping mall or could be adapted to be used with a 'move consultant' or 'transaction coordinator,' or an equivalent to assist others in the transaction.

It is also pointed out that certain of the drawings herein attempt to reflect the 'workflow' of the process and system, rather than the actual system architecture, in particular, (See FIGS. 2-3*e*) show the process results from the users prospective, rather than the fact that all information, whether the result of user input or processes 45 performed, in most cases is transferred to and from the application server(s) 45 and one or more databases and systems 50, 75.

Under a typical configuration of a preferred embodiment of the invention, there are separate graphical user interfaces (GUI) accessible on a personal computer used by each user with screens appropriate to their activities. The seller "virtual desktop" 10, (See FIG. 3*d*) the "buyer virtual desktop" 15 (See FIG. 3*e*), the "virtual real estate office" 20 (See FIG. 3*a*), the lender "virtual mortgage office" 30 (See FIG. 3*b*) the settlement company "virtual settlement office" 35 (See FIG. 3*c*) and service providers virtual office or virtual desktop 25 allow each to enter, manipulate, receive, send and view appropriate information and perform appropriate tasks and processes associated with their roles in the transaction.

Any tasks and processes performed or information generated by any user manually, or by the application or computer process 45 at any stage of the process immediately make possible 45 one or more other real estate sale, mortgage loan, settlement or other activities, tasks, processes and generation of information or documents, either manually or automatically. This avoids gaps and delays.

One aspect of the system that is of importance is that of uniformity and simplification of the process. If one were to look at a number of real estate programs, mortgage origination programs and settlement programs one would see numerous different screen layouts with varying information displayed, all of which would become confusing and daunting very quickly. In researching this process, however, it was realized that much of the information and how it is displayed is similar throughout the transaction, and it is only for particular functions that unique screen functions and layouts are necessary. Therefore there are many screens, for example, which appear in the Work Area 450, 550, 650, Tab Tables 460, 560, 660, which are in fact forms and subforms served up and displayed by the application server, such as 'seller information' (See FIG. 10), 'property information' (See FIG. 11), 'buyer information and buyer employment and financial information' (See FIG. 12), 'property search' (See FIG. 13), 'sale summary information' (See FIG. 14), 'loan search' (See FIG. 16), 'mortgage loan application' (See FIG. 27), loan underwriting (See FIG. 28), loan summary table (See FIG. 28*a*), and 'ordering services' (See FIGS. 19, 20, 23), which can be displayed with minor modifications of some content, for more than one user; and it is only those screens that are unique to a particular user, task or process such as the 'mortgage approved loan' table (See FIG. 28) for the lender, and the settlement order (See FIG. 30) and settlement statement entry tables (See FIG. 32) or escrow accounting (See FIG. 33) for the settlement service provider that are different. This has greatly simplified understanding and the design and the process and will greatly reduce the cost and complexity of building, modifying and adding new features to the system from time to time.

Each virtual office will be one integrated computer program for each user from which they can receive, view, enter, change, save data, perform their particular functions in the transaction, create, save and send all documents, order services from third-party service providers, track the transaction, and communicate with other participants in the particular transaction. The "virtual office/desktop" technology will eliminate many of the current disadvantages of the current art allowing users to operate their entire office and perform literally 100's of functions without having to use different programs and/or to navigate back-and-forth or "link" to constantly-changing Web-pages.

Figure 4:
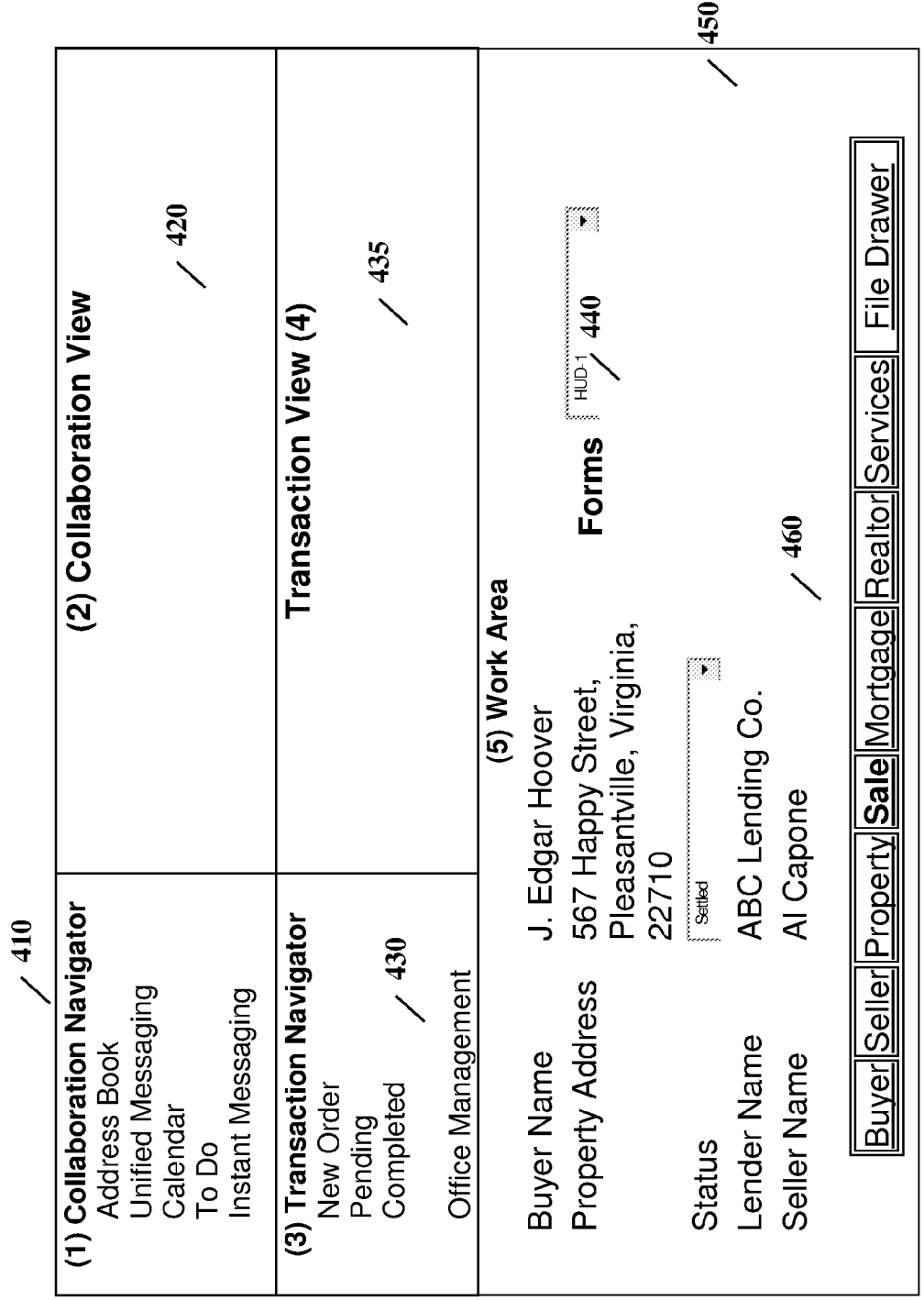
FIG. 4 is a view depicting Virtual Office and Work Area Screen Layout.
Figure 6:
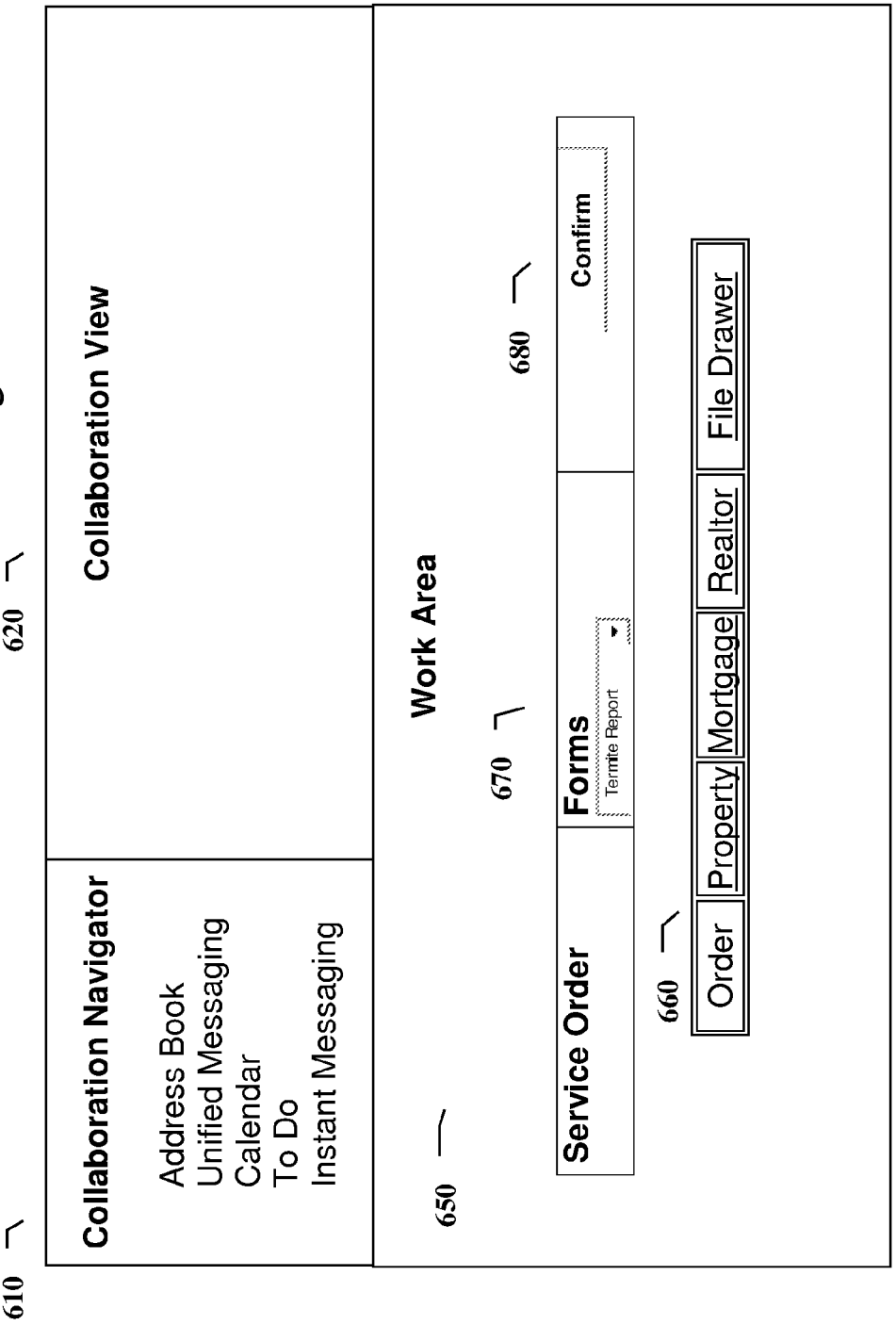
FIG. 6 is a view depicting Service Provider Virtual Desktop and Work Area Screen Layout.
Figure 19:
FIG. 19 is a view depicting Services Order New Service Tab Table (Showing Virtual Real Estate Office Services)

The layout of each virtual office (See FIG. 4) and each customer, buyer or seller, virtual desktop (See FIG. 5), and the service provider virtual desktop or service provider virtual office (Transaction Navigator and Views not shown) (See FIG. 6) can for example include the following:

The Collaboration Navigator 410, 510, 610 allows a user to select and access a Address Book, Unified Messaging, Calendar, To Do and 'Instant Messaging' by clicking with a pointing device such as a mouse on appropriate item selected to be displayed in the Collaboration View 420, 520, 620. The Collaboration View 420, 520, 620 allows a user to access and 'collaborate' with others in the transaction. These include: 'Unified Messaging' view which allows users to send and receive and view e-mails 65, receive and view all documents created with the technology, and receive voice phone messages and facsimiles from a fax & voice messaging server 60. The user can manually save them to the 'File Drawer' tab (See FIG. 8) in the Work Area 450, 55, 650 for a particular user for a particular transaction, or the program can save items automatically.

The Address Book view allows user to keep and view customer and service provider information such as addresses, phone numbers, e-mail addresses, etc. for customer and 'service provider' contact management. Information in Address Book is integrated with Work Area 450, 550, 650 so that information entered or actions taken in one are reflected and displayed in the other, and visa-versa.

The Calendar View (See FIG. 7) automatically displays a calendar with appropriate information about transaction events and status, allows users to create and schedule events, meeting times, and 'to do' items as necessary, appropriate or expedient for their tasks or functions. The items can be marked 'private' or 'group' and the 'Group Calendar' is displayed, for all others in a particular transaction to see the event and status of that particular transaction from their respective Virtual Desktop or Virtual Office as necessary, appropriate or expedient for their tasks or functions. The Calendar is integrated with Work Area 450, 550, 650 so that actions taken or information entered in one area are reflected and displayed in the other, and visa-versa.

The To Do View displays items that need to be completed in any particular transaction. To Do items can be created manually by users in the To Do view, in the Work Area, or automatically by the application server 45. The To Do View is integrated with Work Area 450, 550, 650 so that actions taken or information entered in one are reflected and displayed in the other.

Instant Messaging & Application Sharing allows users to use 'instant messaging' ('chat') including voice and audio, and application sharing to simultaneously collaborate on a particular screen or document such as the sale contract documents 255 (See FIG. 15), Loan Application (Form 1003) (See FIG. 27) or Settlement Statement (HUD-1) on a 'real-time' basis with other parties in the transaction. For application sharing, the application server 45 allows two or more users to display a screen, enter and save information on a real time basis, thus eliminating waiting for and having to send information back and forth. Important 'chat' sessions can be recorded and saved to the appropriate File Drawers (See FIG. 8) for a permanent record.

The Transaction Navigator 430, 910, 2410, 2910 (See FIGS. 4, 9, 24, 29), which is only used in the virtual office configuration, automatically displays, sorts and tracks stages of each transaction. As there are significant changes in the status, for example 'new order,' 'pending,' 'completed,' etc., the computer application automatically moves the particular transaction into a different stage category. Users can view transactions by each status by selecting a particular status category in the Transaction Navigator 430 which then displays summary information of all transactions within that status category in the Transaction View 435. Customers (i.e. buyer or seller) will not have this Transactions Navigator in their Virtual Desktop and service providers will have it in their Service Provider Virtual Office, but not in their Service Provider Virtual Desktop.

The Transactions View 435, 920, 2420, 2920 (See FIGS. 4, 9, 24, 29), which is only used in the 'virtual office' configuration, automatically displays summary information for each 'transaction' for example for a real estate sale, buyer, seller, property address, contract price, status of sale and displays individual tasks necessary to complete a particular transaction, for example 'signs', 'inspections,' 'advertising,' etc. and displays the status of each, for example 'ordered,' 'past due,' 'completed,' 'approved,' etc. The computer program allows user to sort transactions by criteria by clicking on column heading. User can select a particular transaction by clicking on that transaction in the Transaction View 435, 920, 2420, 2920 (See FIGS. 4, 9, 24, 29) and the transaction details are then displayed in the Work Area 450 allowing user to access detailed transaction information and to perform tasks for that particular transaction. Customers (i.e. buyer or seller) will not have this Transactions View in their Virtual Desktop and service providers will have it in the Service Provider Virtual Office, but not in the Virtual Desktop.

The Work Area 450, 550, 650 (See FIGS. 4, 5, 6) allows users to access particular transaction details in the Work Area by selecting and clicking on the transaction in the Transaction View screen, if they have one. The Work Area allows users to perform tasks, enter or view detailed information. Each Virtual Office Work Area will have Summary Information 440 (See FIGS. 4, 4*a-c*). In the Work Area Summary Information users can create documents. For example the real estate agent can create real estate sale contract documents 440, 255 (See FIG. 15), the lender can create loan documents, 470, and the settlement company can create settlement, legal or title documents 485. The status can be manually changed 445, 460, 480, or automatically changed by the program upon occurrence of certain actions performed anywhere in the computer program or by certain events occurring. To create documents in the Work Area, a 'Document Database' 100, 120, 127 can be accessed, a form selected, automatically filled in with all information which already exists in the system, or manually entered, edited, printed and saved and sent to others in the particular transaction, so they can view them in their respective Collaboration View 420, 520, 620 when they receive them or in their respective 'File Drawer' (See FIG. 8).

Detailed information is entered into and viewed by users, and functions are performed, in various Work Area Tab Tables 460, 560, 660 (See FIGS. 8, 10-14, 16, 18-20, 23, 25-28*a*, 30-33). These are accessible in the 'Work Area' 450, 550, 650 and users can navigate from one table to another by selecting a particular tab such as by 'clicking' with a 'mouse' to view information in that particular table such as 'Order Information' (See FIG. 30), 'Buyer Information' (See FIG. 12), 'Seller Information' (See FIG. 10), etc. to enter or change information, and perform various transaction tasks associated with their role in the process such as ordering services (See FIG. 19), accessing electronic documents saved in the 'File Drawer' (See FIG. 8), etc. Tab Table screens are dynamic forms which the application server 45 allows to be displayed on each client device. Some tab tables are 'dynamic,' meaning as information is entered, or actions are performed, the layout and information presented changes automatically on the screen to allow the user to proceed with the process automatically and more easily. To make the system as easy to develop and operate as possible, many basic 'tab tables' are used by more than one user. Also the various tab tables can be varied, by adding or creating new ones, deleting, combining, modifying the contents, or changing their order on screens. Various "tab tables" and the information they contain or the functions they perform can be varied in numerous possible ways, and are described in more detail below.

When it is described that documents can be signed electronically it includes, for example, any necessary electronic notary signatures, seals, etc., or other electronic authentication deemed acceptable by users and required and allowed by appropriate laws. Similarly, electronic certifications or verifications may be any deemed acceptable by users and required and allowed by appropriate laws.

The computer program saves, either automatically or manually, all appropriate documents including e-mails, faxes, and phone messages 65 in one or more system databases 50 for a complete record of each transaction which can be viewed by users in an electronic File Drawer (See FIG. 8). User can save and access a document as necessary, appropriate or expedient, for their tasks or functions in the File Drawer (See FIG. 8) by clicking on the 'File Drawer' tab 810, selecting a particular document, and 'clicking on the document to open the document for viewing or editing, etc.

The 'Office Management' in the Transaction Navigator 430, 910, 2410, 2910 (See FIGS. 4, 9, 24, 29) will allow a user to access and perform general 'back office' support features in the Work Area 450 such as integrated billing accounting functions, including billing and payments for transactions, management functions such as integrated summary production and activity reports. The 'Office Management' will have other office administration functions of a more general nature such as human resources, etc.

System administration 57 can be done from one or more central regional or individual office locations from one or more computing devices for performing such function as, for example, adding and deleting customers, service providers, customer support and training, managing customers, billing functions, managing system modifications and upgrades, etc. Management and administration can be done as a service for customers or customers or their organizations such as for example a multiple listing service provider, a Realtor association, etc. can operate and manage the system for them.

Virtual Real Estate Office

Figure 3B:
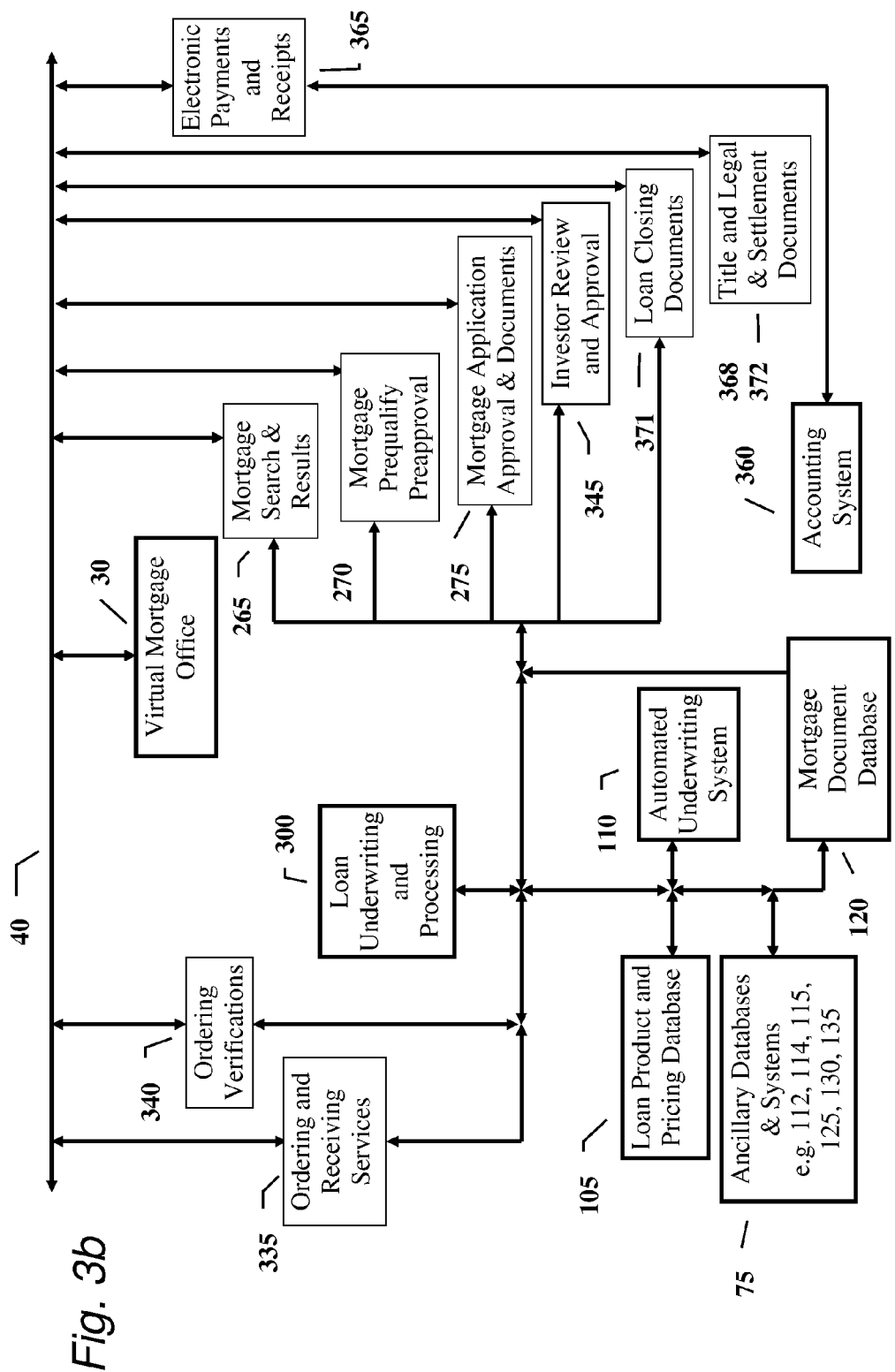
FIG. 3b is a view depicting Detailed Virtual Mortgage Office Information and Document Workflow Process.

The Virtual Real Estate Office 20 (See FIGS. 1, 2, 3a) will allow the real estate agent and their staff (or home builder sales office) to perform all of their transaction activities from one comprehensive computer program; to enter, receive, communicate and exchange information with buyer 15 (See FIG. 3e) and seller 10 (See FIG. 3d), mortgage company 30 (See FIG. 3b), and settlement company 35 (See FIG. 3c) request bids for and order and tract services 235 from service providers 25, such as home inspections, advertising; insurance, settlement services, or utilities changes, send and receive information with a property database, for example, the 'multiple listing service' (MLS) 85 (or the home builder's subdivision inventory database) 90, create listing agreements 220, a sale contract and other sale documents 440, 255 (See FIG. 15), assist the home buyer to search for a loan 265, search for, be prequalified, preapproved, 270 apply for, be approved for a loan, and receive loan documents 275 from a mortgage lender 30 (See FIG. 3b). Information entered, documents created, or functions performed by the real estate office personnel or by the application server 45 are saved by the application server 45 into one or more databases 50, 75 and are made available for further functions to be performed, and appropriate documents and information made available to other people participating or steps in the transaction, for example the buyer, the seller the mortgage lender, the settlement company and service providers, as necessary, appropriate or expedient, through an automated or manual workflow process managed by the application server 45.

Specifically, the Virtual Real Estate Office has the following functionality:

The Virtual Real Estate Office 20 (See FIG. 3a) can receive the prospective seller(s) information 210 (See FIG. 10), and property information 210 (See FIG. 11) (in the case of the real estate agent as opposed to a builder) entered by the Seller in the Seller Virtual Desktop 10, 210 (See FIGS. 3d, 5) or alternatively, the real estate agent user can enter and save information manually and directly into the Virtual Real Estate Office 20, 210 (See FIGS. 3a, 10, 11) for example taking information by phone or with the customer physically present.

The sale person or agent user can choose and create various marketing documents and materials, retrieving and opening forms 440 from a forms database 50, 100 and create customer prospecting and marketing flyers, reports, or other marketing materials. The program automatically, or user manually can search and retrieve 'comparable sale information' from a Comparable Sale Database 80 and input into a Comprehensive Market Analysis (CMA) report including a marketing plan, according to criteria chosen by user, and save and send to Seller Virtual Desktop 10.

Figure 3C:
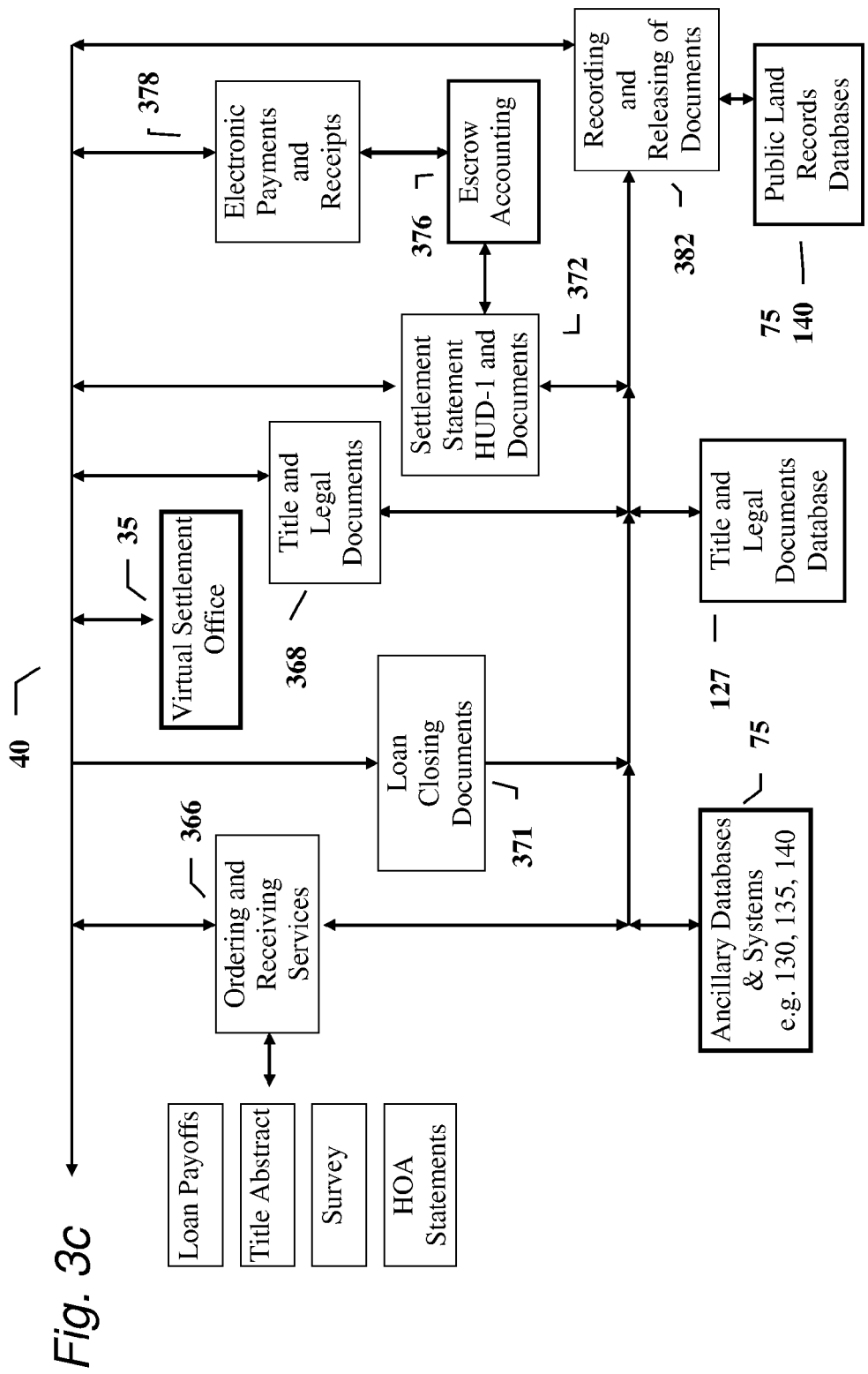
FIG. 3c is a view depicting Detailed Virtual Settlement Office Information and Document Workflow Process.
Figure 3D:
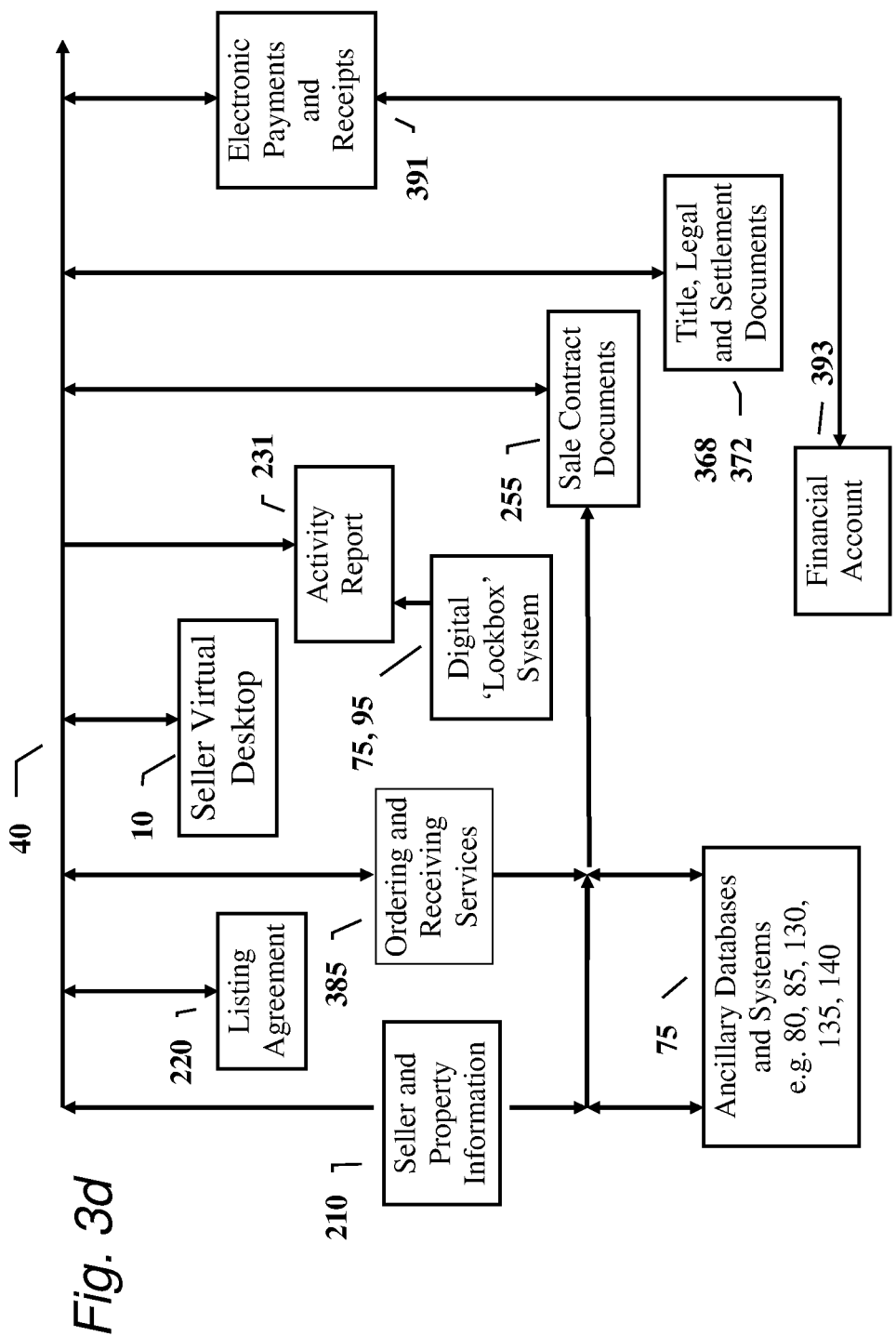
FIG. 3d is a view depicting Detailed Seller Virtual Desktop Information and Document Workflow Process.

In the case of real estate agent, the process 45, 45W can automatically enter seller, property 210 and listing information into the listing agreement forms 220 retrieved from the real estate document database 100 and user can send the completed listing to the Seller Virtual Desktop 10 and receive back listing agreement electronically signed by seller 220 (See FIG. 3d).

In the case of the real estate agent, property and listing information can be saved 50 internally and sent and entered into separate, internal property database 50 or external property database 75 including for example a 'Multiple Listing Service' (MLS) database 85, or builder home database 90, 450 (See FIGS. 1a, 3a, 4a).

The Virtual Real Estate Office can receive information from a Digital 'Lockbox' System 95 which tracks agent and prospective buyer activity entering the home for viewing; the system automatically sends electronic messages activity report 231 when a house is entered for showing, and a message to the buyer or buyer agent identified asking for comments, which when received is displayed in activity report 231 with buyer and agent comments in the Virtual Real Estate Office 20 (See FIG. 3a) and in Seller Virtual Desktop screens 10 (See FIG. 3d).

The Virtual Real Estate Office (real estate agent or builder) 20 (See FIG. 3a) can receive loan search criteria information from Buyer Virtual Desktop 15 (See FIGS. 1, 3e, 5) entered by the Buyer in the Work Area Tab Tables 560 (See FIG. 5) about the buyer(s) personal information 240 (See FIG. 12) income, debts, assets for down payment for mortgage search, prequalification, preapproval and loan application 240 (See FIGS. 16, 27) and property search criteria such as, for example location, home style, number of bedrooms, number of baths, and price range desired 240 (See FIG. 13); or alternatively, real estate agent user can enter information directly into Virtual Real Estate Office 20, 240 (See FIGS. 3a, 4, 12, 16, 13, 27) manually, for example taking information by phone or with buyer physically present.

The real estate agent (or builder) from the Virtual Real Estate Office 20, 240 (See FIGS. 3a, 4), or the Buyer from the Property tab in the Buyer Virtual Desktop 15, 240 (See FIGS. 5, 3e) can enter property search criteria 240 (See FIGS. 13, 13a, 13aa) and search property database, either internal 50 or external 75, including for example from the MLS for the real estate agent 85 or the Builder Home Inventory Database 90 with the property search criteria 240, 1330 and retrieve property search results information 245 (See FIGS. 13, 13a, 13aa, 13c) including pictures, video and maps matching buyer's property search criteria as to, for example price, style, number of bedrooms, number of baths, location, etc. 1350 (See FIG. 13) and buyer can select one or more homes for more detailed information including, for example, maps, pictures, video and audio (See FIGS. 11, 13c), viewing, and eventually selecting one on which to submit a contract offer 440, 255 (See FIG. 15). Searches and search results can be saved 50 for use later by the Virtual Real Estate Office or by the Buyer Virtual Desktop.

User can select the appropriate forms 440 (See FIGS. 4, 4a) from the Real Estate Document Database 100 to create sale contract documents 440, 255 (See FIG. 15) and any addenda. The application server 45 automatically enters all appropriate seller, buyer, property and listing information stored in the system databases 50, 75 into sale contract forms 100 or user can manually add or change information as desired or necessary.

The sale contract documents 440, 255 (See FIG. 15) can be sent to the Buyer Virtual Desktop 15, 255 (See FIGS. 5, 3e) for buyer review and manual or electronic signature and which can be received back from buyer and saved. Sale contract documents 440, 255 (See FIG. 15) offer can then be sent to Seller Virtual Desktop 10, 255 (See FIG. 3d) (or seller's agent's Virtual Real Estate Office) and receive back accepted contract, or counteroffer from seller or seller's agent; or it can be printed or faxed to seller or seller's agent. If a counter offer is made by the seller 255 (See FIG. 3d), the process is repeatable by parties sending the contract of sale back and forth until a final agreement is reached; or alternatively the parties may access the sale contract documents 440, 255 (See FIG.

15) simultaneously, for example using application sharing, and negotiate the terms and conditions on a real-time basis.

At some point in the contract process, application server 45 can receive from the Buyer Virtual Desktop an electronic payment of the contract of sale deposit 417 from an account designated by the buyer 419 and send to an account previously designated by the real estate office in the Virtual Real Estate Office 285, 280 or an escrow account in the Virtual Settlement Office 35, 378, 376 depending upon custom.

Real estate agent or builder, with buyer present or on the phone, can enter loan search criteria 1630, 240 including, for example the buyer(s), income, debts, assets for down payment 1630, 240 (See FIGS. 12-12*d*, 16, 13*aa*, 13*bb*), and property search criteria 1330, 240, generate one or more property search results 245, 1350, a property information 210, or contract of sale information 255 (See FIGS. 3*a*, 15) and send directly to one or more lenders' Virtual Mortgage Offices 30, 265 (See FIG. 3*b*) for manual quotes and underwriting 265, 300, or to a centralized mortgage product and pricing database 75, 105 and automated underwriting system 110 for mortgage loan quotes 265, and computer program 45 sends mortgage loan quotes results 265, 1660 (See FIGS. 16, 25*a*) back to Virtual Real Estate Office 20, 265 and Buyer Virtual Desktop 15, 265 as well as to respective lenders' Virtual Mortgage Office 30, 265 (See FIGS. 3*b*, 25-25*a*). The users may elect to skip this step and it may be combined with the loan application steps 270, 275 below to streamline the process.

Buyer can receive and review mortgage loan quotes 1660 on the Virtual Real Estate Office 20, 265 (See FIG. 3*a*) with the real estate agent, if physically present, or on the Buyer Virtual Desktop 15, 265 (See FIG. 3*e*) select a particular loan quote 1660 (See FIG. 16), and send a request for prequalification or preapproval to a lender 30, 270 (See FIG. 3*b*).

Virtual Real Estate Office 20 (See FIG. 3*a*) can receive and buyer if physically present accept a loan prequalification or preapproval letter 270 (See FIG. 17) for a particular loan, together with mortgage loan documents including, for example Good Faith Estimate, Truth in Lending, and other disclosures together with any conditions sent from lender 30, 270 (See FIG. 3*b*) and lender can receive buyer's acceptance of loan prequalification or preapproval letter or agreement (See FIG. 17) in Virtual Mortgage Office 30, 270 (See FIGS. 3*b*, 26, 26*a*).

The Virtual Real Estate Office 20 and the Buyer Virtual Desktop 15 can display buyer loan prequalification/preapproval summary information 270 (See FIG. 26*a*) in the Work Area Tab Tables.

The Virtual Real Estate Office 20 (See FIG. 3*a*) can display one or more loan application screens, such as, for example, Residential Loan Application Form 1003 (See FIG. 27) containing all appropriate buyer, property, sale and loan information already entered 275 (See FIG. 3*a*) into system 50, 75 and information can be entered or changed manually, signed with the buyer present, and sent to the Virtual Mortgage Office 275 (See FIGS. 3*b*, 27). Alternatively, the buyer 15, lender 30, and real estate office 20 can access the loan application simultaneously, for example using application sharing, and jointly enter or change information on a real-time basis.

The Virtual Real Estate Office 20 can display buyer loan application summary information 275 (See FIGS. 3*a*, FIGS. 26-26*a*).

The Virtual Real Estate Office 20 and the Buyer Virtual Desktop 15 receive final loan approval, including summary information 275 (See FIGS. 3*a*, 28*a*), and all loan documents 810 (See FIG. 8) including, for example loan commitment, disclosures sent from mortgage lender's Virtual Mortgage Office 30 (See FIGS. 3*b*, 28, 28*a*) and receive verification of buyer accepting loan commitment 275.

The Virtual Real Estate Office can display approved loan summary information 275 (See FIGS. 3*a*, 28*a*).

Real estate agent or builder 20 can order services either manually or automatically 235 (See FIGS. 3*a*, 19-23) and track services 235, 920 (See FIGS. 3*a*, 7, 9) from third-party service providers 25 such as, for example, home inspections, signs, advertising, settlement services 35 (See FIG. 30), or utilities changes; all appropriate information already in system is automatically entered into appropriate fields; and user can request and receive quotes (bidding) from one or more different service providers (See FIGS. 20, 21) select a quote and order a service, receive a confirmation from service provider 2220 (See FIGS. 22, 23) track services ordered 920 (See FIGS. 7, 9) and service providers can prepare electronic reports and documents 2020, 2120 (See FIGS. 20, 21) and real estate agent can receive completed service information 235 (See FIG. 3*a*). All service information 2020, 2120 is automatically entered 45 into system databases 50, 75 to be used later as necessary in the process. Alternatively quotes, bids and service information can be automatically generated from system 45, 50, 75, for example where service provider and service information including pricing information has been previously entered into system 50, 75.

Service providers can send electronic invoice for charges 2240 (FIG. 22) and the real estate office can send electronic payments 285 to service providers for any services. Alternatively, service billing can be generated and funds disbursed automatically 45, 45W.

Virtual Real Estate Office 20 can receive settlement statement (HUD-1) 372 and appropriate title and legal documents 368 sent from Virtual Settlement Office 35 (See FIG. 3*c*) for review prior to settlement and user can respond with questions, comments, approval or changes back to Virtual Settlement Office 35.

Virtual Real Estate Office 20 can receive final signed settlement statement (HUD-1) 372 and appropriate title and legal documents 368 sent from Virtual Settlement Office 35.

Virtual Real Estate Office 20 can receive commission payments 285, 378 electronically from Virtual Settlement Office 35 escrow account 376 (See FIG. 3*c*).

The computer program has a complete real estate office accounting system 55, 280 (See FIG. 3*a*) accessible from Transaction Navigator 'Office Management' 430, 910 (See FIGS. 4, 9) viewable in the Work Area Tab Tables 450, 460, which allows user to perform complete accounting functions integrated with each sale transaction including for example, contract of sale deposit escrow, commission accounting, receipts, disbursements 280, 285, reconciliation, statements and reports.

Virtual Real Estate Office accounting system allows electronic receipts 285, such as electronic receipt of the contract of sale deposit from the buyer 417 or receipt of broker sale commissions from settlement 376, 378 (See FIG. 3*c*), and electronic disbursements such as paying service provider charges such as, for example advertising and signage fees 285 (See FIG. 3*a*).

The Virtual Real Estate Office saves, either automatically or manually, all appropriate information 45, 50 and documentation including, for example e-mails, faxes, phone messages, and any transaction documents created in the process which can be displayed in an electronic 'File Drawer' (See FIG. 8) for a complete record of each transaction.

The Virtual Real Estate Office Transaction Navigator 430, 910 (See FIGS. 4, 9) automatically tracks stage of each seller, buyer, or sale for example 'Prospect,' 'Listings,' 'Contracts,' 'Sold' as activities are completed.

The Virtual Real Estate Office, Transaction View 435, 920 (See FIGS. 4, 9) automatically displays summary information and organizes, tracks, and summarizes status of activities for all transactions, for example 'signs', 'inspections,' etc. and displays their status for example; 'ordered,' 'past due,' 'completed,' 'approved,' etc.

Virtual Real Estate Office automatically displays appropriate information about transaction schedules, events, meetings, and status of activities in an electronic calendar 420 (See FIGS. 4, 7) or screens as necessary, appropriate or expedient, for their tasks or functions.

Virtual Real Estate Office allows users to perform management reporting functions 430 including, for example creating summary, production, activity, analytical reports, consolidated sale transaction information for multiple sale persons or offices, production comparison reports etc. by assembling and consolidating 45 data 50 in various formats an displaying in various screens 20 for review and use by management personnel.

Seller Virtual Desktop

The Seller (Customer) Virtual Desktop 10 (See FIGS. 3d, 5) allows the seller to enter, receive, and send information to, and share documents with others in the sale process. The Seller Desktop contains the Collaboration Navigator 510 and Collaboration View 520 including: Address Book, Unified Messaging, Instant Messaging, and Group Calendar which displays meetings, activities and events for the transaction, and the Work Area Tab Tables 550 (See FIG. 5) to input and review information, and perform tasks. Seller can select a 'tab table' in the Work Area by clicking on it 560, enter or view detailed information 210 in that particular table such as 'Seller Information' (See FIG. 10), 'Property Information' (See FIG. 11), 'Sale Information' (See FIG. 14), or order services (See FIG. 19), or view appropriate documents such as, for example, marketing, listing, sale contract, or settlement documents, etc. in the 'File Drawer' (See FIG. 8). Information entered, documents created, or functions performed by the seller, or by the application server 45, are saved by the application server 45 into one or more databases 50, 75 and are made available for further functions to be performed, are appropriate documents and information made available via a network 40 to other people participating or steps in the transaction, for example the buyer, the real estate office personnel, the mortgage lender, the settlement company and service providers, as necessary, appropriate or expedient, through an automated or manual workflow process managed by the application server 45.

Specifically, the Seller (Customer) Virtual Desktop has the following functionality:

Seller can enter seller(s) personal information (See FIG. 10) and property information 210 (See FIG. 11) and save in system 45, 50, 75; information is sent by the application server 45 to the Virtual Real Estate Office 20, and made available to others via a network 40, for example, to the Virtual Mortgage Office 30, Service Providers 25, and Virtual Settlement Office 35 as necessary and appropriate.

Seller Virtual Desktop 10 can receive and seller can review marketing materials, information and documents including, for example, letters, brochures, flyers, and a comprehensive market analysis (CMA) report sent from Virtual Real Estate Office 20, 80 (See FIGS. 1, 3a).

Seller can receive listing agreement and documents 220 (See FIG. 3d) sent by Virtual Real Estate Office 20, review and accept by electronic signature, save, and send back to Virtual Real Estate Office, or print, sign and deliver physically.

Seller Virtual Desktop can receive information on agent and prospective buyer activity entering house for viewing 95 which is displayed in activity report 231 sent from Virtual Real Estate Office 231 with buyer and agent comments.

Seller Virtual Desktop 10 (See FIG. 3d) can receive sale contract documents 440, 255 (See FIG. 15) sent from Virtual Real Estate Office 20; seller can approve or accept, for example, by electronic signature, save and send back to Virtual Real Estate Office 255, or print and manually accept and deliver, or make counter offer by making changes to sale contract documents, save and send back to Virtual Real Estate Office 255 (FIG. 3a), or print and manually accept and deliver counter offer; if a counter offer is made by the seller, the process is repeatable by parties negotiating the terms and conditions back and forth until final agreement; or the parties may access the sale contract documents simultaneously using application sharing and negotiate the terms and conditions on a real-time basis, and save.

The seller can order 385 (See FIG. 19) and track services (See FIG. 7) from third-party service providers 25 such as, for example home inspections, home repairs, utilities changes, moving services, etc.; all appropriate information already in system is automatically entered into appropriate fields; user can request and receive quotes (bidding) from one or more different service providers (See FIGS. 19, 20, 21), select a quote and order a service, receive a confirmation from a service provider 2220 (See FIGS. 22, 23), track services ordered, for example, in a calendar (See FIG. 7) and receive completed service information prepared by service provider 2120 (See FIG. 21). All information entered by seller, or service providers is automatically 45 entered into system databases 50, 75 to be used later as necessary or appropriate in the process. Alternatively quotes, bids and service information can be automatically generated from system 45, 50, 75, for example where service provider and service information including pricing information has been previously entered into or generated by system and process 45, 45W, 50, 75.

Service provider can send electronic invoice for charges 2240 and the seller can send electronic payments 391 to service providers for any services. Alternatively, service billing can be generated and funds disbursed automatically 45, 45W.

The seller can receive settlement statement sent (HUD-1) 372 and appropriate legal and title documents 368 from Virtual Settlement Office 35 (See FIG. 3c) for review prior to settlement and respond with questions, comments or changes back to Virtual Settlement Office 35 (See FIG. 3c).

The seller can electronically sign settlement statement (HUD-1) 372 and appropriate legal and title documents 368 and send to settlement company 35 (See FIG. 3c) to conduct electronic online settlement.

Seller can receive final, signed settlement statement (HUD-1) 372 and appropriate title and legal documents 368 sent from Virtual Settlement Office 35 (See FIG. 3c) including electronic confirmation of settlement and all final, signed post closing and post recording documents including for example, electronic certifications or verifications as necessary, appropriate or expedient.

The seller can electronically receive sale proceeds 391 from Virtual Settlement Office 35, 378 (See FIG. 3c) deposited directly into an account designated by seller 393 in the Seller Virtual Desktop.

Seller Virtual Desktop 10 (See FIG. 3d) can save 45, 50, either automatically or manually, all appropriate documentation, including for example e-mails 65, faxes, phone messages 60, sale contract 255, and title, legal 338 and settlement documents 372 for a complete record of each transaction, and view in an electronic File Drawer (See FIG. 8).

Seller Virtual Desktop automatically displays appropriate information about transaction schedules, events, meetings, and status of activities, for example, in an electronic calendar (See FIG. 7) or screen as necessary, appropriate or expedient for their tasks or functions.

Buyer Virtual Desktop

The Buyer (Borrower 16, (See FIGS. 1b, 1c, 2a) for refinancing) Virtual Desktop 15 (See FIG. 3e) allows the buyer to enter, receive, and send information to, and share documents with, others in the sale process (See FIGS. 1, 2, 3 a-e). The Buyer Desktop (See FIG. 5) contains the Collaboration Navigator 510 and Collaboration View 520 including: Address Book, Unified Messaging Group, Instant Messaging & Application Sharing, and Group Calendar and the Work Area 550 and Tab Tables 560 to input and review information, and perform functions. Buyer can select a 'tab table' 560 in the Work Area by clicking on it, enter or view detailed information in that particular table such as 'Buyer Information' and buyer employment and financial information, (See FIG. 12), 'Sale Information' (See FIG. 14), ('Property Information' (See FIG. 11) and existing mortgage financing for a refinancing 16) order services, or view documents such as the sale contract documents, mortgage documents or legal and title documents and settlement documents, etc. in the File Drawer (See FIG. 8). Information entered, documents created, or functions performed by the buyer, or by the application server 45, are saved by the application server 45 into one or more databases 50, 75 and are made available for further functions to be performed, and appropriate documents and information made available to other people participating or steps in the transaction (See FIGS. 1, 2), for example, the seller 10, the real estate office personnel 20, the mortgage lender 30, the settlement company 35 and service providers 25, as necessary, appropriate or expedient, through an automated or manual workflow process managed by the application server 45.

Specifically, the Buyer Virtual Desktop 15 (See FIG. 3e) has the following functionality:

The buyer can enter personal information 240 (See FIGS. 3e, 12), employment, and financial information 240 (See FIGS. 12a-12d).

The buyer can enter property search criteria such as, for example, price, style, number of bedrooms, number of baths, location, for home purchase 240, 1330 (See FIG. 3e, 13, 13a, 13aa, 13b, 13bb,), search a property database 50, 75 including for example a MLS Database or the Home Builder Inventory Database 85, 90, and generate property search results information 245, 1350 (See FIGS. 11, 13, 13a, 13aa, 13c) including pictures, video and maps matching buyer's property search criteria, and buyer can select one or more for viewing, and eventually one on which to submit a sale contract offer 255. Searches and search results can be saved 50, 75 for use later.

In the case of a refinancing, borrower 16 (See FIGS. 1b, 1c, 2a) can also enter property information (See FIG. 11) and existing mortgage information to be paid off with new financing which lender can verify 35, 75, 335, 340.

The buyer can generate sale contract documents in Buyer Virtual Desktop 255, if for example buyer is a 'self-help' buyer, or receive sale contract documents 255 from Virtual Real Estate Office 20, 255 (See FIG. 3a), if there is a real estate sales agent, review and sign, for example by electronic signature, and send back to Virtual Real Estate Office (See FIG. 3a), or print, sign and deliver physically; buyer can receive back sale contract documents from either Virtual Seller Desktop 10 (See FIG. 3d) in the case of a 'for sale by owner,' or the Virtual Real Estate Office 20, 255 signed by seller; if a counter offer is made by the seller, the process is repeatable by parties negotiating the terms and conditions back and forth until a final agreement; or alternatively the parties may access the contract of sale and addenda simultaneously using application sharing and negotiate the terms and conditions on a real-time basis.

At some point in the contract process, the buyer can elect to send from the Buyer Virtual Desktop 15 (See FIG. 3e) an electronic payment of the contract of sale deposit 417 from an account designated 419 by the buyer to an escrow account previously designated in the Virtual Real Estate Office 285, 280 (See FIG. 3a) or to an escrow account in the Virtual Settlement Office 35, 378, 376 depending upon custom.

The buyer 15 (Borrower 16 (See FIGS. 1b, 1c, 2a) for refinancing) can enter loan search criteria, for example, including information about the buyer(s), income, debts, assets for down payment, 1630, 240 (See FIGS. 12-12d, 16, 13aa, 13bb), property search criteria 1330, 240 (See FIG. 3e, 13, 13a, 13aa, 13bb), generate one or more property search results 245, 1350, property information, or sale contract document information 255 (See FIG. 15) (or Borrower 16 (See FIGS. 1b, 1c, 2a) for refinance can enter property information (See FIG. 11) and existing mortgage financing for refinancing) and send 265 (See FIG. 3e) to one or more lenders' Virtual Mortgage Offices 265 (See FIGS. 3b, 25) for a manual quote made by one or more lenders, or to a centralized mortgage product and pricing database and automated underwriting system 105, 110 (See FIG. 1a) for mortgage loan quotes and application server 45 can send loan quote results 265, 1660 (See FIGS. 3e, 16) to Buyer Virtual Desktop, to the Virtual Real Estate Office 265, 1660 (See FIGS. 3a, 16), and to respective lenders' Virtual Mortgage Office 265, 1660 (See FIG. 3b). The users may elect to skip this step and it may be combined with the loan prequalification, preapproval application steps 270, 275 below to streamline the process.

Buyer can review mortgage loan quote results on the Buyer Virtual Desktop 265, 1660 (See FIGS. 3e, 16) and buyer can select a particular loan quote, and send a request 270 (See FIG. 3e) for prequalification or preapproval back to a particular lender 270 (See FIG. 3b).

Buyer can receive a loan prequalification or preapproval 270 (See FIGS. 17, 3e) for a particular loan, together with other information such as, for example, mortgage loan disclosures including Good Faith Estimate, Truth in Lending, and other disclosures from lender 270 (See FIG. 3b); if necessary lender can receive back buyer's acceptance of loan prequalification or preapproval letter (See FIG. 17) in Virtual Mortgage Office 270 (See FIGS. 3b, 26, 26a), and acknowledgement of receipt of any disclosure documents as necessary. The users may elect to skip this step and it may be combined with the loan application 275 steps below to streamline the process.

Buyer Virtual Desktop and Virtual Mortgage Office can display buyer loan prequalification, or preapproval summary information 270 (See FIGS. 3e, 26a-28a).

Buyer Virtual Desktop can display one or more loan application screens, for example, Uniform Residential Loan Application Form 1003 or equivalent 275 (See FIGS. 3e, 27) containing all appropriate buyer, property, sale and loan information already entered into or generated by system 45, 50, 75;

or appropriate information can be entered or changed manually by buyer, and buyer can electronically sign and send to mortgage lender 275 (See FIG. 3*b*), or by printing and physically signing and delivering or sending by facsimile to the mortgage lender; or the buyer, lender and real estate office may access the loan application simultaneously, for example using application sharing, and jointly enter or change information on a real-time basis.

The loan application process may be combined with the loan quote, prequalification and preapproval steps above to streamline the process.

Buyer Virtual Desktop 15, 275 (See FIG. 3*e*) can receive any verification forms including, for example, Verification of Employment, Verification of Deposit, Verification of Loan, or information required as a condition of loan sent by lender from Virtual Mortgage Office, enter and verify information, and send back to lender Virtual Mortgage Office 30, 275 (See FIG. 3*b*).

The buyer can send electronic payment 417 for, for example, any application, credit report or appraisal fees, etc. to lender 365 (See FIG. 3*b*) from Buyer Virtual Desktop 15 (See FIG. 3*e*). Payments can be generated automatically by system and process 45, 45W.

Buyer Virtual Desktop can display loan application summary information 275 (See FIGS. 3*e*, 26*a*, 28*a*).

Buyer Virtual Desktop 15 can receive final loan approval, including summary information 275 (See FIG. 3*e*, 28*a*) and loan documents, including, for example loan commitment, disclosures and all appropriate loan documents sent from mortgage lender's Virtual Mortgage Office 30, 275 (See FIG. 3*b*). Buyer Virtual Desktop can display approved loan summary information (See FIG. 28*a*).

The buyer can order 421 (See FIGS. 3*e*, 19) and track services (See FIG. 7) from third-party service providers 25 (See FIGS. 6, 19, 22, 23) such as, for example, home inspections, home repairs, utilities changes, moving & storage services, etc.; all appropriate information already in system is automatically entered into appropriate fields; user can request and receive quotes, or bids 421, 2030 (See FIG. 20) from one or more different service providers 25, 2130 (See FIG. 21) select a quote or bid 2030 and order a service, receive a confirmation 2340 (See FIG. 23) from service provider 2220 (See FIG. 22), track services ordered in a calendar (See FIG. 7), and receive completed service information 2120, 2210. All information entered by buyer or service provider is automatically 45 entered into system databases 50, 75 to be used later as necessary in the process. Alternatively quotes, bids and service information can be automatically generated from system 45, 50, 75, for example where service provider and service information including pricing information has been previously entered into or generated by system and process 45, 45W, 50, 75.

Service provider can send electronic invoice 417, 2240 (See FIG. 22) for charges and the buyer can send electronic payments 417 to service providers for any services received. Alternatively, service billing can be generated and funds disbursed automatically 45, 45W.

The buyer 15 can receive the settlement statement (HUD-1) 372 and appropriate title and legal documents 368 and loan closing documents 371 sent from Virtual Settlement Office 35 (See FIG. 3*c*) by settlement company for review prior to settlement and respond with questions, comments or changes back to Virtual Settlement Office.

The buyer can electronically sign settlement statement (HUD-1) 372 and appropriate legal and title documents 368 and loan closing documents 371 and send to settlement company 35 (See FIG. 3*c*) to conduct electronic online settlement.

The buyer can send funds required on settlement statement electronically 417 from a separate account 419 designated by buyer in the Buyer Virtual Desktop to settlement company Virtual Settlement Office 35, 378, 376 (See FIG. 3*c*). Alternatively funds can be sent automatically.

Buyer can receive final, signed settlement statement (HUD-1) 372 and appropriate title and legal documents 368 and loan closing documents 371 sent from Virtual Settlement Office 35 (See FIG. 3*c*) including electronic confirmation of settlement and all final, signed post closing and post recording documents 140, 382 including for example, electronic certifications or verifications as necessary, appropriate or expedient.

Buyer Virtual Desktop 15 can save 45, 50, either automatically or manually, all appropriate documentation, including for example e-mails 65, faxes, phone messages 60, sale contract 255, mortgage loan 265, 270, 275, 371 and title, legal 368 and settlement documents 372 for a complete record of each transaction, and view in an electronic File Drawer (See FIG. 8).

Buyer Virtual Desktop automatically displays appropriate information about transaction schedules, events, meetings, and status of activities in an electronic calendar 520, (See FIG. 7) or screen as necessary, appropriate or expedient, for their tasks or functions.

Service Provider Virtual Desktop and Virtual Office

The Service Provider Virtual Desktop 25 (See FIG. 6) or the Service Provider Virtual Office 25 (See FIG. 4) allows service providers such as, for example, a home inspection company, appraiser, pest inspection company, mortgage insurance company, title abstractor, or surveyor to receive a request for a bid (See FIG. 21), a quote, or a service (See FIG. 22), respond accordingly, by providing a bid or quote 2130 (See FIG. 21), confirming an order 680, 2220 (See FIG. 22) sent to the user requesting the service 235, 335, 366, 385, 417. The computer program will allow a service provider to access electronic forms 670, 2120, 2210 (See FIG. 6) from a database of forms 50, 75, 111 appropriate to their functions, enter information and create service reports such as, for example, a pest inspection report, a mortgage insurance commitment, appraisal report or title search report (abstract of title), which can then be sent manually or automatically upon completion to the user requesting the service 235, 335, 366, 385, 417. Information or documents generated by a service provider or by the application server 45, are saved by the application server 45, 45W into one or more databases 50, 75 and are made available for further functions to be performed, and appropriate documents and information made available automatically to other people participating or steps in the transaction, for example the seller 10, the buyer 15, the real estate office personnel 20, the mortgage lender 30, the settlement company 35 and other service providers 25, as necessary, appropriate or expedient, through an automated or manual workflow process managed by the application server 45, 45W. Alternatively quotes, bids and service information can be automatically generated from system 45, 45W, 50, 75 for example where service provider and service information including pricing information has been previously entered into or generated by system and process 45, 45W, 50, 75.

Requests for service quotes, bids, orders, or services can be done manually by users, or system and process 45, 45W can automatically generate when users perform certain tasks and processes.

The Service Provider Virtual Desktop 25 (See FIG. 6) contains the Collaboration Navigator 610 and Collaboration View 620 for communication with others in the transaction, and the Calendar (See FIG. 7) which displays information about appointments, or deadlines pertaining to the service provided.

The Service Provider Virtual Desktop also includes Work Area 650 (See FIG. 6) and Tab Tables 660 (See FIGS. 21, 22). A service provider can select a 'tab table' in the Work Area 660 (See FIGS. 21, 22), view information in that particular table for example 'Order Information' (See FIGS. 21-22) which contains order and service information, or buyer (See FIG. 12), seller (See FIG. 10), property (See FIG. 11) and transaction information, and other Tab Tables to enter information and perform functions necessary to respond to an order for the service requested, and send to the particular requesting user. The service provider can designate a financial account and can send electronic invoice for charges 2240, and the party requesting service can send electronic payments 285, 365, 378, 391, 417 for any services performed. Alternatively, service billing can be generated and funds disbursed automatically 45, 45W.

Alternatively, the Service Provider can also use a Service Provider Virtual Office configuration (See FIG. 4) containing the Transaction Navigator 430 and Transactions View 435, if, for example, the Service Provider is a frequent user of the system and wishes to have these features to keep track of more than one order. In some embodiments, all the other features and functions of the Service Provider Virtual Desktop described herein are available and can be performed from the Service Provider Virtual Office, and visa versa. In addition, a service provider can request services from additional third-party service providers, such as, for example a home improvement contractor requesting services from a landscaper.

Specifically, the Service Provider Virtual Desktop (See FIG. 6) or Service Provider Virtual Office (See FIG. 4) has the following functionality: the service provider 25 can receive a request for a bid, a quote (See FIG. 21) or order for service (See FIG. 22) and respond by providing a bid 2130, a quote or confirm an order 680, 2220, 2340 (See FIG. 22); the service provider can receive all information 460, 660 stored in or available from the system 45, 50, 75 as necessary, appropriate or expedient, for their tasks or functions; the service provider can access electronic forms 111, 440, 670, 2120, 2210 (See FIG. 6) appropriate to their functions such as, for example a pest inspection report, title abstracting report, appraisal report 2120, 2210, enter information and create service reports, electronically sign if appropriate; the service provider can create billing or invoice information 2240 for the service provided, the service provider can send service reports or confirmation of completed service and billing information, if any, to user requesting such service (See FIGS. 1, 1b); the computer process can save all service information 45, 50, 75 to be used in the process as necessary, appropriate or expedient; the service provider can receive payment for any charges for services electronically from separate account designated by user requesting service 285, 365, 378, 391, 417 to a separate account designated by a service provider; the service provider can save 45, 50, either automatically or manually, all appropriate documentation, including for example e-mails 65, faxes, phone messages 60, sale contract, mortgage loan and title, legal and settlement documents for a complete record of each transaction, and view in an electronic File Drawer (See FIG. 8); can automatically display appropriate information about transaction schedules, events, meetings, and status of activities is automatically displayed in an electronic calendar (See FIG. 7) or screen as necessary, appropriate or expedient, for their tasks or functions. Alternatively quotes, bids and service information can be automatically generated from system 45, 45W, 50, 75 for example where service provider and service information including pricing information has been previously entered into or generated by system and process 45, 45W, 50, 75.

Virtual Mortgage Office

The Virtual Mortgage Office 30 (See FIG. 3b) will allow one or more persons including, for example the mortgage loan officer, loan processor, loan underwriter and loan closer to perform all tasks and activities associated with completion of the loan origination process from one comprehensive computer program; receive, communicate and exchange information with buyer 15 (See FIG. 3e), real estate agent or builder 20 (See FIG. 3a), receive loan search criteria 240 and send loan quotes 265, pre-qualify or pre-approve borrower 270 receive and enter loan application information 275 order and tract verifications 340, and services such as, for example, appraisals 114, mortgage insurance, and credit reports 112, 335, underwrite, either manually 300 or using an automated loan underwriting 110 process, approve the loan, and generate 120, send and save loan documents 50, 75, 275 including disclosures. Information entered, documents generated, or functions performed by the mortgage office personnel, or by the application server 45, 45W are saved by the application server 45 into one or more databases 50, 75 and are made available for further functions to be performed, and appropriate documents and information made available to other people participating or steps in the transaction, for example the buyer 15, the seller 10, the real estate office personnel 20, the settlement company 35 and service providers 25, as necessary, appropriate or expedient, through an automated or manual workflow process managed by the application server 45.

Specifically, the Virtual Mortgage Office has the following functionality:

The Virtual Mortgage Office 30 (See FIG. 3b) receives through the application server(s) 45 loan search criteria information 240, 1630 (See FIG. 25) including, for example, the type of transaction, buyer(s) employment, and financial information, income, debts, assets for down payment 1630 (See FIGS. 12, 13aa, 13bb, 13b, 16), property search criteria 240, 1330 (See FIGS. 13, 13aa, 13bb), one or more property search results 245, 1350, sale contract information 255 (See FIGS. 14, 15), property information (See FIG. 11), type of loan product of interest entered into the Virtual Real Estate Office 240, 265 (See FIG. 3a) by the real estate agent, or into the Buyer Virtual Desktop 240, 1330, 1630 (See FIGS. 3e, 13, 13aa, 13bb) by the buyer for loan quotes 1660 (See FIGS. 3e, 13, 13a, 13aa, 13b, 13bb, 25); or mortgage personnel user can enter manually into screens, for example taking information on phone call or with borrower physically present. The users may elect to skip this step and it may be combined with the loan application steps below 270, 275 to streamline the process.

Mortgage personnel can manually enter and display qualifying loan products and pricing information 265 (See FIG. 25a) meeting for example loan search criteria information 240 (See FIG. 25) including, for example, the type of transaction, buyer(s) employment, and financial information, income, debts, assets for down payment 1630 (See FIGS. 12, 13aa, 13bb, 16), property search criteria 1330 (See FIGS. 13, 13aa, 13bb), one or more property search results 245, 1350, sale contract information 255 (See FIGS. 14, 15), property information (See FIG. 11), type of loan product of interest, or alternatively loan search criteria information is sent by application sever 45 to ancillary product and pricing database 50, 75, 105 and 'automated underwriting' (AU) programs 110 retrieving and displaying qualifying loan products and pricing information, loan quotes meeting buyer/borrower loan search criteria and transaction criteria 240 (See FIG. 25a). The users may elect to skip this step and it may be combined with the loan application steps, below, to streamline the process.

Loan quotes 265 meeting loan search criteria are sent back manually or by application server 45 and displayed (See FIG. 16) in Virtual Mortgage Office 30, 265, 1660 (See FIGS. 3b, 16, 25a), the Buyer Virtual Desktop 15, 265, 1660 (See FIGS. 3e, 13a, 13aa, 16, 25) and Virtual Real Estate Office 20, 265, 1660 (FIGS. 3a, 16) from which buyer can select a quote 1660 and send a prequalification or preapproval request to the lender 270.

The Virtual Mortgage Office 30 receives from the application server 45 the prequalification or pre-approval request 270 (See FIG. 3b) sent from Buyer Virtual Desktop 15, 270, 1660, 1670 (See FIG. 3e, 13aa) or Virtual Real Estate Office 20, 270, 1660, 1670 (See FIGS. 3a, 13aa, 16).

Personnel 30 can manually or the application server 45 can automatically create, save and send loan prequalification or preapproval letter (See FIG. 17) to Buyer Virtual Desktop 15, 270 and Virtual Real Estate Office 20, 270 including, for example, any Good Faith Estimate, Truth in Lending, and other disclosures, and summary loan information is displayed (See FIG. 18) in the Virtual Mortgage Office (See FIG. 3b), Buyer Virtual Desktop (See FIG. 3e), and Virtual Real Estate Office (See FIG. 3a).

Virtual Mortgage Office 30 (See FIG. 3b) can if necessary receive buyer/borrower's electronically signed acceptance of loan prequalification or preapproval letter or agreement (See FIG. 17) and any other documents necessary 270 from buyer/borrower either from the Buyer Virtual Desktop 15 or Virtual Real Estate Office 20.

Virtual Mortgage Office 30 can display prequalification or preapproval summary information (See FIGS. 26a, 28a).

Virtual Mortgage Office 30 (See FIG. 3b) can display one or more loan application screens 275 (See FIG. 27) for example a Uniform Residential Loan Application Form 1003 or equivalent containing all appropriate buyer, property, sale and loan information already entered into or generated by the process and system 50, 75, or user can enter and save information manually, for example taking information on phone call or with buyer present; or buyer and real estate agent may access loan application screens and enter or change information directly from the Buyer Virtual Desktop 15, 275, (See FIGS. 3e, 27) or Virtual Real Estate Office 275 (See FIGS. 3a, 27) or, the buyer, lender and real estate office may access the loan application simultaneously, for example using application sharing, and jointly enter or change information on a real-time basis.

The loan application process may be combined with the loan quote, prequalification and preapproval steps above to streamline the process.

Virtual Mortgage Office can send 340 any request for verification forms 120 required as a condition of loan to Buyer Virtual Desktop 15, 275 and receive back information or documents completed and electronically signed by buyer/borrower.

Virtual Mortgage Office 30 can send requests for verification 340 including, for example, Verification of Employment, Verification of Deposit, Verification of Loan, etc. to appropriate third-parties electronically, for example, by sending e-mail with directions to a URL to confirm information which third-parties, such as banks, lenders, creditors can access to review, change, add or verify information, electronically sign and return, and Virtual Mortgage Office 30 can receive back electronically signed verification responses 340 (See FIG. 3b).

Virtual Mortgage Office 30 can receive electronic payment of any mortgage, credit report or appraisal fees 365 from buyer/borrower from Buyer Virtual Desktop 15, 417 (See FIG. 3e).

Virtual Mortgage Office 30, Buyer Virtual Desktop 15, and Virtual Real Estate Office 20 can display loan application summary information (See FIG. 28a).

Virtual Mortgage Office 30 can order 335, (See FIG. 19) and track 2420 (See FIGS. 24, 7) services from third-party service providers 25, either manually or automatically such as, for example, appraisal, mortgage insurance, tax and flood certifications, credit information and scores, or settlement services, or receive information from ancillary databases 112, 114, 115, 125, 130, 135, 140 (See FIG. 1a) either directly 75 or through an automated underwriting system 110; all appropriate information already in system is automatically entered into appropriate fields in request forms; or user can request and receive quotes or bids from one or more different service providers 25 (See FIGS. 20, 21), select a quote or bid 2030 and order a service, receive a confirmation from service provider 2340 (See FIGS. 23), track services ordered 2420 (See FIGS. 7, 24), and receive completed service information and documents 335, 2210, 2120. All information entered into electronic Service Provider Desktop or Virtual Office 25, (See FIGS. 21, 22), or reports 2120, 2210 or from ancillary databases or systems 75, 112, 114, 115, 125, 130, 135 (See FIG. 1a) is automatically entered by application server 45, 45W into system databases 50, 75 to be used later as necessary in the process for the particular loan. Alternatively quotes, bids and service information can be automatically generated from system 45, 45W, 50, 75, for example where service provider and service information including pricing information has been previously entered into or generated by system and process 45, 45W, 50, 75.

Service provider 25 can send electronic invoice 2240 for charges and the lender can receive and send electronic payments 365 to third-party service providers for any service charges. Alternatively, service billing can be generated and funds disbursed automatically 45, 45W.

The mortgage lender can manually underwrite the loan 275, 300 (See FIGS. 3b, 28), or application server 45 can send final loan application information including, for example type of transaction, buyer/borrower, sale, property, and type loan-product, and any credit, appraisal, mortgage insurance, etc. information to an automated underwriting program 110 (See FIGS. 1a, 3b), including credit reporting systems 112, automated appraisal 114 and automated mortgage insurance underwriting and approval 115, and receive back final underwriting approval (See FIG. 28) with any conditions (or rejection).

The program sends loan information package including, for example, transmittal, appraisal, loan application, and credit report to third-party mortgage investor 25, 345, including for example Freddie Mac or Fannie Mae for investor purchase commitment with conditions if loan is to be sold to investor or marketed on the secondary market.

Final underwriting review and approval of loan can be done manually 300 or automatically 110 (See FIGS. 28, 28a) and can be approved or rejected with conditions.

Final underwriting results and approval (or rejection) including conditions are presented to lender in Virtual Mortgage Office 30, 275 (See FIGS. 3b, 28, 28a).

Computer program displays summary loan information in the Buyer Virtual Desktop 15, 275 (See FIGS. 3e, 28a) and Virtual Real Estate Office 20, 275 (See FIGS. 3a, 28a) and the Virtual Mortgage Office 30, 275 (See FIGS. 3d, 28, 28a).

Computer program 45 sends approved loan information to mortgage document database 50, 75, 120 (See FIG. 3*b*) and prepares and sends, for example, loan commitment, instructions and loan documents including any necessary 'disclosures' to the 'Virtual Mortgage Office' for review, additions or corrections 275, if any, and saves for display (See FIG. 8) in File Drawer.

Appropriate loan documents including, for example commitment, Good Faith

Estimate, Truth in Lending, and other disclosures loan terms and conditions to are sent 275 either manually or automatically by application server 45 to all appropriate parties, including, Buyer Virtual Desktop 15 and 'Virtual Real Estate Office' 20 for review and acceptance by buyer/borrower 275 (See FIG. 3*e*).

Virtual Mortgage Office 30 receives back any loan documents 275, including for example, any Good Faith Estimate, Truth in Lending, and other disclosures accepted and electronically signed by buyer from Buyer Virtual Desktop 15, 275 or Virtual Real Estate Office 20, 275.

Virtual Mortgage Office 30 can prepare appropriate loan closing documents 120, 371 including, for example commitment, disclosures, note, deed of trust or mortgage, loan terms and conditions, settlement instructions, including electronic signatures, are sent 275 either manually, or automatically by application server 45, 45W to Virtual Settlement Office 371 (See FIG. 3*c*) for settlement.

Virtual Mortgage Office 30 (See FIG. 3*b*) can receive, for example, settlement statement (HUD-1) and appropriate title, legal and settlement documents 368, 372 sent from Virtual Settlement Office 35 for review prior to settlement, and respond with questions, comments, approvals, electronic signatures, or changes back to Virtual Settlement Office 35 (See FIG. 3*c*).

Lender can send electronic payment of mortgage funds 365 to the Virtual Settlement Office 378, 376 for disbursement according to settlement instructions.

The lender personnel 30 can electronically approve settlement statement (HUD-1) 372 and appropriate legal and title documents 368 and send to settlement company 35 to conduct electronic online settlement.

Virtual Mortgage Office (See FIG. 3*b*) can receive final, signed settlement statement (HUD-1) 372, appropriate loan closing documents 371 and appropriate title and legal documents 368 sent from Virtual Settlement Office 35, (See FIG. 3*c*), including electronic confirmation of settlement and all final, signed post closing and post recording 140, 382 documents including for example, electronic certifications or verifications as necessary, appropriate or expedient.

Lender personnel 30 (See FIG. 3*b*) or application 45, 45W can automatically enter all appropriate information about the loan 50, 75, including a complete electronic 'file' of all documents into one or more mortgage loan servicing systems 122.

Virtual Mortgage Office 35 (See FIG. 3*b*) can save 50, 75 either automatically 45, 45W or manually, all appropriate documentation including for example e-mails 65, faxes 60, phone messages 60, sale contract 255, mortgage loan 265, 270, 275, 371 and title, legal and settlement documents 368, 372 for a complete record of each transaction, and view in an electronic File Drawer (See FIG. 8).

Virtual Mortgage Office Transaction Navigator 430, 2410 (See FIGS. 4, 24) automatically tracks stages of each transaction, for example 'Loan Prospect,' 'Prequalified,' 'Preapproved,' 'Application,' 'Approved,' 'Settled,' etc.

Virtual Mortgage Office Transaction View 435, 2420 (See FIGS. 4, 24) automatically tracks, organizes, and summarizes status of activities for all transactions, for example 'appraisal,' 'credit score,' etc. and displays the status for example 'ordered,' 'past due,' 'received,' 'approved,' etc.

Virtual Mortgage Office 30 (See FIG. 3*b*) also automatically displays appropriate information about transaction schedules, events, meetings, and status of activities in an electronic calendar (See FIG. 7) or screen as necessary, appropriate or expedient for their tasks or functions.

Virtual Settlement Office

The Virtual Settlement Office 35 (See FIG. 3*c*) will allow the settlement company personnel to perform all their tasks and activities associated with completion of the title and settlement process from one comprehensive computer program; enter, receive, communicate and exchange 45 information with seller 10, buyer 15, real estate agent or builder 20, mortgage lender 30 and service providers 25 (See FIGS. 1, 2, 3*c*) order and tract services 366, 2920 such as surveys, title searches, and loan payoff information and create and save settlement 372, title and legal documents 368 and receive and disburse settlement proceeds 378 electronically. Information entered, documents created, or functions performed by the settlement office personnel, or by the application server 45 or from ancillary databases and systems 75, are saved by the application server 45 into one or more databases 50, 75 and are made available for further functions to be performed, and documents and information made available to other people participating or steps in the transaction (See FIGS. 1, 2), including for example the seller 10, the buyer 15, the real estate office personnel 20, the mortgage lender 30, and service providers 25, as necessary, appropriate or expedient, through an automated or manual workflow process managed by the application server 45, 45W.

Specifically, the Virtual Settlement Office has the following functionality:

The Virtual Settlement Office 35 (See FIG. 3*c*) can either manually or automatically receive 45, 45W request for a quote, bid, or settlement order (See FIGS. 3*c*, 29, 30) including information on the buyer (See FIG. 12), seller (See FIG. 10), property (See FIG. 11), sale information (See FIG. 14) including sale contract information and documents 255 (See FIG. 15) and mortgage loan information and documents 371 from the Seller Virtual Desktop, 10 Buyer Virtual Desktop, 15 Virtual Real Estate Office 20 or Virtual Mortgage Office 30 via the network 40, or user can enter information on screens manually, for example taking information by phone.

The Virtual Settlement Office user 35 (See FIG. 3*c*) can generate quotes, bids or confirm order manually (See FIG. 30). Alternatively quotes, bids and service information can be automatically generated from system 45, 45W, 50, 75, for example where settlement service provider and service information including pricing information has been previously entered into or generated by system and process 45, 45W, 50, 75.

The Virtual Settlement Office 35 (See FIG. 3*c*) can generate quotes, bids or order 366 (See FIG. 19) and track 2920 (See FIGS. 29, 7) services from third-party service providers 25, either manually or automatically 45, 45W such as, for example title search (title abstract), real estate tax information, HOA documents, a loan payoff statement, and survey services, or request and receive information from ancillary databases 75, 130, 135, 140; all appropriate information already in system is automatically entered into appropriate fields; user select a quote or bid 2030 and order a service, receive a confirmation from service provider 2340 (See FIGS. 20, 21, 23), track services ordered 2920 (See FIGS. 7, 29), and receive completed service information 2120, 2210. All service information 2120, 2210 is automatically entered by application server 45, 45W into system databases 50, 75 to be used later as necessary, appropriate or expedient in the process. Alternatively quotes, bids and service information can be automatically generated from system 45, 45W, 50, 75 for example where service provider and service information including pricing information has been previously entered into or generated by system and process 45, 45W, 50, 75.

Service provider can send electronic invoice 2240 for charges and the settlement company can send electronic payments 378 to third-party service providers for any services. Alternatively, service billing can be generated and funds disbursed automatically 45, 45W.

Virtual Settlement Office 35 (See FIG. 3*c*) can receive settlement instructions 371 and all mortgage loan closing documents 371 from the lender Virtual Mortgage Office 30 as necessary, appropriate or expedient.

Virtual Settlement Office 35 can receive 378 (See FIG. 33) mortgage proceeds from the lender 30, 365 (See FIG. 3*b*).

Application server 45, 45W can access databases 50, 75 and automatically enter information, for example real estate tax perorations, recording and transfer charges, service charges, etc. into for example the settlement statement (HUD-1), including performing all usual calculations and prorations normally performed in preparing the settlement statement, and all settlement documents 372 (See FIG. 32), and other title and legal documents, such as, for example title report, title commitment and title policy (See FIG. 31), affidavits, deeds, recording forms, etc. 368, 382 as necessary, appropriate or expedient or user can enter, change or add information manually.

System and process 45, 45W can automatically enter appropriate information 50, 75 in system, for example, the buyer, seller, property, sale, mortgage loan information, title information 140, real estate tax information 130, transfer taxes and recording charge information 135, including information generated from services providers 25, 366 such as, for example, loan pay-off amounts, survey charges, title or abstract charges, automatically into, for example, all legal and title documents and other closing and recording documents for example title report, title commitment and title policy (See FIG. 31), affidavits, deeds, recording forms, etc. 368, 382 and into the settlement statement (HUD-1) and other settlement documents, 372 (See FIG. 32), including performing all usual calculations normally performed in preparing the settlement statement 372 (See FIG. 32) as necessary, appropriate or expedient or user can enter, change or add information manually.

System and process 45, 45W causes the settlement statement (HUD-1) and other settlement documents 372 (See FIG. 32) to exchange information with an escrow accounting system 376 (See FIGS. 3*c*, 33, 34) allowing user to perform complete escrow and accounting functions 376 including, for example, electronic receipts, disbursements, reconciliation, statements and reports 378 (See FIG. 34) as necessary, appropriate or expedient.

Virtual Settlement Office user 35 (See FIG. 3*c*) can through the application server 45 send appropriate loan closing documents 371, settlement statement (HUD-1) and settlement documents 372 and all appropriate title and legal documents such as, for example, the title insurance binder, title report, commitment or policy 368 to the Seller Virtual Desktop 10 Buyer Virtual Desktop 15 Virtual Real Estate Office 20 and Virtual Mortgage Office 30 for review and approval by respective parties prior to settlement.

Virtual Settlement Office 35 (See FIG. 3*c*) can conduct on-line settlement through application server 45, 45W with for example one or more of a buyer 15, seller 10, lender 30 or others with, for example, electronic signatures of all loan closing documents 371, settlement 372, title and legal documents 368 including for example using real-time application sharing as necessary, appropriate or expedient.

Figure 33:
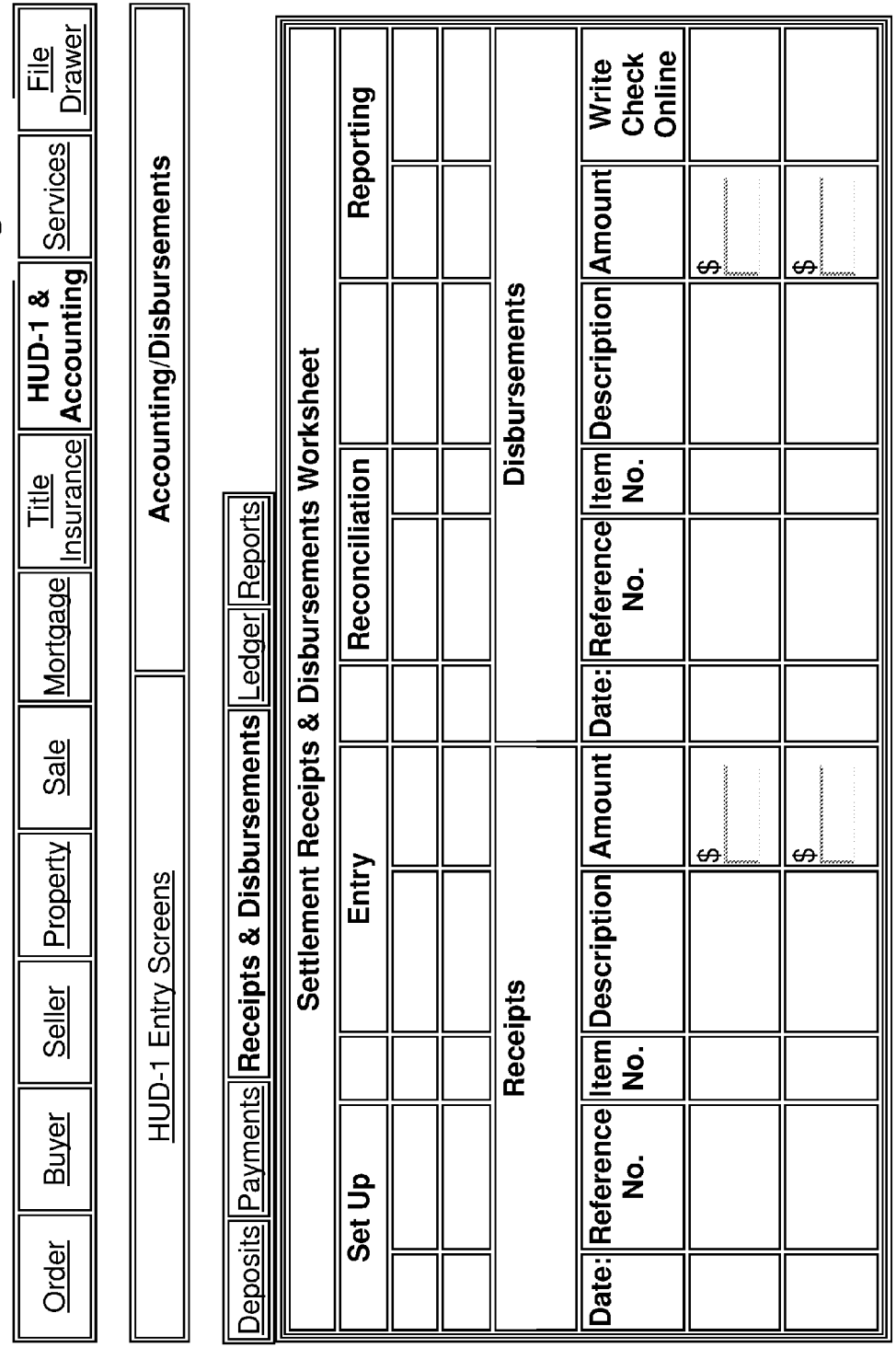
FIG. 33 is a view depicting Virtual Settlement Office Escrow Accounting Entry Tab Tables.

System and process 45, 45W can automatically generate funds, such as for example receipt of mortgage funds from the lender 20, 365 and buyer 15, 417 funds, send to settlement provider 35, 378 (See FIGS. 3*b*, 33), and automatically generate disbursements such as, for example service provider charges, seller proceeds, real estate broker fees, real estate taxes, governmental recording and transfer charges, real estate taxes, water charges, utility charges and loan payoffs to third-party lenders 378 (See FIGS. 3*c*, 33, 34).

System and process 45, 45W can automatically generate and Virtual Settlement Office 35 (See FIG. 3*c*) can receive any for example third-party loan payoff documents, certificate of satisfaction, appropriately marked as paid and satisfied in full, including electronic signatures, and any documents for releasing any third-party loan liens of record electronically.

System and process 45, 45W and/or Virtual Settlement Office 35, (See FIG. 3*c*) can automatically send all documents or information, including for example deed, mortgage, certificate of satisfaction, affidavits, governmental recording forms to, for example, appropriate public land record, court or other databases or systems for electronic recording and releasing of documents in public records 75, 140, 382 (See FIGS. 35, 3*c*) as necessary, appropriate or expedient, and automatically receive back electronic certifications or verifications of recording and releasing of documents from the appropriate governmental departments or agencies.

System and process 45, 45W and/or Virtual Settlement Office 35, (See FIG. 3*c*) can automatically send confirmation of settlement and recording, including all final, signed post closing and post recording documents to appropriate parties including, for example buyer, seller, lender, or third-party payoff lenders (See FIG. 36) including for example, electronic certifications or verifications as necessary, appropriate or expedient.

Virtual Settlement Office 35 (See FIG. 3*c*) can save 45, 45W, 50, either automatically or manually, all appropriate documentation, including title documents, HUD-1, e-mails 65, faxes, phone messages 60, sale contract documents 255 and loan closing documents 371, title, legal 368, and settlement 372 documents for a complete record of each transaction, and users can view in an electronic File Drawer (See FIG. 8) as necessary, appropriate or expedient.

Virtual Settlement Office 35 (See FIG. 3*c*) Transaction Navigator 430, 2910 (See FIGS. 4, 29) automatically tracks stage of each transaction, for example New Order, Scheduled, Settled, etc.

Virtual Settlement Office 35 (See FIG. 3*c*) Transaction View 435, 2920 (See FIGS. 4, 29) automatically tracks, organizes, and summarizes status of for example, tasks and activities for all transactions, for example Abstract, Survey, HOA Documents, etc. and displays the status for example ordered, received, approved, past due, etc.

Virtual Settlement Office 35 (See FIG. 3*c*) also automatically displays appropriate information about transaction schedules, events, meetings, and status of activities in an electronic calendar (See FIG. 7) or screens as necessary, appropriate or expedient.

Automating, Combining, Simplifying or Modifying Processes

In further description of the preferred embodiments of the invention herein, this complicated processes can be simplified, streamlined and made more user friendly by the invention by combining, eliminating one or more tasks and processes, or generating information automatically or allowing tasks and processes to be performed in a more understandable and efficient manner. The invention allows the system and process 45, 45D, 45J, 45P, 45U, 45W to perform multiple tasks and processes automatically, including where possible simultaneously, with dynamically changing screens for users so that, for example requests for information and steps are presented automatically to users 10, 15, 20, 25, 30, 35, 59 as they or the process 45, 45W perform or complete tasks and processes.

For example, at any time in the process, when sufficient information, for example, one or more of seller, property, buyer personal, employment and financial information, sale contract information, mortgage loan information, or service information has been generated by users or process and system necessary to perform any other tasks and processes or generate any document or information, and any prior necessary conditions, tasks or processes are satisfied or completed, process and system 45, 45D, 45J, 45P, 45U, 45W can automatically one or more of generate additional information, display screens, prompt users to perform or perform automatically one or more subsequent tasks or processes, including combining and performing more than one tasks or processes 45, 45D, 45J, 45P, 45U, 45W simultaneously, as necessary, appropriate or expedient.

Figure 1J:
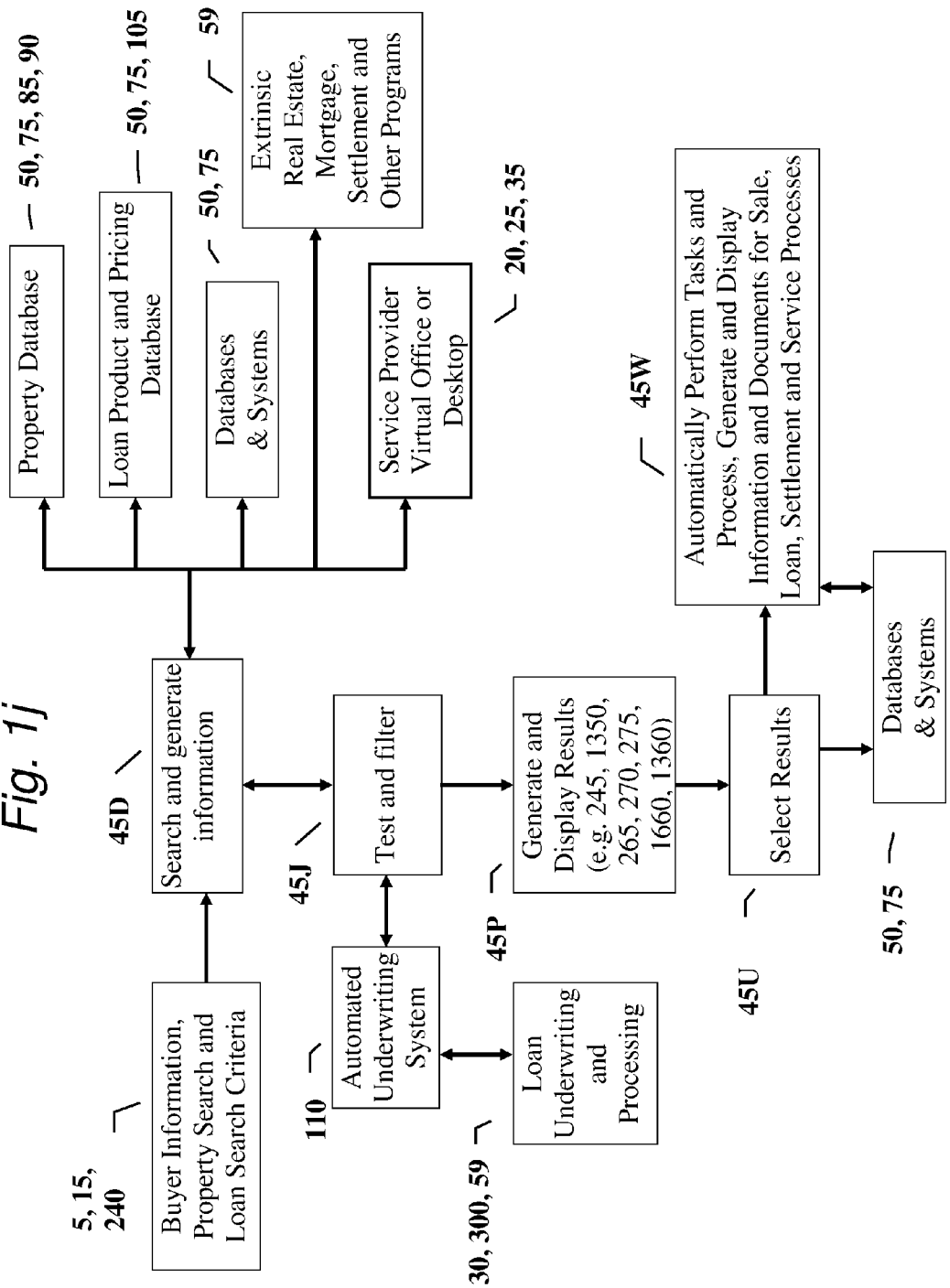
FIG. 1j is a view depicting an Example of a Combined Buyer Property, Loan and Service and Information Search and Automated Underwriting Workflow Process.

In accordance with the preferred embodiment of the present invention the process can combine a property search, loan search and search for information to buy a property, make a loan, provide a service, provide a settlement service or transfer title to a property in one simplified, streamlined, automated process 45D, 45J, 45P, 45U, 110 (See FIG. 1*j*), for example:

for example, when buyer first enters the process, for example, through an Internet 'portal' or Website 5 (See FIG. 1*e*), real estate broker or agent Website 5, (See FIG. 1*g*) or a mortgage lender search site, or a mortgage lender site 159 (See FIG. 1*g*) or in any manner, indicates they are a buyer 156, 157, 158, 159, or at any time, at one or more times, or at separate times, process and system can for example automatically prompt buyer to perform, for example, by generating one or more pop-up, screen, additional fields, button, audio message, 'chat' screen, VoIP application, video-conference application, 'application sharing,' sending a message, or otherwise prompting buyer (See FIG. 1*i*) to enter information, or perform automatically 45 and where possible simultaneously or at one or more times, one or more of the following tasks and processes;

for example, prompt buyer to enter one or more property search criteria, for example price range, property type, location, for example, city, state, zip code, number of bedrooms and baths, etc. 240, 1330, (See FIGS. 13, 13*a*, 13*aa*, 13*b*, 13*bb*) and loan search criteria, for example loan type, monthly debt payments (MoDP), money for down payment and closing costs (MfDP&CC), credit information, employment information, financial information, property will be what type of occupancy, e.g. principal residence, etc. 240, 1630 (See FIGS. 13*b*, 13*bb*, 16);

alternatively, buyer can also be prompted to enter service search criteria information 1920 to request one or of a service quote, bid, order, task or process, or service information, or alternatively process and system can generate one or more service quote, bid, order, task or process, or service information automatically from one or more property search criteria 240, 1330 and loan search criteria 240, 1630;

for example, alternatively, one or more property search criteria 240, 1330, loan search criteria 240, 1630, or service search criteria 1920, can be entered in whole or in part by others in the process, for example, by a real estate agent 20 (See FIG. 3*a*) or loan officer 30 (See FIG. 3*b*), including for example, while on the phone, using 'application sharing,' or a 'chat' process;

for example, the process and system, either simultaneously, or at different times, generate from one or more sources information to buy a property, make a loan, provide a service, provide a settlement service or transfer title to a property, for example, information from 45D databases and systems 50, 75, including one or more property database (PD), 50, 75, 85, 90, loan product and pricing database (P&PDB) 50, 75, 105, service information 20, 25, 35, 50, 75 and other information 59 (See FIG. 1*j*);

for example, the process performs automated loan underwriting (AU) 110 on one or more combinations of information to buy a property, make a loan, provide a service, provide a settlement service or transfer title to a property, for example, one or more property search criteria 240, 1330, loan search criteria 240, 1630, service search criteria 1920, loan information 50, 75, 105, property information 50, 75, 85, 90 information from one or more databases and systems 50, 75, service information 20, 25, 35, 50, 75, and other information 59 (See FIG. 1*j*);

loan underwriting criteria and process can be, for example, part of loan product and pricing information 105 or part of an internal 45 or separate loan underwriting process 110;

for example, process tests and filters 45J one or more combinations of information which match, for example, buyer property search criteria 240, 1330, buyer loan search criteria 240, 1630, service search criteria if entered by buyer or others 1920, loan product and pricing information 105, and loan underwriting criteria 105, 110;

for example, process 45D searches a loan product and pricing database (P&PDB) 50, 75, 105 and preliminarily generates loan product and pricing information and underwriting criteria 105, 110 for loan products matching one or more of buyer property search criteria 240 or property information 50, 75, 85, 90, 245 and loan search criteria 240; alternatively, process can request and generate loan information from one or more lenders 30, 59 which can be provided automatically or manually in whole or in part;

for example, process searches 45D property database (PDB) 50, 75, 85, 90 and preliminarily generates one or more property information including for example; location, property type, sale price (SP), hazard insurance (I), home owner association information (HOA), county and city real estate taxes (T), or other costs or information associated with purchasing and owning a property 50, 75; alternatively, for example, process can search for and test entire property database PD 50, 75, 85, 90, search for and test properties matching property search criteria 240, for example by price range, or search and test properties using other criteria generated by process, for example, by preliminarily estimating a price range borrower is likely to be able to afford based upon preliminary underwriting 110 for one or more possible loan products 105;

for example, process can search 45D one or more sources of information to buy a property, make a loan, provide a service, provide a settlement service or transfer title to a property including, for example, databases and systems 50, 75, service information 20, 25, 35, or other information 59 and generate one or more information to buy a property, make a loan, provide a service, provide a settlement service, transfer title to a property, or ownership cost information associated with purchasing and owning a property preliminarily matching one or more combinations of buyer property search criteria 240, buyer loan search criteria 240, service search criteria if entered by buyer or others 1920, loan product and pricing information 50, 75, 105, property information 50, 75, 85, 90, and other information generated from databases and systems 50, 75, service information 20, 25, 35, 50, 75, or other information 59, or other sources; information can include for example one or more bid, quote, price, order, or service information, individual or bundled services, for example home inspection, survey, settlement services, home owner warranty HOW, or other ownership cost information associated with purchasing and owning a property, etc.; service providers 20, 25, 35, or others 59 can enter bid, quote, price or service information in advance 50, 75 for bid, quote, price, order or service information to be generated automatically, or bid, quote, price, order or service information can be entered manually by users 20, 25, 35, 59 on a case-by-case basis; for example, the process can automatically search 45D, and filter 45J for one or more lowest bids, quotes or prices, or other desirable criteria;

for example, process performs tests and filters 45J one or more combinations of information, for example, loan product information 50, 75, 105, property information 50, 75, 85, 90 information from databases and systems 50, 75, service information 20, 25, 35, 50, 75, or other information 59 to determine whether one or more combinations match buyer property search criteria 240, buyer loan search criteria 240, service search criteria if entered by buyer or others 1920, and loan underwriting criteria 105, 110 for one or more loan products 50, 75, 105 including performing one or more automated underwriting processes 110, including for example: 1. determining ability or willingness of borrower to repay a loan i.e. credit worthiness 112, 2. determining adequacy of property as security for repayment of loan, for example, an appraisal 114 of a property, 3. generating loan information including one or more of a loan quote, prequalification, preapproval, approval, or document information 265, 270, 275, 345, 371, or 4. generating ownership cost information associated with purchasing and owning a property for one or more combinations of property information 245, 1350, loan information 265, 270, 275, 1660, and other information 1360, 2030, for example;

for example, for one or more loan products 50, 75, 105, process generates 45D one more of loan product and pricing information and underwriting criteria 105, 110 including for example credit criteria, for example, minimum FICO score or range, loan type, for example 30 year—fixed rate, interest rate (I), for example 6%, debt service constant (DSC), for example 0.0059955, maximum front-end ratio (MaxFE %), maximum back-end ratio (MaxBE %), maximum loan-to-value (Max-LTV), for example 95%, loan-to-value requiring mortgage insurance (MIP), for example LTV >80%, and mortgage insurance factor (MIF), maximum loan amount (MaxLA), for example $417,000, type of occupancy property will be, for example principal residence, etc. (See FIGS. 1m, 1n) This loan product and pricing information and underwriting criteria is entered in advance into, for example, one or more of a loan product and pricing database (P&PDB) 50, 75, 105 or an automated underwriting process 110 for one or more particular loan products. Other types of loan product and pricing, information, database structure, and underwriting criteria and processes can be provided for, for example, risk-based pricing.

for example, using property sale price and other property information 50, 75, 85, 90 and borrower money for down payment and closing costs (MfDP&CC) 240, 1330 process 45D, 45J, 110 calculates, using for example an 'iterative calculation process,' (See FIGS. 1q-1u) a loan amount (LA) and closing costs & prepaid items (CC&PPI) for example, sale price (SP)−money for down payment and closing costs MfDP&CC=loan amount (LA)−closing costs & prepaid items (CC&PPI) (See FIGS. 1j, 1q-1u);

for example, for one or more combinations of loan information 50, 75, 105 and property information 50, 75, 85, 90, information from databases and systems 50, 75, service information 20, 25, 35, 50, 75, or other information 59 to buy a property, make a loan, provide a service, provide a settlement service or transfer title to a property, process generates for example, sale price, interest rate, debt service constant, mortgage insurance factor, real estate taxes 130, hazard insurance premium (I), credit score 112, appraisal 114, recording and transfer charges 135, settlement charges 35, survey cost, HOA assessments 50, 75, 25 etc.; for example, process performs appropriate calculations for example 'good faith estimate' (GFE) 1660 or settlement statement (HUD-1) 372 (See FIG. 32) calculations and calculates for example one or more of a loan amount (LA), closing costs and prepaid items (CC&PPI) (See FIGS. 1j, 1q-1u) or ownership cost information associated with purchasing and owning a property; performing calculations for 'good faith estimate' (GFE) 1660 or settlement statement (HUD-1) 372 for closing costs and prepaid items (CC&PPI) (See FIGS. 1p-1s) can be performed as part of a automated loan underwriting process 110 independently from or as part of a Virtual Mortgage Office 30 and Virtual Settlement Office 35, or other 59 processes;

for example, process performs underwriting process and tests information 45D, 45J, 110 to determine if one or more combinations of information meet a loan product underwriting criteria, (See FIGS. 1t-1u);

for example, process 45D, 45J, 110 tests credit information against minimum credit criteria, for example, if FICO credit score > or =minimum FICO score or =FICO range for loan product; Yes or No (See FIGS. 1t-1u); process can alternatively use credit information provided by borrower 240 or generate credit information, for example from credit agencies, from service providers 25 or databases and systems 50, 75, 112; credit information can include for example, credit score 112, or other equivalent information to test borrower's credit worthiness and willingness and ability to repay a loan; lenders will have previously entered for example credit criteria for loan products in loan product and pricing database (P&PDB) 105 with other loan underwriting criteria information for particular loan products or into automated underwriting process 110;

for example, process calculates if loan amount LA < or = Max. LA for Loan Product (e.g. $417,000), Yes or No (See FIGS. 1t-1u);

alternatively, process can, for example, employ an automated appraisal 114 process to test and filter property information generated 50, 75, 85, 90 to determine if appraised value (AV) > or =sale price (SP) for underwriting purposes to determine adequacy of property value as security for loan, and for example, process can use the lesser of sale price (SP) or appraised value (AV);

for example, process calculates loan-to-value (LTV)=loan amount (LA)/sale price SP (See FIGS. 1t-1u), and for example, process calculates if loan-to-value LTV < or =Max. LW for loan product (e.g. 90%, 95%),) Yes or No (See FIGS. 1t-1u);

for example, process calculates if loan-to-value (LTV) requires mortgage insurance (MI), for example, LTV >Max Loan to Value w/o MI (Yes, No); If Yes, process calculates mortgage insurance premium MI=loan amount (LA)×mortgage insurance factor (MIF) (See FIGS. 1t-1u);

for example, process calculates monthly debt service PI=loan amount (LA)×debt service constant (DSC) (See FIGS. 1t-1u);

for example, process calculates housing payment HP=PI+ TI+HOA+MI, where housing payment (HP)=monthly debt service (PI)+taxes & insurance (TI),+homeowner association assessment (HOA)+mortgage insurance premium (MI) (if applicable) (See FIGS. 1t-1u);

for example, process calculates max. housing payment (MaxHP) for loan product=Lesser of: "Max. Front-End Housing Payment" (MaxFEHP)=Monthly Income (GMoInc)×"Max Front End Ratio" (MaxFE %) for loan product e.g. 25%, 28%, or "Max. Back-End Housing Payment" (MaxBEHP)=Monthly Income (GMoInc)×'Max. Back End Ratio' (MaxBE %) for loan product e.g. 30%, 33%,–Monthly Debt Payments (MoDP) (See FIGS. 1t-1u);

for example, process calculates if housing payment (HP)< or =max. housing payment (MaxHP) for particular loan product, Yes or No (See FIGS. 1t-1u);

process can include, for example, a mortgage investor approval to be performed either manually or automatically, in whole or in part 345; Yes or No;

for example, process calculates if sale price (SP) < or =loan amount (LA)+MfDP&CC–CC&PPI, Yes or No (See FIGS. 1t-1u);

for example, automated underwriting process 110 determines if one or more combinations of information to buy property, make a loan, provide a service, provide a settlement service or transfer title to a property, for example, loan information 50, 75, 105, property information 50, 75, 85, 90 information from databases and systems 50, 75, service information 20, 25, 35, 50, 75, or other information 59 meet loan underwriting criteria 105, 110, for example, "Yes" to all in above example (See FIGS. 1t-1u);

for example, if combination meets loan underwriting criteria, for example "Yes" to criteria from above example (See FIGS. 1t-1u), process generates and displays 45P, 15, in whole or in part, one or more combinations of information to buy a property, make a loan, provide a service, provide a settlement service or transfer title to a property, for example, one or more matching combinations of property information 50, 75, 85, 90, 245, 1350 loan information 105, 265, 270, 275, 1660 including, for example, one or more loan quote, preapproval, approval, or loan document information 265, 270, 275, 345, 371, 1660 including, for example a good faith estimate, truth-in-lending, other disclosure information 1360, loan application information 275, 1670 or other loan document information (See FIGS. 8, 26a, 27, 28a), information generated from databases and systems 50, 75, service information, including service bid, quote, price, order or service information 20, 25, 35, 50, 75, 421, 1360, (See FIG. 20a) legal, title or settlement information 368, 372, ownership cost information associated with purchasing and owning a property 1350, 1360, 1660, including for example, settlement, monthly or periodic payment, homeowner association 96 and utility 97, or other cost information 59 (See FIGS. 13a, 13aa, 13c, 16, 25a, 26a, 27); the information can be displayed 45P immediately, at one or more appropriate times later in the process, simultaneously, sequentially, in whole or in part;

for example, if combination does not meet all lender underwriting criteria, for example generating a "No" to at least one underwriting criteria, for example as above, process can alternatively, for example, 1. not display results; 2. automatically modify or prompt buyer to modify one or more of a property search criteria 240 and loan search criteria 240; 3. test, calculate and display one or more different loan products, a larger down payment, or lower offering price for a property which home buyer can afford and would meet loan underwriting criteria; or 4. suggest what other income/debt ratios, credit score, etc. would be required to meet underwriting criteria;

the process continues, for example, by prompting or allowing buyer 15 to select 45U, one or more of a combination of information to buy a property, make a loan, provide a service, provide a settlement service or transfer title to a property, for example, property information 50, 75, 85, 90, 245, 1350, loan product information 265, 270, 275, 345, 371, information from databases and systems 50, 75, service information, including a bid, quote, order or service information 20, 25, 35, 50, 75, 421, 1360, (See FIG. 20a) settlement information 368, 372, and other information 59 for example immediately or at one or more different times when performing any task or process, for example, when generating a sale contract 255 (See FIG. 15), applying for a loan, 265, 270, 275, 1670, or selecting or ordering a service 421; alternatively process 45U can automatically one or more of select and order one or more information at one or more times, for example, by selecting one or more lowest prices or other desirable criteria;

the process saves 50, 75 for example the selected information from the foregoing search, underwriting, filtering, and selection process 45D, 45J, 45F, 45U, 110 and makes it available to automatically perform one or more additional tasks and process 45, 45W (See FIGS. 1, 1a, 3a-3e) as described elsewhere herein (See FIGS. 1, 1a, 3a-3e) or, for example, to automatically generate or display one or more documents or information to buy a property, make a loan, provide a service, provide a settlement service or transfer title to a property immediately, at one or more appropriate times later in the process, simultaneously, sequentially, in whole or in part; for example, the process can automatically generate 50, 75 saved information and perform 45, 45W one or more sale 10, 15, 20, loan 30, settlement 35, service 25 or other 59 tasks or processes including, for example, automatically displaying screens or prompting users to perform one or more tasks and processes(See FIGS. 3a-3e), or performing one or more tasks or processes(See FIGS. 3a-3e), or generating one or more documents or information 255, 265, 270, 275, 345, 371, 368, 372 automatically 45, 45W immediately or at one or more appropriate times later in the process (See FIGS. 1, 1a, 3a-3e);

for example, when buyer 15 or process selects 45U one or more information, the process 45, 45W can automatically generate or display to buyer 15 or one or more other appropriate users 10, 20, 25, 30, 35, 59 immediately or at one or more appropriate times in the process (See FIGS. 1, 8) for example, one or more of a sale contract document or information 50, 75, 255, 1505, 1510, 1520 (See. FIG. 15), a loan document or information 50, 75, 105, 265, 270, 275, 345, 371 for example, a good faith estimate, truth-in-lending, disclosure, loan application, settlement instruction, note, or deed of trust information, a title or legal document or information 50, 75, 368, a title, title insurance, or deed information, a settlement or settlement statement document or information 50, 75, 372, or an ownership cost information associated with purchasing and owning a property;

for example, when buyer selects a house to buy and a sale contract is generated 10, 15, 255, the process can automatically display and enter one or more information generated 45P and selected 45U to buy a property, make a loan, provide a service, provide a settlement service or transfer title to a property directly into the sale contract documents or screens 50, 75, 255, 1505, 1510, 1520 (See. FIG. 15) including for example one or more property information 245, loan information 50, 75, 265, 270, 275, 1510 (See FIGS. 26a, 28a), a service information 25, 50, 75, a title or legal information, or a settlement cost information 50, 75, 130, 135, 368, 372, 1520 including which party will pay them 1520, including for example the total amount of cash the buyer will need and seller proceeds at settlement 1520, and one or more ownership cost information associated with purchasing and owning a property 1360, 1520, 1660;

for example, when sale contract information is generated or changed 10, 15, 255 system and process 45, 45W can automatically generate one or more of, for example, a loan quote, preapproval, approval task or process or information 265, 270, 275, 335, 340, 110, 300, 371, order or generate a service task or process or information 20, 25, 30, 35, 59, for example, an home inspection 15, 20, 25, 235, 421, an appraisal information, a loan verification information 25, 30, 114, 335, 340, or a settlement service task or process or information 25, 35, 368, 372, for example a survey information, or a title information 35, 140, 366;

for example, as one or more tasks or processes are performed, information is generated, or services are provided, or at any time, system and process 45, 45W can automatically display results and prompt appropriate users 10, 15, 20, 25, 35, 59 to approve, accept, or remove any conditions 255 (See FIG. 15), for example prompt buyer to accept a loan preapproval 270 or approval 275, or alternatively process 45,45W can approve, accept, or remove one or more conditions 255 and perform one or more subsequent tasks or processes or generate one or more additional information automatically 45, 45W, for example, scheduling an home inspection or an appraisal visit, generating a title information, binder or policy document or information 140, 368, ordering a survey, or generating an homeowner association document or information 96;

for example, when sale contract documents or information 255 are generated or received by lender 30 and a buyer is approved for a loan 275, system and process can automatically generate and display 45, 45W, for example, one or more loan closing document or information 371 for example, settlement instructions, note, deed of trust information and generate loan funds 360, 365 and send to settlement service provider 35, 371, 378, and/or system and process 45, 45W can automatically generate and display 30, 35 one or more legal, title or settlement document or information 35, 368, 372, 59;

for example when sale document information 255, loan closing document information 371 or funds are generated 365, 417, system and process 45, 45W can automatically generate and display to one or more appropriate users 10, 15, 20, 30, one or more legal, title and settlement document information 368, 372 including automatically generating or updating one or more information, for example, a title information 140, and generating or updating one or more settlement statement (HUD-1) calculations 372, if appropriate;

for example, when one or more title, legal 368, or settlement 372 tasks and process are performed, document information are generated and approved by one or more appropriate users 10, 15, 30, 255, 368, 371, 372 and funds are generated or received 35, 378 from for example lender 365 and buyer 417 sufficient to transfer title to a property, system and process 45, 45W can automatically one or more of record and transfer title to property 140, 382, perform one or more escrow accounting tasks and process 376, and disburse funds 10, 25, 378, 391;

for example, if any information is changed at any time, for example a contract information 255, a loan information 265, 270, 270, or a service information, one or more of the foregoing search, underwriting, filtering, selection and sale tasks and processes 45D, 45J, 45F, 45U, 110 can be performed again one or more times automatically, and all information for sale, loan, settlement and service process can be automatically generated and changed as appropriate, saved 50, 75, and used in the subsequent sale, loan, settlement and service processes;

the foregoing search, underwriting, filtering, selection and sale process 45D, 45J, 45F, 45U, 45W, 110 is an example, and can be varied, for example, using different buyer search criteria, underwriting criteria, databases and database structure, or different sources of information to buy a property, make a loan, provide a service, provide a settlement service or transfer title to a property; one or more tasks and processes can be varied, added, combined, performed simultaneously, at different times, in different order, eliminated, replaced or enhanced by other tasks or processes, including combining one or more automated processes 45, 45W with one or more manual sale 10, 15, 20, loan 30, service 20, 25, 35, settlement 35 or other 59 tasks or processes;

for example, one or more or portions of the foregoing search, underwriting, filtering and selection processes 45D, 45J, 45P, 45U, 110 can be performed one or more times or at any time, for example, when any tasks or processes are performed for the sale, loan, settlement or a service process (See FIGS. 1, 3*a*-3*e*), or any information is amended or changed 50, 75, by any tasks, processes 45, 45W or users 10, 15, 20, 25, 30, 35, 59; for example, when buyer or other user performs any action to search for a home 15, 240, 245, 85, 90, 1330 (See FIGS. 13, 13*a*, 13*aa*, 13*b*, 13*bb*), enters a property search criteria such as, for example, price, location 240, 1330, clicks 'search for home' button, when property search results are displayed 245, 1350 (See FIGS. 13, 13*a*, 13*aa*, 13*c*), when buyer or other user selects or views property search results details on a particular home (See FIG. 13*c*), clicks on an 'icon' on a map 1380, enters loan search criteria 240, 1630 (See FIGS. 13*aa*, 13*b*, 13*bb*, 16), buyer or other user enter buyer personal, employment, or financial information 15, 240, 1630 (See FIGS. 12-12*d*, 16), a loan quote, preapproval, approval or document information is generated or displayed, 265, 270, 275, 371, buyer views a property, enters a house for viewing, for example through access via a cell phone, wireless device or wireless lockbox 95, saves a property search result 245 (See FIGS. 13, 13*a*, 13*aa*, 13*c*), when a contract is generated or amended 255 (See FIG. 15), when a service is to be ordered 421 or performed, or when buyer performs one or more other tasks at any time;

for example, generating a loan quote, or a service quote or bid and requesting a loan preapproval or approval, or generating a service order or service information can be done at the same time, or at one or more different times;

for further example, process may or may not allow the buyer to search for home 50, 75, 85, 90, 240, 245 (See FIG. 13, 13*a*, 13*aa*, 13*bb*) unless a task or process is performed for buyer to be prequalified, preapproved 270 or approved 275 for a mortgage loan, for example, by prompting buyer, "Would you like to be approved for a loan so you can see exactly what your costs will be?", or not activating or displaying 'Search for Home' button (See FIGS. 13, 13*a*, 13*aa*, 13*bb*) if buyer has not performed a task or process 240, 1630 to be prequalified, preapproved or approved 270, 275 for a mortgage loan; if buyer has not been prequalified, preapproved or approved for a mortgage loan 270, 275, system and process can prompt buyer to enter property search criteria 240, 1630 (See FIGS. 13, 13*a*, 13*b*, 13*bb*, 13*aa*) and loan search criteria 240, 1630 and automatically perform one or more of the foregoing search, underwriting, filtering, and selection tasks and processes 45D, 45J, 45F, 45U, 110;

for further example, the process 45D, 45J, 45F, 45U, 110 can be performed one or more times or at different times, for example, allowing the buyer 15 to enter and change home search criteria 240, 1330, loan search criteria 240, 1630 or select different mortgage loan products 240, 1630, for example, in real time 'on the fly,' displaying different property search results 245 1660 and different loan quote, preapproval, approval or document information 265, 270, 275, service information or ownership cost information associated with purchasing and owning a property for one or more homes 245, 1350, such that user can view different homes and alternative purchase, financing and ownership cost information associated with purchasing and owning a property 1360 for comparison purposes (See FIGS. 13*a*, 13*aa*, 13*c*), including, for example, home price, down payment, settlement costs, and monthly payments, including for example a Good Faith Estimate and truth-in-lending information; this financial information can include, for example, periodic payments and other ownership cost information associated with purchasing and owning a property such as, for example, for a loan, taxes, insurance, homeowner association 96 and utility costs 97;

for further example, if buyer has selected a particular house of interest, including from property search results 245 or by other means, the process 45D, 45J, 45P, 45U, 110 can be performed using, for example, that particular property information 210 (See FIG. 11), performing foregoing process 45D, 45J, 45P, 45U, 110 separately on one or more combinations of loan information 105, 265, 270, 275, information from one or more databases and systems 50, 75, service information 20, 25, 35, 50, 75 and other information 59, in effect omitting searching the property database 50, 75, 85, 90, 240, 245 from the process 45D as described above;

for further example, if a buyer has selected 265 and been preapproved or approved 270, 275, 110 for a particular loan and selected a property 245 (See FIG. 11), process can perform the foregoing process 45D, 45J, 45P, 45U, 110 by simply using that particular loan information 270, 275, property information 245 (See FIG. 11), and sale contract information 255 (See FIG. 15), generating 45D only information from one or more databases and systems 50, 75, service information 20, 25, 35, 50, 75 and other information 59, according to that particular property information 245, loan information 270, 275, and sale contract information 255, in effect omitting searching the loan product and pricing database (P&PDB) 50, 75, 105 and property database 50, 75, 85, 90, 240, 245 from the process 45D, 45J, 45P, 45U, 110 as described above;

for further example, the process 45D, 45J, 45P, 45U, 110 can be performed, modified and combined with the sale contract 255 process one or more times, for example, when a contract information is generated, or amended 255 for example, if a seller makes a counteroffer changing the terms to a contract offer, process can perform process using, for example, a particular property information 210 (See FIG. 11), a particular sale price or other particular sale contract information 255 (See FIG. 15), performing foregoing process 45D, 45J, 45P, 45U, 110 on one or more combinations of loan information 105, 265, 270, 275, information from one or more databases and systems 50, 75, service information 20, 25, 35, 50, 75 and other information 59, generating, displaying and entering results into sale contract 255, in effect omitting searching the property database 50, 75, 85, 90, 240, 245 from the process 45D as described above;

The foregoing embodiments among other things: 1. generate complete, accurate pricing and ownership costs of purchasing and owing a property at the beginning or at one or more times during the home buying process; 2. automatically filter for homes, loans and other costs a purchaser can afford; 3. generate competitive pricing such as quotes or bids from multiple lenders, service providers or sources; 4. automatically generate and display information and documents at one or more times; 5. automatically enter property, loan, service and other information into the entire sale, loan, settlement and services process and documents, 6. automatically order and perform one or more service tasks or processes, and; 7. prompt one or more users to perform or perform one or more sale 10, 20, 30, loan 25, service 25, settlement 35 or other 59 tasks or processes automatically 45, 45W.

For example, there are numerous other preferred embodiments with possibilities for automating, simplifying, combining and streamlining one or more of the sale, loan, and settlement processes. Several additional examples are as follows:

For example, when seller 10 or buyer 15 enter process 5, listing 220 information is generated 10, buyer searches for a home 15, 240, 245, 50, 75, 85, 90, (See FIGS. 13, 13*a*, 13*aa*) or searches for a mortgage loan 240, 1630, sale contract document information 255 (See FIG. 15) are generated, approved or electronically signed, a loan quote 265, preapproval, approval or mortgage loan application information is generated, sent, received, approved 270, 275, a request for a quote, bid, order or settlement service information 366, settlement instructions, mortgage loan documents, and funds are generated, sent, received or displayed 368, 372, or at any time as necessary, appropriate or expedient, process and system can automatically prompt users 10, 20, 25, 30, 35 to perform, or perform automatically 45, 45W, including where possible simultaneously, one or more tasks and processes to generate one or more quote, bid, order or service information 25, 75, 50, 20, 235, 30, 335, 35, 366, 385, 421, 59 (See FIGS. 19, 21) including individual or bundled services; or alternatively process and system 45, 45W can automatically generate 50, 75 and display service information and other service information 20, 25, 35, 235, 335, 340, 385, 366, 421, 417, 1360, 1660 (See FIGS. 13*a*, 13*aa*, 22, 23); for example;

Service providers 25, 35 can generate service information as described elsewhere herein, or alternatively process and system 45, 45W can automatically generate 45, 45W and display quote, bid, order or service information already in system 25, 50, 75 including automatically generating and displaying information to service providers 25, 35 (See FIG. 21), including for example information from other service providers including quotes or terms of service from other service providers allowing a service provider to submit a lower quote, bid or better terms of service (See FIG. 20), either manually or automatically, for example up until for example any time that such service is accepted by the appropriate user 10, 15, 20, 25, 30, 35, 59 or accepted or performed by the process 45, 45W;

for example, when a service quote or bid request or order is received, confirmed or accepted by service provider 25, 30, 35, or generated by system and process 45, 45W, 50, 75, process can prompt service provider to order, or process 45, 45W can automatically order or generate one or more other services or information 25, 50, 75; for example when settlement service quote or bid request or order is received 35, confirmed or accepted, or a settlement service task or process is performed, system and process 45, 45W can prompt settlement service provider 35 to order or automatically generate, for example, a title search or abstract information 140, a survey information, a tax information 130, or an homeowner association information 96;

for example, the system and process 45, 45W can automatically display and prompt appropriate user, for example the seller 10 or buyer 15, to select a quote, bid, order or service information (See FIGS. 20, 20*a*), or process can automatically 45, 45W select 417, 385, 335, 366, 235 a quote, bid, order or service information, for example for the lowest price or quickest service;

for example, if information is not correct or there are potential problems, system and process 45, 45W can automatically prompt or notify appropriate user of possible problems; for example, when seller enters seller or property information 210 (See FIGS. 10, 11) sufficient to identify a property, process can automatically generate environmental hazard information 103, land use information 99, or court records or title information 140, and if there are possible problems such as, for example, an environmental problem, an unreleased lien, a tax lien, or unpaid taxes, or title to the property being in a different or misspelled name, etc., or for example, when buyer 15 enters loan search criteria 240, personal or financial information (See FIGS. 12-12*d*), process can automatically for example generate credit information 112 and show errors or problems with credit score or report, for example, incorrect loan or credit account that is not the borrower's or which has been paid off 112, or inconsistent employment, deposit or mortgage verification information 340; the process 45, 45W can automatically not allow process to continue, for example, not allow listing 220, or sale contract information 255, or a mortgage loan approval information 275 to be generated, unless the problems are corrected, or, alternatively process 45, 45W can allow appropriate user or process to override with proper notices to appropriate users as necessary, appropriate or expedient; for example, if information 50, 75, or service results 25, 35 come back and verifies that there is not a problem, process 45, 45W can automatically remove condition or contingency, and require no further action to automatically proceed with process, including for example, process automatically generating 45, 45W additional information 50, 75, generating other service information 25, 35, 50, 75 or performing additional tasks and processes 10, 15, 20, 25, 30, 35, 59 (See FIGS. 3*a*-3*e*) as necessary, appropriate or expedient;

for example, when service order is generated, sent, confirmed, accepted, or selected 25, 235, 335, 340, 385, 366, 421, 417, 45U process and system 45, 45W can for example, automatically check an electronic calendar (See FIG. 7) of appropriate users, as necessary, appropriate or expedient, for example, for home improvement contractor 25 and seller 10 to determine whether requested service date is acceptable for service, automatically notify parties of possible conflicts, suggest or select dates and times with no conflict, continue to send notices if necessary until process 45, 45W receives confirmations, and confirm a time to appropriate users; for example process 45, 45W can automatically prompt, call or notify a user, for example on a wireless device; process can automatically change 'status' and screens showing status of services and tasks as described elsewhere herein; when service order is generated, confirmed or accepted, system and process 45, 45W can automatically generate a map and directions to a location and send to for example, a wireless automobile navigation computer, GPS wireless computing device or cell phone for navigation purposes;

for example, when seller 10 enters process 5, 153, 154, 155, 165 (See FIGS. 1*e*, 1*f*, 1*h*), for example, through an Internet 'portal' or Website 5 (See FIG. 1*e*), real estate broker or agent Website 5 (See FIG. 1*f*), or in any other manner indicates they are a seller, or at one or more, or at any time, process and system among other things can automatically prompt the seller to perform for example, generate a pop-up, screen, additional fields, button, audio message, 'chat' screen, VoIP application, video-conference application, 'application sharing,' a message, or otherwise (See FIG. 1*h*), or perform process automatically 45, 45W and where possible perform one or more tasks and processes simultaneously; for example, prompt seller to sell with or without the assistance of a real estate agent (or move consultant or transaction coordinator) 154, 155, 165 (See FIGS. 1*e*, 1*h*); if seller chooses to sell without a real estate agent seller will perform process as described elsewhere without a real estate agent; if seller chooses to sell with the assistance of a move consultant or transaction coordinator, they will perform one or more of the tasks and processes described elsewhere herein as being performed by a real estate agent 20; for example, the process 45, 45W can, automatically prompt seller to select, or automatically generate information for one or more of real estate agents (or move consultant or transaction coordinator), lenders or service providers to assist in finding and purchasing seller's next home 165 since it is assumed seller will be moving to a new home and may need such assistance, in which case the system performs the processes described elsewhere herein for a buyer as appropriate; for example, process and system 45 can automatically prompt seller to enter seller information and property information 210 (See FIGS. 10, 11);

for example, when minimum seller and property information 210 is entered to identify the property, for example address of property 210, system and process 45 can automatically generate or prompt seller 385, 1920 to request information from one or more sources 20, 25, 35, 50, 75, 59 for example one or more quote, bid, order, task, process or service information 50, 75, 25, 35, 59; for example, the system and process 45, 45W can send requests for 385, 1920 (See FIG. 19) or generate one or more quote, bid, order, task or process or service information for example from one or more system or databases 50, 75, service providers 20, 235, 25, 35, 366, or other sources 59 which can respond either manually or automatically 45, 45W in whole or in part, immediately or at one or more times in the process, with quote, bid, order, a task or process or service information (See FIGS. 20, 20*a*, 21, 22); these can be for one or more services, for example, individual or bundled services, real estate agent or real estate broker service information 20, move consultant or transaction coordinator, real estate signs, lockbox, advertising, property photographs, legal, title or settlement service information 35, title or land records information 140, existing loan payoff information, survey, appraisal 114, flood information 125, home photographs, home improvement and repairs, construction, or home inspection service information 25, environmental information 103, land use information 99, homeowner association information 96, utility information 97, real estate tax information 130, moving and storage service information, etc.; the process and system 45, 45W can display and prompt seller to one or more of review or select a quote, bid, order, or service information, or system and process 45, 45W can automatically generate and select, one or more bid, quote 25, 50, 75, 385, 2030 (See FIGS. 20, 20*a*), order, or service information (See FIG. 23) one or more times, immediately, or later in the process, as appropriate, for example, when generating listing information 220, generating a contract 255 (See FIG. 15), or when a service is to be performed.

for example, when minimum property information is entered to identify the property, for example a property address 10, 210, system and process 45, 45W can automatically generate sale comparables for example, a comprehensive market analysis (CMA) report 50, 75, 80 and display to seller 10, with for example photographs and map, and can, for example, suggest asking price, and for example display how much the seller will actually receive at settlement 1520, 372; system and process can automatically prompt seller to list property 220, for example, by automatically 45, 45W generating and displaying a listing agreement 220 and necessary disclosures with seller information, property information 210 (See FIGS. 10, 11), and suggested asking price automatically entered; such listing agreement may be any similar agreement, for example, to employ the services of a 'for sale by owner' (FSBO), or online system without the services of a real estate agent or broker; if seller lists property by some action, any data or information from the foregoing processes is automatically saved for later use 45, 45W, 50, 75 for the remainder of the selling processes (See FIGS. 1, 3-3e) as described elsewhere; when listing agreement 220 is generated or accepted by seller 10 system and process can automatically display summary listing information (See FIG. 14) and automatically enter listing and property information into one or more property database 50, 75, 85 and send notices to others for example real estate agents 20 and prospective buyers 15; system and process can automatically generate 'open houses' schedule (See FIG. 7) and automatically notify appropriate users such as seller 10, buyers 15, or real estate agents 20 for example by displaying on Webpage containing information on property 1350 (See FIG. 13c) or for example process 45, 45W automatically calling or notifying a user, for example on a wireless device; system and process can automatically change status and screens to 'listed' or 'listings' 445, 910 (See FIG. 4a), and move to and display in 'Listings' Transaction View 435, 920 and automatically display status of services, tasks needed to be performed, etc. 920 (See FIGS. 7, 9) as necessary, appropriate or expedient.

the foregoing processes can be performed at one or more, or at any time, for example, when seller searches for a real estate agent 20, 153, 155, enters seller information 210 (See FIG. 10), enters property information 210 (See FIG. 11), a sale contract is generated 255, or when seller performs at any time one or more of the steps or processes described elsewhere herein or represented in the various drawings;

As further description of another aspect of the preferred embodiments of the invention, when buyer first enters the process, for example, through an Internet 'portal' or Website 5 (See FIG. 1e), real estate broker or agent Website 5 (See FIG. 1f), or a mortgage search site, or a mortgage lender site 159 (See FIG. 1g), or in any manner, indicates they are a buyer 156, 157, 158, 159, or at one or more times, or at any time, process and system 45, 45W among other things can automatically prompt buyer to perform, for example generate pop-up, screen, additional fields, button, audio message, 'chat' screen, VoIP application, video-conference application, 'application sharing,' a message, or otherwise prompt buyer (See FIG. 1i), or system and process can perform automatically 45, 45W and where possible simultaneously one or more tasks and processes, for example: prompt buyer to buy with or without a real estate agent (or move consultant or transaction coordinator) 167, 157, 158 (See FIG. 1i); if buyer chooses to buy without a real estate agent, buyer will perform process as described elsewhere without a real estate agent; if buyer chooses to buy with the assistance of a move consultant or transaction coordinator, they will perform one or more of the tasks and processes described elsewhere herein as being performed by a real estate agent; for example, process and system 45, 45W can automatically send marketing and advertising materials to buyer 15; for example, process and system 45, 45W can automatically prompt buyer to enter one or more buyer personal information (See FIGS. 1j, 13b, 13bb, 13aa), employment (See FIGS. 1j, 12a), financial information 15, 240 (See FIGS. 1j, 12b, 12c, 12d, 13b, 13bb, 13aa, FIG. 16), loan search criteria 240, 1630 (See FIGS. 13b, 13bb, 13aa, FIG. 16); process and system 45, 45W can automatically prompt buyer to perform one or more tasks and processes to search for and select a mortgage loan quote 240, 265, 45D, 45J, 45P, 45U, 110 (See FIG. 1j, 13b, 13bb, 13aa, 16) and perform process for buyer to be one or more of prequalified, preapproved, or approved for a mortgage loan, including as described elsewhere herein, 240, 270, 275, 45D, 45J, 45P, 45U, 110 (See FIGS. 1j, 3b, 18) including for example, generating and displaying one or more mortgage loan document information 265, 270, 275, 810, 45P (See FIGS. 1j, 8, 17), including one or more disclosures, for example, Good Faith Estimate, Truth-in-Lending, Affiliated Business Arrangement Disclosure, HUD Handbook, or other disclosure information 810 (See FIG. 8), loan application information 270, 275, 1670 (See FIG. 27), or other loan information 371 (See FIGS. 18, 26a); for example, system and process 45, 45W can automatically change 'status' and display for example, 'buyer financing approved' 445, 910 (See FIG. 4a, 4b), for example in 'Buyer—Prospects' View 435, 910, 920 'Financing Approved-Showing Properties' as necessary, appropriate or expedient, and for example, system and process 45, 45W can automatically display screens and prompt buyer to enter property search criteria 240 (See FIGS. 1j, 13, 13a).

for example when buyer 15 enters process 5, 156, 157, 158, 167 (See FIGS. 1e, 1f, 1i) or enters property search or loan search criteria 240, 1330, 1630, or at any time, system and process 45, 45W can automatically generate 50, 75 or prompt buyer to request 417 one or more quote, bid, order, task or process or service information from one or more sources 20, 25, 35, 50, 75, 59 for example for real estate agent or real estate broker services 20, mortgage loan services 30, home inspection service, home improvement service 25, settlement service 35, employment, loan, deposit or other verification information 340, credit information 112, moving and storage information 25, etc.; for example, the process for automatically generating 45, 45W, 50, 75 or prompting buyer to request 417 one or more quote, bid, order, task or process or service information or performing the tasks and processes for generating one or more quote, bid, order, task or process or service information, including prompting buyer to select, or automatically selecting, one or more quotes, bids or service information 45U, 417, 2030 (See FIGS. 20, 20a, 23), including those described elsewhere herein, can be performed one or more times, immediately, or later in the process, as appropriate, for example, when property search results are generated or displayed 245, 1350 (See FIGS. 13a, 13aa, FIG. 13c), when loan quote, preapproval or approval information is generated or displayed 265, 270, 275, a contract information is generated or displayed 255, 1510, 1520 (See FIG. 15), or when a service information is generated or displayed or a service is to be performed; and any information from the processes can be saved 45, 45U, 50, 75 for later use automatically 45W as the remainder of the process is performed as described herein.

for example, when buyer 15 selects one or more houses 245, 1350 (See FIG. 13, 13a, 13aa) for viewing, for example, system and process 45, 45W can automatically send a request for appointment and viewing of home to appropriate party, for example the seller 10 or real estate agent 20, allowing them to respond to confirm viewing appointment (See FIG. 7), or automatically checking schedules of appropriate parties and confirming by sending messages to one or more users 10, 15, 20, or dialing a phone number using for example using VoIP, or calling or notifying a user on a wireless device to immediately communicate viewing details directly to one or more appropriate users 10, 20;

for example, when selecting a home to view 245, 1350 (See FIGS. 13, FIG. 13a, 13aa, 13c), system and process can automatically generate maps and directions 1380 and automatically program directions into for example, wireless automobile navigation computer, GPS-enabled wireless computing device or cell phone for navigation to selected homes.

For example, system and process can automatically change 'status' and screens to for example, show calendar (See FIG. 7) with appointments or show 'open houses' of houses selected for viewing by buyer and appropriate users 10, 20.

When buyer 15 is, for example driving in the neighborhood, enters information on a property from a for sale sign, or visits a home for viewing 245 or at any time, process and system can perform automatically 45, 45W and where possible simultaneously one or more tasks or processes, for example: system and process 45, 45W can send previously saved information 50, 75, 245, 265, 270, 275, 1350, 1360, 1660 for example text, audio, graphic, video, or driving directions 1380 to a wireless computing device or cell phone; send for example text, audio, graphic or video description or 'tour' of the property describing for example the neighborhood and home features to a wireless computing device, cell phone or 'digital lockbox' 95 with a microphone and speaker; system and process 45, 45W can automatically prompt buyer 15 or buyer's agent 20 while they are viewing the house to input 'feedback' comments, for example into a wireless computing device, cell phone 15, 20 or 'digital lockbox' 95, which is received and saved in the system and sent automatically, for example, to the seller 10 and real estate agent 20; system and process 45, 45W can automatically prompt the buyer to make a sale contract offer on the home 255, for example, displaying sale contract documents or information 255 to buyer which buyer can modify and send to seller 10 and automatically notify the seller 20 of offer 255, for example by prompting or notifying seller on a cell phone or wireless computing device, allow seller to accept offer or negotiate with buyer, for example real time, and allow parties to negotiate and finalize sale contract 255. System and process 45, 45W can automatically change 'status' and screens to for example, 'showing property,' 'offer/negotiations,' 'contract' 435, 445, 910 (See FIG. 4*a*) and move to and display in 'Buyer—Prospects' View 435, 910, 920 'Showing Properties' or 'Contract' as necessary, appropriate or expedient;

for example, system and process 45, 45W can not allow sale contract document information 255 (See FIG. 15) to be generated, approved or electronically signed 10, unless buyer is prequalified, preapproved or approved for a loan 265, 270, 275 for which buyer will qualify to purchase a particular home; if buyer has not been prequalified, preapproved 270 or approved 275 for a loan, system and process can prompt buyer 15 to perform process 45D, 45J, 45P, 45U, 110 for buyer to search for 240, 265, 1630 be prequalified, preapproved or approved for mortgage loan 270, 275, automatically prompt buyer, for example to select a loan quote from one or more choices 265, 270, 275, 1660 for which buyer will qualify to purchase a particular home 245; system and process 45, 45W can automatically enter and display appropriate loan information, for example the loan amount and terms (See FIGS. 26*a*, 28*a*) into the sale contract documents 255, 1510 (See FIG. 15), the terms of which, for example, require the buyer to obtain certain financing as a condition of the sale, including displaying actual settlement costs 130, 135, 372, 1520 and which party 10, 20, 30 will pay them, or other ownership cost information associated with purchasing and owning a property, for example, directly in the sale contract documents 255, 1520 (See FIG. 15), or as an exhibit, including for example the total amount of cash the buyer will need and how much the seller will actually receive 372, 1520 at settlement; when contract is generated, process can automatically send, notify or display sale contract document information 255 (See FIG. 15) to all appropriate parties 20, 25, 30, 35 to the transaction including summary sale information (See FIG. 14) as necessary, appropriate or expedient.

for example, when a sale contract is generated 255, the system and process 45, 45W can automatically generate change in status to 'under contract;' and cancel 'showing' appointments and 'open houses' (See FIG. 7) and can change 'status' and screens to for example, 'under contract' 445, 910 (See FIGS. 4*a*, 4*b*, 9), and display in Contracts View 10, 15, 20, 25, 435, 920 (See FIG. 9) as necessary, appropriate or expedient.

For example, when sale contract document or information 255 (See FIG. 15) are generated, or at any time, process and system can automatically prompt 45, 45W one or more users to perform, or perform automatically 45, 45W and where possible simultaneously, one or more tasks and processes, for example: as information is generated 50, 75 or service or service information 25 is generated, confirmed or provided, or at any time, system and process 45, 45W can automatically display service results or information and prompt acceptance or approval by buyer or seller 10, 15, or alternatively system and process can remove automatically one or more conditions or contingencies of the sale contract 255, 1510, 1520 (See FIG. 15) the terms of which contain conditions or require buyer or seller to do things, for example, if the contract requires the buyer to arrange for or approve a professional home inspection 25, approve title information 140, 368, a survey, or homeowner association information 96.

For example, if sale contract information 255 (See FIG. 15) is amended by parties 10, 15, system and process can automatically perform and recalculate 45D, 45J, 45P, 110 and display to appropriate users 150, 10, 15, 20 amended mortgage loan information 275, 371, legal and title 368, settlement information and costs 372 other service information 1360, or other ownership cost information associated with purchasing and owning a property in the amended sale contract documents 255, 1520 (See FIG. 15).

For example, when a request 240, 1630 for loan quotes 265, 1660 preapproval, approval or mortgage loan application information 270, 275 is generated, or received by one or more lenders 30, 105, including mortgage investors 345, or at any time, process and system 45, 45D, 45J, 45P can automatically prompt to perform, or perform automatically, simultaneously, or at one or more times, one or more tasks and processes:

for example, prompt one or more lenders 30, 105, including mortgage investors 345, to provide a loan quote or bid information 265 including for example, loan rate, amount, term, and fee information 1660 (See FIGS. 13*a*, 13*aa*, 16), including automatically generating and incorporating quotes or bids or information from one or more service providers 25, 35 or other sources 50, 75, 59, 45, 45D, 45J, 110; process can automatically generate requests for verifications 340, 45D and receive back 15, 30 verification responses 340; for example, if verification information is not correct, process 45, 45D can automatically stop one or more tasks and processes 255, 265, 270, 275, 372 and automatically notify appropriate user 15, 30 of possible problems, for example different financial, employment, loan, deposit or other verification information 340, flood 125, title 140, or credit problems 112 and lender can manually underwrite 300 in whole or in part, or underwriting process can automatically underwrite 45J, 110, quote, prequalification, preapproval, or approval request or mortgage loan application in whole or in part (See FIG. 26);

for example, when loan is approved 275 system and process can one or more of automatically generate and display 45, 45P to one or more appropriate users 10, 15, 30, 35 one or more appropriate loan approval 275 and closing documents or information 371 including, for example commitment, disclosures, note, deed of trust or mortgage, settlement instructions 371 (See FIG. 8), automatically generate mortgage loan funds 365, automatically order settlement 35, 45W and automatically change 'status' and screens for one or more users 10, 15, 20, 30, 35 to for example, for example 'under contract,' 'financing approved,' 'contingencies removed' 435, 445, 480, 920, 'approved' 460, 2420 (See FIG. 20), 'settlement scheduled' (See FIG. 7).

When contract sale documents 255 (See FIG. 15) are generated, approved or signed, mortgage loan is approved 275, or settlement order or settlement instructions, mortgage loan documents, and funds are generated, sent, received or displayed 371, 365, or at one or more appropriate times, process and system automatically prompt to perform, or automatically perform 45, 45W and where possible simultaneously one or more tasks and processes:

for example, system and process 45, 45D, 45W can automatically prompt one or more settlement service providers 35 to provide or automatically generate one or more of a quote, bid or settlement service information or settlement service task or process 35 (See FIG. 3c), including automatically generating 45, 45W service information from one or more sources 25, 35, 50, 75, 59 for example, title insurance, survey, title search, title abstract, court records search 140, existing loan payoff information, homeowner association information 96, real estate tax information 130, utility information 97, transfer and recording charge information 135, and land record information 140; for example, process and system 45, 45W can prompt settlement service provider 35 to generate or automatically generate 45, 45W one or more title and legal document information, for example title insurance endorsements, requirements, and exceptions, deeds and recording document information 368 (See FIGS. 31, 35) containing sale contract information 255, loan information 275, 371 and service provider information or other information 25, 50, 75, 59, 140, 135, 130, 366, 374 as necessary, appropriate or expedient; for example, process and system can automatically generate 45, 45W final billing information from, for example, service providers 25, databases and systems 50, 75 or other sources 59, for example, utility providers, 97, homeowner association 96, real estate tax 130 or land record or public systems 140 to render final billing, for example, gas, water, electricity bills 97, real estate taxes 130 (See FIG. 33); for example, system and process 45, 45W can automatically enter final billing information into, perform one or more calculations, and generate HUD-1 settlement statement 372 (See FIG. 32) and escrow accounting system 376 (See FIG. 33) tasks and process, or equivalent, as necessary, appropriate or expedient; for example, system and process 45, 45W can automatically check land or public records 140 for example, for any intervening liens or other changes in land records or in court records and compare with the approved 'title binder' or title report 368; for example, system and process 45, 45W can automatically generate and display one or more final legal, title and settlement document information 368, 371, 372, 485, 490 (See FIGS. 4c, 431, 35) to be approved or signed by appropriate parties 10, 15, 20; when approved or electronically signed by appropriate parties 10, 15, 20 process and system 45, 45W can automatically send and record in appropriate land or public records 382, 140 (See FIG. 35) any document or information, including for example, deeds, releases 368, loan closing documents 371 and automatically disburse funds 378 to appropriate parties 10, 20, 25, 75 as necessary, appropriate or expedient, for example for existing mortgage financing, real estate or other taxes 130, liens 140, utility charges 97, homeowner association charges 96; for example, process and system 45, 45W can automatically generate confirmation of payment 378 and releases from payees, and generate and file 382, 140 releases from, for example existing mortgage financing, real estate or other taxes, liens, or utility charges effecting the property in land or public records 140, generate confirmation of recording of releases 140, save and automatically send information, documents, and evidence of recording information to appropriate parties, for example, buyer 15, seller 10, real estate broker, real estate agent 20, mortgage lender 30, mortgage investor 345, existing mortgage lender (See FIG. 36) as necessary, appropriate or expedient; for example, the system and process 45, 45W can automatically enter information or document information into mortgage servicing systems 50, 75, 122; for example, system and process 45, 45W can automatically change 'status' and screens to for example, for example 'sold' 'recorded,' 'funds disbursed' 435, 445, 460, 480, 910, 920, 2410, 2420, 2910, 2920 (See FIGS. 4, 4a, 4b, 4c, 9, 24, 29).

For example, system and process 45, 45W can automatically generate and send 'just sold' information about property and sale, for example by e-mail or notifying a computing device including a wireless device, for example, including description, photo of home and map, sale price, real estate agent name, real estate broker name, for example, to prospective customers and property owners in the neighborhood area, for example by subdivision, zip code, street, within certain distance to inform them of the sale, or by posting on one or more Websites, for advertising and promotional purposes.

As further description of another aspect of the preferred embodiments of the invention, in the case of a home refinance (See FIGS. 1b, 1c, 2a), when the borrower 16 first enters the home refinancing process, for example, through an Internet 'portal' or Website 5, including a mortgage search or lender Website 5 (See FIG. 1g, 1i), indicates they are a borrower for refinancing 160, or at any time, process and system can among other things automatically prompt borrower to perform, or perform one or more tasks and process automatically 45, 45D, 45J, 110, 45P, 45U, 45W (See FIG. 1j), and where possible simultaneously, for example: display to borrower pop-up, screen, additional fields, a button, audio message, 'chat' screen, VoIP application, video-conference application, or 'application sharing' application, send a message, or otherwise prompt borrower 167 (See FIG. 1i) to enter loan search criteria 240, 1630, and to perform one or more tasks or processes to generate a mortgage loan quote 105, 240, 265, 1630 (See FIG. 16) preapproval or approval 270, 275, or to enter a service search criteria to generate one or more of a quote, bid, order or service information 1920 (See FIG. 13b, 19) and the system and process can perform one or more tasks and processes 45, 45D, 45J, 110, 45P, 45U, 45W (See FIG. 1j), excluding the processes for searching a property database 50, 75, 85, 90, 240, 245 or sale processes 20 (FIG. 3a) as elsewhere described herein, for borrower to search for 240 and one or more of generate 45D, 45J, 110, 45P, 45U a mortgage loan quote 105, 265 (See FIGS. 3b, 3e, 16) to be prequalified, preapproved, or approved for mortgage loan 270, 275 (See FIGS. 3b, 3e, 17, 18), and generate 1920, 421 (See FIG. 19) one or more quotes, bids, order or service information (See FIGS. 20a, 21, 22) for example from one or more systems and databases 50, 75, service providers 25, 30, 35, or other existing programs 59; service information can be for one or more of, for example, individual or bundled services, home inspection information, home improvement information 25, settlement service information 35, title information, title insurance information, employment, loan, deposit or other verification information 340, credit information 112, etc.; for example, the processes for ordering and generating service information described elsewhere herein can be performed including displaying and prompting borrower to select, or generating and selecting automatically 45D, 45J, 110, 45P, 45, one or more bids, quotes 2030, 421 (See FIGS. 20, 20a), or service information (See FIG. 23) (See FIG. 23), one or more times, immediately or later in the process 45, 45W as appropriate, for example, when a service is to be performed; for example, any data or information from the foregoing processes can be saved 50, 75 for later use automatically 45, 45W as the remainder of the refinancing processes as described elsewhere herein is performed.

Alternative Preferred Embodiments

There are numerous alternative preferred embodiments for automating, simplifying, combining and streamlining one or more of the sale, loan, and settlement processes. One or more of the foregoing tasks or processes described elsewhere herein or represented in the various drawings can be varied, arranged in different order, combined, eliminated, replaced or enhanced by other tasks or processes; different underwriting criteria, databases 50, 75 and database structure can be employed; one or more tasks and processes can be performed simultaneously, at different times or at more than one time; information to buy a property, make a loan, provide a service, provide a settlement service or transfer title to a property 50, 75 can be generated from different sources.

Another example of combining functions or streamlining the process would be to combine the tasks and process of several virtual offices or desktops 20, 25, 30, 35. For example, since the process can be so highly automated 45 it is possible to combine screens, tasks and process of the Virtual Real Estate Office 20 (See FIG. 3a), the Virtual Mortgage Office 30 (See FIG. 3b) and Virtual Settlement Office 35 (See FIG. 3c) to be performed by fewer users; for example, one or more sale 10, 15, 20, loan 30, service 20, 25, 35, settlement 35 or other 59 tasks or processes described as being performed manually by one or more users can be performed automatically including by the application, system and processes 45, 45D, 45J, 45P, 45U, 45W, substantially reducing if not totally eliminating many of the manual tasks and process of virtual real estate office 20, virtual mortgage office 30, virtual settlement office 35, and service provider virtual offices or desktops 25 and their personnel, and except for certain tasks which need to be performed physically, such as for example the home or pest inspections, having the system and process 45 perform virtually the entire automatically.

While the preferred embodiments, as described above, preferably includes one or more common application servers 45 and databases 50, 75, other embodiments can include a system which operates in combination, and is integrated with one or more extrinsic real estate, mortgage, settlement and other programs or systems 59 (See FIG. 1d) whereby processing information and performing one or more tasks and processes may be performed by one or more of the application servers 45 and one or more extrinsic real estate, mortgage loan, settlement and other programs 59 (See FIG. 1d); and, for example, users may view, enter, receive, manipulate and send information and perform functions in one or more of the application (See FIG. 1) and one or more extrinsic real estate, mortgage, settlement and other programs or systems 59 (See FIG. 1d) to perform one or more of the tasks and processes described above.

Yet another example may include in some markets some of the tasks and processes of the real estate agent 20 (See FIG. 3a) such as, for example, preparing the sale contract documents 255 (See FIG. 15) and receiving and holding the escrow deposit from the buyer 285 being performed, for example, by an attorney who will also perform the tasks and processes of the settlement company 35 (See FIG. 3c) in closing or settling the sale.

Yet another example of modifying the process is a 'self-help' system for a buyer or seller to use, for example, a 'for sale by owner' FSBO solution, without the help of a real estate agent or sales person 20 in the sale process. For example, such a system would eliminate the Virtual Real Estate Office 20 (See FIG. 3a) and include certain functions in the Seller and Buyer Virtual Desktops 10, 15 such as, for example, entering property information into a property database 210, 50, 75, 85 searching the property database 240, 245, creating and negotiating a contract 255 (See FIGS. 13a, 13aa, 13c, 15) directly between buyer and seller, ordering all services 385, 421 including those which the agent might order 235, etc.

The buyer 15 could also perform an entirely automated loan process without a Virtual Mortgage Office 30 directly with an automated loan application, verification and underwriting process 45, 45D, 45J, 45P, 45U, 45W, 105, 110.

Still other modifications could be used on a kiosk in a public location, for example in a shopping mall, or could be adapted to be used with a 'move consultant or 'transaction coordinator,' or equivalent, to help track the sale, order services, notify parties of deadlines, etc. Such 'move consultant or 'transaction coordinator' would have features for ordering services, tracking transaction progress, and performing one or more tasks and processes for one or more users 10, 15, 20, 25, 30, 35.

Commercial Real Estate

While the preferred embodiment as described the home sale, mortgage and settlement process, the process can be also used, with any modifications necessary, for the commercial real estate market including, for example, the buying and selling of commercial buildings, apartment buildings and land.

Other Markets

The system design, the workflow, (See FIGS. 1, 1a) virtual office (See FIG. 4) and virtual desktop (See FIGS. 5, 6) can be adapted for use in other markets or industries. Some other markets or industries can include, for example, international trade and shipping. The seller, buyer, real estate agent, mortgage lender, settlement and service provider functions, activities, and documents could be changed to provide functions, activities, and documents, for example, for the manufacturer, shipping agent, shipping company, customs agents, bank financing, insurance and bonding, warehousing, etc. all of whom are in diverse locations worldwide.

Unobviousness, Synergy and Unexpected Results not Suggested by Background References The Invention Meets the KSR Tests of Synergy and New and Unexpected Results As required by KSR, the present invention provides a "new synergy" doing "more than the individual components would in separate, sequential operation," and "does more than yield a predictable result," producing many valuable, new and "unexpected results."

For example, one example of this "new synergy" is a greatly simplified process for a home buyer to search for a home while simultaneously generating highly accurate and competitive pricing for a loan, services and costs of buying and owning a home at the beginning of the buying process. Using this information, the process then automatically generates documents and automatically performs subsequent sale, loan and settlement tasks and process immediately, at one or more appropriate times later in the sale, loan and settlement process. This clearly streamlined and simplified sale, loan, settlement and service process is a significant advance over any former process and provides a "new synergy" clearly doing far more than the individual components of the sale, loan, settlement and services processes could do in "separate, sequential operation."

In addition, the invention produces many new, valuable and "unexpected results," including: the comprehensive design greatly simplifies a complex process; it results in a system that is less costly to build, operate, maintain, change, and upgrade; it eliminates numerous gaps in tasks and processes, particularly gaps in basic, tasks and processes fundamental to the sale, loan and settlement process; it greatly reduces the need for manual tasks; it allows a much greater degree of automation for the entire process, particularly automating basic, tasks and processes fundamental to the sale, loan and settlement process; it allows basic, tasks and processes fundamental to the sale, loan and settlement process to be performed interactively and in conjunction with each other; it allows tasks and processes to be performed automatically in unique and unanticipated configurations; it allows user screens, tasks and processes to be combined to allow the process to be performed by fewer users; it allows for tasks to be performed quickly and efficiently multiple times, in different orders, simultaneously or at different times; the invention adds certainty to a process traditionally characterized by uncertainty; the process can be simplified, streamlined and made more user-friendly by combining or eliminating functions or steps, or presenting information or allowing functions to be performed in a more understandable and simpler way.

A particular "unexpected results" is that the invention quickly generates highly accurate, complete information at the beginning of the buying process, including generating competitive pricing for loans, services and the costs of buying and owning a home, allowing for a more fully informed homebuyer, and a more automated and streamlined over-all sale, loan, and settlement process.

In summary, the invention provides tremendous "new synergy" and "unexpected results," with the elements working together in an unexpected and fruitful manner, doing more than yielding a predictable result.

Objects and Advantages

In some preferred embodiments, some advantages that may be achieved, if desired, (such as, e.g., with a comprehensive computer system for the entire home sale, mortgage loan origination and settlement process according to some embodiments described herein) can include, among other things, for example one or more of the following and/or other advantages: 1. generate complete, accurate pricing and ownership costs of purchasing and owing a property at the beginning of the home buying process, or at other times; 2. automatically filter for homes, loans and other costs a purchaser can afford; 3. generate competitive pricing including quotes or bids from multiple lenders, service providers or other sources; 4. promotes competitive use of 'discount real estate brokers' in lieu of "6 percent brokers;" 5. allows lenders to quickly determine the creditworthiness of the borrower and the value of the security for a loan; 6. buyer can receive a loan 'prequalification,' 'preapproval,' and 'approval' based on actual 'underwriting' results and rates while searching for a home and other services; 7. will reduce costs for both the home buyer and seller; 8. allow the buyer to see a more complete picture and the ramifications of selecting a particular property and type of loan prior to signing a binding contract rather than finding surprises later; 9. automatically generates accurate disclosures required by RESPA and other regulations such as the 'Good Faith Estimate' (GFE) and truth-in-lending (TIL) at the very beginning of the sale process; 10. is of particular importance and value because selling or purchasing a home is the largest single financial decision for most families; 11. is of particular value for low- or moderate-income families with limited knowledge and sophistication; 12. allow any information to be automatically saved and used for further home searches or used later in the sale, mortgage and settlement processes; 13. automatically enters property, loan, service and other information into the entire sale, loan, settlement and services process and documents and automatically generates and displays information and documents; 14. automatically orders and performs one or more service tasks; 15. automatically prompts one or more users to perform or perform one or more sale, loan, service, settlement or other tasks or performs one or more processes automatically; 16. preempts and overcomes resistance to change by traditional real estate, mortgage, and title industry; 17. allows lenders and service providers to sell mortgage products and services at the earliest point in the home sale and buying process thereby preempting other vendors from capturing business, 18. it reduces work by all parties allowing the process to be more highly automated, eliminating and reducing work currently being performed manually; 19. it reduces redundant and repetitive tasks of manually entering the same information numerous times in different computer programs, so information can be entered once for the entire transaction, not just portions of the transaction; 20. it reduces work, time, cost and chances of error associated with having to manually rehandle information numerous times, first having the real estate personnel reenter information to perform tasks or transfer to more than one program, having the mortgage personnel reenter information to perform tasks or transfer to other programs, and then having the settlement personnel again reenter or transfer information to other programs; 21. it allows transaction information to be instantly available to immediately perform additional tasks anywhere in the process automatically; 22. it allows transaction information and status information to be instantly available to all parties as appropriate, thus reducing confusion, delays, uncertainty and chances of errors in the process; 23. it reduces the cost of completing a transaction; 24. it reduces the number of personnel necessary to complete a transaction; 25. it reduces or even eliminates waiting time and reduces the overall time required to complete a transaction; 26. it provides greater reliability in the process; 27. it assures that important sale and mortgage disclosure information and documents required by laws or regulations be given to the seller or the buyer, or the refinancing home owner, on a timely basis; 28. it greatly reduces the cost, complexity, unreliability, and design limitations of trying to 'patch together,' or 'integrate' different computer systems, one for the real estate sale personnel, another for the mortgage company personnel, and another for the settlement company personnel, etc.; 29. it results in a system with greater and more functional features for users; 30. it provides a much more highly automated system without gaps in the process; in other words, for example, the instant the loan officer does something to approve the loan, the documents can be automatically prepared and sent to the settlement company and the borrower in seconds; 31. it is easier and cheaper to change or modify, add features, or upgrade the system from time to time; this is important with ever-changing technology and constantly changing market conditions; 32. a comprehensively designed system is more reliable and less likely to malfunction or 'crash'; 33. it is less costly to build and maintain; 34. the process can be simplified, streamlined and made more user-friendly by combining, eliminating one or more functions or steps, or presenting information or allowing functions to be performed in a more understandable and efficient way; and/or 35. it provides a smoother, simpler, continuous process from the beginning to the end of the entire home sale, mortgage origination and settlement process.

Broad Scope of the Invention

While illustrative embodiments of the invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In addition, in this disclosure, the terminology "invention" is intended to encompass numerous independent inventive aspects. References to the "invention" in this disclosure can refer to one or more of the various aspects of the invention. The use of the language "invention" or "present invention" should not be in any way construed as limiting the broad reach of the claims and/or in any way limiting the scope of the claims and/or all aspects of the invention.

I claim:

1. A computer implemented method comprising the steps of:
    maintaining one or more first computing processors, in communication with a real estate information system over a computing network, capable of executing programming instructions including:
    receiving, including at least in part from a real estate buyer computing device comprising one or more computing processors able to at least receive, display and send information in communication with said real estate information system over said computing network, one or more first request for information comprising one or more request for real estate information comprising at least one time a desired price or price range, and;
    returning at least one time in real time or near real time:
    one or more real estate pricing information matching said desired price or price range retrieved from a source of real estate information for sale from a plurality of real estate sellers; and
    one or more first loan information including loan pricing information generated in real time or near real time at least in part from: at least one said matching real estate pricing information, and a source of loan information including loan pricing information comprising one or more: loan information from at least one lender of a plurality of lenders and a plurality of loan types or loan programs; said source loan information being upon which said lender and said plurality of lenders are willing to make loans;
    at least a portion of said matching real estate pricing information and at least a portion of said first generated loan information including loan pricing information being one or more returned to and maintained by said computing device processors for one or more use and display together at least one time in real time or near real time;
    and sending at least to said real estate buyer computing device processors one or more: second information and a second generated loan information including loan pricing information generated at least in part from said second information at least one time in real time or near real time whenever said system receives or generates said second information.

2. The method of claim 1 further including said first request for information, said second information, or both including a request for loan information including loan pricing information received from said computing device processors comprising one or more of: a loan type criteria, and a real estate buyer information comprising one or more: real estate buyer down payment information, real estate buyer income information, real estate buyer debt information, real estate buyer employment information, and an information at least sufficient to one or more: identify a real estate buyer to obtain real estate buyer credit information including one or more credit report and credit score or determine the credit worthiness of said real estate buyer, and
    said generated loan information including loan pricing information being generated at least one time in real time or near real time at least in part from one or more: said loan type criteria and said real estate buyer information.

3. The method of claim 2 wherein said request for loan information is selected from the group: a request for loan information, a request for a loan quote, prequalification, preapproval and approval information, and a loan application information, and said generated loan information including loan pricing information is selected from the group: a loan quote, prequalification, preapproval and approval information.

4. The method of claim 1 wherein said generated loan information including loan pricing information comprises one or more: a loan amount information, a loan interest rate information, a periodic loan payment information, an annual percentage rate information or equivalent information, a loan discount or points information, a loan fee information, a good faith estimate or equivalent information, and a truth-in-lending or equivalent information; and
    wherein said periodic loan payment comprises one or more: loan payment information, real estate tax payment information, mortgage insurance premium payment information, and hazard insurance premium payment information.

5. The method of claim 1 including returning one or more information to buy or own real estate one or more: returned to and maintained by said computing device processors for one or more use and display together at least one time in real time and near real with one or more said matching real estate pricing information and said generated loan information including loan pricing information and wherein said second information comprises said information to buy or own real estate comprising one or more:
    an information to provide a service, a settlement service, and transfer title to real estate;
    a real estate tax information, a hazard insurance information, a homeowner association information, and a utility information;
    a bid, quote, price and cost information;
    a lowest bid, quote, price, and cost information;
    information for a real estate agent or broker service, or a service normally performed by a real estate agent or broker, and an information upon which a service provider is ready, willing and able to provide a service.

6. The method of claim 2 wherein said generated loan information including loan pricing information is upon which at least one said lender is willing to make a loan on, one or more: said real estate buyer information, desired price or price range, said matching real estate pricing information, and one or more said returned information to buy or own real estate.

7. The method of claim 2 wherein said generated loan information including loan pricing information is upon which at least one said lender is willing to make a loan on: all said real estate buyer information, at least one said matching real estate pricing information, and one or more said returned information to buy or own real estate.

8. The method of claim 1 wherein said lender comprises one or more of: a loan finder, loan broker, direct lender, loan correspondent, wholesale lender, and loan investor.

9. A method for providing information to a real estate information system over a computing network comprising the steps of:
    maintaining a first computing processor in communication with the computing network;
    sending to the computing network including to one or more second computing processors in communication with the computing network one or more:
    real estate information including real estate pricing information for sale from at least one seller of a plurality real estate sellers;
    loan information including loan pricing information comprising one or more: loan information including loan pricing information from at least one lender of a plurality of lenders, and a plurality of loan types or loan programs; said loan information being upon which said at least one lender and said plurality of lenders are willing to make loans; and
    information to buy or own real estate;
    wherein said second computing processors receive a first request for information comprising a request for real estate information including desired real estate price or price range at least in part from a real estate buyer computing device processor in communication with the computing network, and return at least to said buyer computing device processor in real time or near real time: at least one said real estate information including real estate pricing information, at least one said loan information including loan pricing information, and at least one said information to buy or own real estate;
    such that at least one said returned real estate information including real estate pricing information matching said desired real estate price or price range, at least one said returned loan information including loan pricing information generated in real time or near real time from said matching real estate price information, and at least one said returned information to buy or own real estate are one or more returned to and maintained by said real estate buyer computing device processor for use together at least one time in real time or near real time on said real estate buyer computing device;
    and
    sending at least one time in real time or near real time one or more: second real estate information, second loan information including loan pricing information, and second information to buy or own real estate at least one time whenever said system or said second computing processors receive or generate a second information;
    while said second computing processors return at least to said real estate buyer computing device processor at least one time in real time or near real time at least one or more: said second information and a second generated loan information including loan pricing information generated at least in part from one or more: said second information, said second real estate information, said second loan information including loan pricing information, and said second information to buy or own real estate.

10. The method of claim 9 including sending in real time or near real time in response to receiving one or more requests for information from said information system.

11. The method of claim 9 said first request for information, said second information, or both including, and said generated loan information including loan pricing information being generated at least one time in real time or near real time from, a request for loan information received at least in part from said computing device processor comprising one or more: loan type criteria, and a real estate buyer financial information comprising one or more: said real estate buyer down payment information, said real estate buyer income information, said real estate buyer debt information, said real estate buyer employment information, and an information at least sufficient to identify said real estate buyer to obtain said real estate buyer credit report or credit score or to determine the credit worthiness of said real estate buyer.

12. The method of claim 11 wherein said request for loan information is selected from the group: a request for loan information, a request for a loan quote, prequalification, preapproval and approval information, and a loan application information; and said generated loan information including loan pricing information is selected from the group: loan quote, prequalification, preapproval and approval information.

13. The method of claim 9 wherein said generated loan information including loan pricing information comprises one or more: a loan amount information, a loan interest rate information, a periodic loan payment information, an annual percentage rate information or equivalent information, a loan discount or points information, a loan fee information, a good faith estimate or equivalent information, and a truth-in-lending or equivalent information; wherein said periodic loan payment comprises one or more: loan payment information, real estate tax payment information, mortgage insurance premium payment information, hazard insurance premium payment information.

14. The method of claim 9 wherein one or more said generated loan information including loan pricing information is generated at least in part from, and said second information includes, said information to buy or own real estate;
    wherein said information to buy or own real estate comprises one or more:
    an information to provide a service, provide a settlement service, and transfer title to a real estate;
    real estate tax information, a hazard insurance information, a homeowner association information and a utility information;
    a bid, quote, price, cost information;
    a lowest bid, quote, price, cost information;
    information for a real estate agent or broker service, or a service normally performed by a real estate agent or broker, and
    an information upon which a service provider is ready, willing and able to provide a service.

15. The method of claim 9 wherein said generated loan information including loan pricing information is that upon which at least one said lender is willing to make a loan on: all said real estate buyer information, at least one said matching real estate pricing information, and one or more said returned information to buy or own real estate.

16. The method of claim 9 wherein said lender comprises one or more of: a loan finder, loan broker, direct lender, loan correspondent, wholesale lender, and loan investor.

17. A computerized method comprising the steps of:
maintaining a first computing processor in communication with a computing network;
receiving a request for real estate information comprising a desired price from a real estate buyer computing device processor in communication with the network;
returning in real time or near real time a real estate pricing information matching said desired price retrieved from a source of real estate information for sale from a plurality of real estate sellers;
receiving at least in part from said real estate buyer computing device processor a request for loan information comprising one or more: at least one said matching real estate pricing information and at least one or more: real estate buyer down payment, income, debt information, and an information at least sufficient to identify said real estate buyer to obtain a credit report or credit score or to determine the credit worthiness of said real estate buyer; and
returning in real time or near real time a loan pricing information calculated by a second processor, in communication with said network, able to execute at least one loan underwriting programming instruction in real time or near real time, from at least: a loan information from a source of loan information in communication with the network comprising one or more: loan information upon which a plurality of lenders are willing to make loans and a plurality of loan types or loan programs upon which one or more lenders are willing to make loans; and one or more: said at least one matching real estate pricing information and said real estate buyer information;
such that said at least one matching real estate pricing information and said calculated loan pricing information are available for use or display together at least one time in real time or near real time by said computing device processor; and
and sending at least to said real estate buyer computing device processor one or more: second information and a second calculated loan pricing information calculated by the second processor at least a portion of said second information at least one time in real time or near real time whenever said system receives or generates said second information; said second calculated loan pricing information being upon which at least one said lender is willing to make a loan on said at least one matching real estate pricing information, all said real estate buyer information, and said calculated portion of said second information.

18. A computer system comprising:
a computing network;
one or more first computing processors in communication with said computing network; said first computing processors able to execute programming instructions to at least:
receive, at least in part from a real estate buyer computing device processor in communication with said computing network, a first request for information including a request for real estate information comprising a desired price or price range;
return, for use by said real estate buyer computing device processor at least one time in real time or near real time with receiving said first request, a real estate pricing information matching said desired price or price range and a first loan pricing information generated in real time or near real time from said matching real estate pricing information;
and,
return one or more second information and second loan pricing information generated from at least one said matching real estate pricing information and said second information, at least one time in real time or near real time whenever said system one or more receives and generates said second information;
said matching real estate pricing information received by said first computing processors at least from one or more sources of real estate information for sale from a plurality of real estate sellers in communication with said computing network; and
said generated loan pricing information received by said first computing processors at least from:
one or more sources of loan information including loan pricing information, in communication with said computing network, comprising one or more: loan information from at least one lender of a plurality of lenders and a plurality of loan types or loan programs; said sources of loan information being upon which said at least one lender and said plurality of lenders offer to make loans; and
a second computing processor capable of executing one or more programming instructions to calculate said generated loan pricing information from one or more of said: sources of loan information including loan pricing information;
matching real estate pricing information; and second information if any.

19. The system of claim 18, said first request, said second information, or both including: a real estate buyer information comprising one or more: down payment information, income information, debt information, employment information, and an information at least sufficient to one or more; identify said real estate buyer to obtain said real estate buyer credit information including one or more credit report and credit score or determine the credit worthiness of said real estate buyer;
wherein said generated loan pricing information is calculated by said second computing processor from, and upon which at least one said lender is willing to make a loan on: at least one said matching real estate information, said real estate buyer information, and said second information, if any.

20. The system of claim 18 wherein said second information comprises an information to transfer title to said at least one matching real estate information.

21. The system of claim 20 wherein said information to transfer title comprises one or more of: a real estate contract information, a settlement cost information, and a deed information to transfer to said at least one matching real estate information.

22. The system of claim 21 said real estate contract information including a real estate contract price information.

* * * * *